US012255999B2

(12) United States Patent
Moore

(10) Patent No.: US 12,255,999 B2
(45) Date of Patent: Mar. 18, 2025

(54) SECURE ORBIT COMMUNICATION

(71) Applicant: SpiderOak, Inc., Lenexa, KS (US)

(72) Inventor: Jonathan Andrew Crockett Moore, Portland, OR (US)

(73) Assignee: SpiderOak, Inc., Lenexa, KS (US)

( * ) Notice: Subject to any disclaimer, the term of this patent is extended or adjusted under 35 U.S.C. 154(b) by 0 days.

(21) Appl. No.: 17/225,044

(22) Filed: Apr. 7, 2021

(65) Prior Publication Data

US 2022/0263656 A1 Aug. 18, 2022

Related U.S. Application Data

(60) Provisional application No. 63/150,898, filed on Feb. 18, 2021.

(51) Int. Cl.
| | |
|---|---|
| *H04L 9/00* | (2022.01) |
| *H04L 9/08* | (2006.01) |
| *H04L 9/14* | (2006.01) |
| *H04L 9/28* | (2006.01) |
| *H04L 9/32* | (2006.01) |

(52) U.S. Cl.
CPC .............. *H04L 9/14* (2013.01); *H04L 9/0861* (2013.01); *H04L 9/088* (2013.01); *H04L 9/3215* (2013.01); *H04L 9/3236* (2013.01); *H04L 9/50* (2022.05)

(58) Field of Classification Search
CPC ................................... H04L 9/00; H04L 9/08
See application file for complete search history.

(56) References Cited

U.S. PATENT DOCUMENTS

| 10,742,313 B1* | 8/2020 | Favarolo ............ H04B 7/18578 |
| 2002/0076055 A1* | 6/2002 | Filipi-Martin .......... H04L 9/007 |
| | | 380/282 |

(Continued)

FOREIGN PATENT DOCUMENTS

| CN | 111818525 A | * 10/2020 |
| WO | 2021090024 A1 | 5/2021 |

OTHER PUBLICATIONS

Mohamed Torky, Blockchain in space Industry: Challenges and Solutions, Feb. 27, 2020, arXiv:20002. 12878v1 (Year: 2020).*

(Continued)

*Primary Examiner* — Kevin Ayala
(74) *Attorney, Agent, or Firm* — Perkins Coie LLP

(57) ABSTRACT

Presented here is a system to enable secure communication between a first and a second communicator on a communication channel. The system can use multiple rotating cryptographic keys that are rotating according to a predetermined schedule to encrypt the communication between the first and the second communicator. The system can record the authority associated with the communication channel on a block chain. To determine whether the first and the second communicator have the authority to access the communication channel, the system can compute the authority of the first and the second communicator by checking the block chain from an initial block to a last block. The system can encrypt multiple communications sent via the communication channel using the multiple rotating cryptographic keys and can send the communications via the communication channel.

20 Claims, 42 Drawing Sheets

(56) References Cited

U.S. PATENT DOCUMENTS

| | | |
|---|---|---|
| 2007/0067244 A1* | 3/2007 | Jin .................... H04L 9/3268 705/59 |
| 2007/0286416 A1 | 12/2007 | Bertoni |
| 2010/0268943 A1* | 10/2010 | Roy-Chowdhury ...... H04L 9/14 713/156 |
| 2015/0365824 A1* | 12/2015 | Gustafson ............ H04L 9/0822 380/263 |
| 2017/0046111 A1* | 2/2017 | Chu .................... G06F 3/1454 |
| 2017/0206523 A1 | 7/2017 | Goeringer et al. |
| 2018/0288031 A1 | 10/2018 | Kumar |
| 2019/0280865 A1* | 9/2019 | Tobias .................... H04L 9/14 |
| 2019/0289018 A1* | 9/2019 | Metzger ................ G06F 16/27 |
| 2020/0169425 A1* | 5/2020 | Hofstee ............... H04L 9/3239 |
| 2020/0285721 A1 | 9/2020 | Gosalia |
| 2022/0103370 A1* | 3/2022 | Alwen .................... H04L 9/30 |
| 2023/0020193 A1 | 1/2023 | Williams et al. |

OTHER PUBLICATIONS

Mohamed Torky, Blockchain In Space Industry: Challenges and Solutions, Feb. 27, 2020, Cairo, Egypt, arxIV:20002. 12878V1 (Year: 2020), 27 pages.

PCT International Search Report and Written Opinion for International Appl. No. PCT/US2022/016566, Mailing Date: Mar. 3, 2022, 27 pages.

\* cited by examiner

SECURE ORBIT COMMUNICATION

CROSS-REFERENCE TO RELATED APPLICATIONS

The present application claims priority to and the benefit of U.S. Provisional Patent Application No. 63/150,898, filed Feb. 18, 2021, which is hereby incorporated by reference in its entirety.

TECHNICAL FIELD

The present application is related to managing access to a secured file system, and more specifically, to methods and systems that manage group authority and access to the secured file system in an enterprise environment.

BACKGROUND

The major problem our computing systems face today is that internal threats—that is, threats from our reliance upon a centralized infrastructure and the people that manage and provide it—are a part of the overall threat model. According to Microsoft® SharePoint Admin Role documentation, "[g]lobal admins and SharePoint admins don't have automatic access to all sites and each user's OneDrive®, but they can give themselves access to any site or OneDrive®." Our current approach to infrastructure, that centralizes the management and provision of security and access control with admins allows people access to information without a need-to-know that information. As a result, administrators that do not have the authority to read data stored on the server that they are administering can still gain access and read the data, without the authority to do so.

SUMMARY

Presented here is a system to enable secure communication between a terrestrial operator and an extraterrestrial object. The system can use multiple rotating cryptographic keys that are rotating according to a predetermined schedule, and where the multiple rotating cryptographic keys are initially encrypted and distributed to the terrestrial operator and the extraterrestrial object. The predetermined schedule can be an algorithm that calculates the multiple rotating cryptographic keys from an initial key, and a round indicator, which indicates the place of the key in the sequence of the multiple rotating cryptographic keys. The system can create a radiofrequency communication channel between the terrestrial operator and the extraterrestrial object.

The system can append to a block chain a block defining an authority of the terrestrial operator and the extraterrestrial object, where the authority defines an operation that the two communicators can perform on the communication channel, such as read, write, add an additional communicator, etc. The system can grant access to the communication channel to the terrestrial operator and the extraterrestrial object by determining the authority of each. To determine the authority, the system can compute the authority of the terrestrial operator and the extraterrestrial object by checking the block chain from an initial block to a last block. The system can encrypt multiple communications sent via the communication channel using the multiple rotating cryptographic keys and can send the communications via the communication channel.

DETAILED DESCRIPTION

Figure 1:
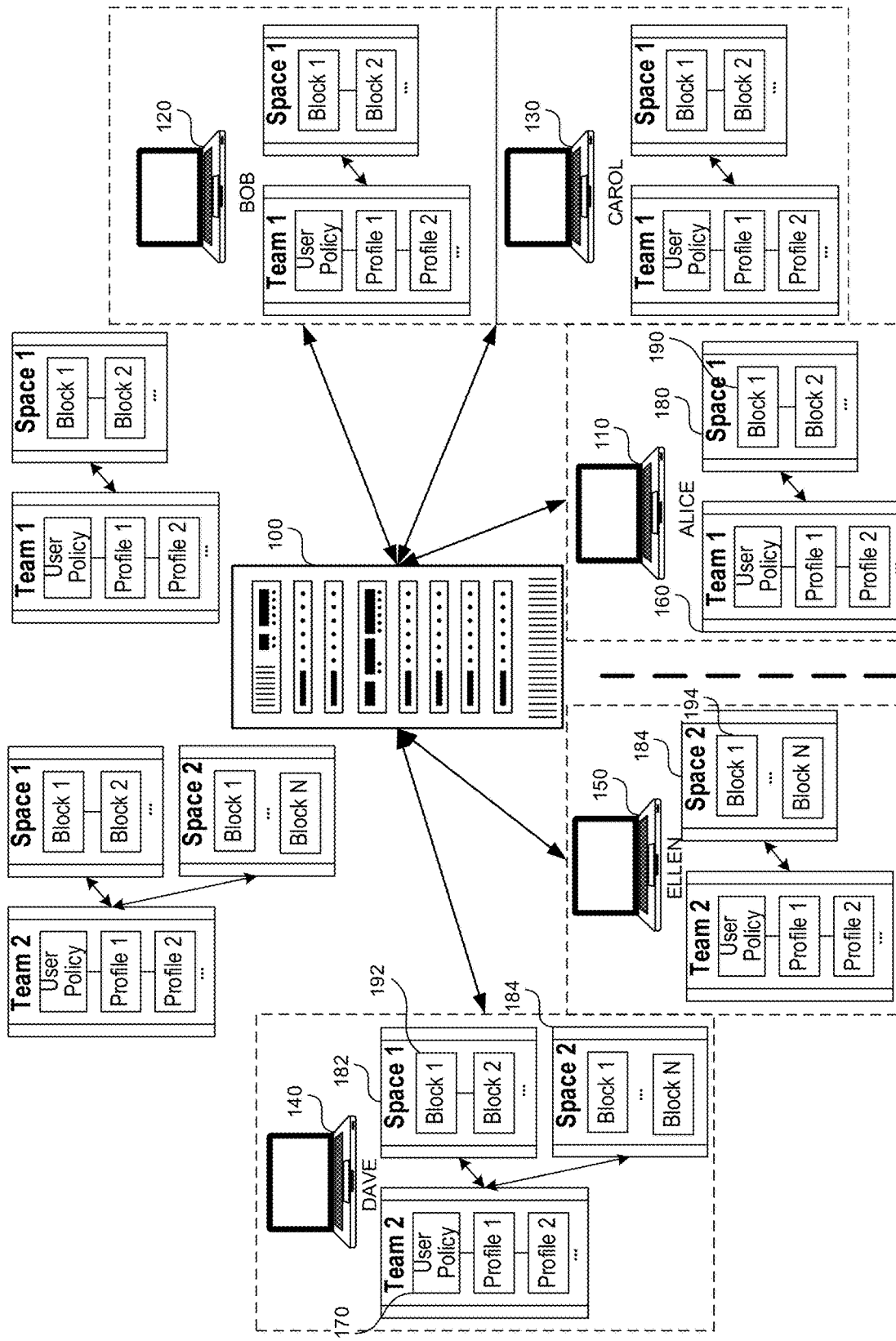
FIG. 1 shows a system to manage group authority and access to cryptographically secure data in a decentralized environment.

Managing Group Authority and Access to Secure Data in a Decentralized Environment FIG. 1 shows a system to manage group authority and access to cryptographically secure data in a decentralized environment. The server 100 is in communication with multiple devices 110, 120, 130, 140, 150, also called endpoints. Each of the devices 110-150 can be associated with an entity or a user such as Alice, Bob, Carol, Dave, Ellen, respectively. Each user Alice-Ellen can have a unique cryptographic user identification ("ID"), as explained later in this application, and each device can have a unique cryptographic device ID. Each cryptographic user ID can have one or more cryptographic device IDs associated with it.

The unique cryptographic user IDs can be separated into teams, such as team 1 and team 2 as shown in FIG. 1. For example, Alice's, Bob's and Carol's cryptographic user IDs can be members of team 1, while Dave's and Ellen's cryptographic user IDs can be members of team 2, as shown in FIG. 1. Team 1 and team 2 can have mutually exclusive membership, as shown in FIG. 1, or can have partially overlapping membership. The team membership can be recorded in a linear sequence, for example, a team linear sequence 160, 170 (only one instance of a team linear sequence labeled for brevity). Each team 1, 2 can have one team linear sequence 160, 170, respectively. The linear sequence, such as the team linear sequence 160, 170 and a space linear sequence 190, 192, 194, is a cryptographic data structure akin to a ledger. Because the linear sequence can be distributed across multiple devices, each of which independently verifies the linear sequence, the linear sequence can represent a distributed ledger.

Each team 1, 2 can have one or more spaces 180, 182, 184 (only one instance of a space labeled for brevity). Each space 180, 182, 184 can be a virtual compartment containing encrypted data and members having access to the encrypted data. A subset of team members can be included in one or more spaces 180, 182, 184 and given authority to access encrypted data associated with the one or more spaces 180, 182, 184. For example, team 1 has space 180, and all the team members Alice, Bob and Carol are invited to space 180. In another example, team 2 has space 182 and 184. Space 182 only has Dave as a member, while space 184 has both Dave and Ellen as members. Each space 180, 182, 184 can have encrypted data that can be made accessible only to the space members. Encrypted data can include content or data, or both. For example, encrypted data can include a file, a file system, a document, and/or messages such as instant messages, emails, chat messages, text messages, etc.

In an example, only users Alice, Bob, Carol have authority to the encrypted data associated with space 180. In another example, only user Dave has the authority to the encrypted data associated with the space 182, while both users Dave and Ellen have the authority to access encrypted data associated with space 184. Authority to the encrypted data can include permission to read, write, and/or modify the encrypted data. Access to encrypted data can be granted upon verifying that the cryptographic user ID requesting the access has the authority encompassing the access.

For example, user Ellen's cryptographic user ID can have the authority to read the encrypted data. However, if user Ellen's cryptographic user ID requests to write to the encrypted data, user Ellen's cryptographic user ID will be denied the access to write to the encrypted data because user Ellen's cryptographic user ID lacks the authority. In other words, in the system disclosed here, the access to the encrypted data cannot exceed the authority associated with the encrypted data.

In another embodiment, the teams 1, 2 do not exist, and the users can be grouped into one or more spaces 180, 182, 184. To generate a space, a general pool of cryptographic user IDs that exist in the system can be searched to define the members of the space. The team linear sequence 160, 170 can be integrated into the corresponding space linear sequence 190, 192, 194 (only one instance of a space linear sequence labeled for brevity). For example, the space linear sequence 190 can include the team linear sequence 160 and the space linear sequence 192, the space linear sequence 192 can include the team linear sequence 170 and the space linear sequence 192, while the space linear sequence 194 can include the team linear sequence 170 and the space or list 194.

A record of the authority associated with the encrypted data can be computed by combining the team linear sequence 160, 170 and a corresponding space linear sequence 190, 192, 194, as described further in this application. In addition to storing authority and membership, the space linear sequence 190, 192, 194 can also store the encrypted data and/or references to the encrypted data.

A copy of the team linear sequence 160, 170 and the space linear sequence 190, 192, 194 can be distributed to all the devices 110-160 whose cryptographic user IDs are members of the corresponding team and space as well as the server 100. For example, devices 110-130 have a copy of the team linear sequence 160 and the space linear sequence 190 because the cryptographic user IDs associated with the devices 110-130 are members of team 2 and space 180. In another example, device 140 has a copy of the team linear sequence 170 and space linear sequences 192 and 194, because user Dave's cryptographic user ID associated with the device 140 is a member of team 2 and space 182, 184. In a third example, device 150 has a copy of the team linear sequence 170 and space linear sequence 194, because user Ellen's cryptographic user ID associated with device 150 is a member of team 2 and space 184.

The metadata contained in the team linear sequence 160, 170 and the space linear sequence 190, 192, 194 can be stored in plain text, while the remainder of the data can be encrypted. The metadata can include authority information, policy information, roles, etc., stored within the team linear sequence 160, 170 and the space linear sequence 190, 192, 194. The remainder of the data can include confidential data such as files, filesystems, messages, and/or other confidential data. For example, filenames can be a part of the confidential data if the encrypted data includes files and/or filesystems. The filesystems, files, and/or messages can only be accessed by knowing the encryption key used in encrypting the data. Even if an attacker were to successfully gain control of the encryption key, a user's private key, and/or authorized endpoint device, the compromise of the system would be limited.

For example, if the attacker gains control of the encryption key associated with space 182, the attacker would only be able to access confidential data within the space 182, not the confidential data within spaces 184 and 180. If an attacker obtains Ellen's private key, the attacker would only be able to access confidential data within the space 184, and not spaces 180 and 182. Thus, by compartmentalizing authority and access to spaces 180, 182, 184, the breach of the system can be confined.

Figure 2:
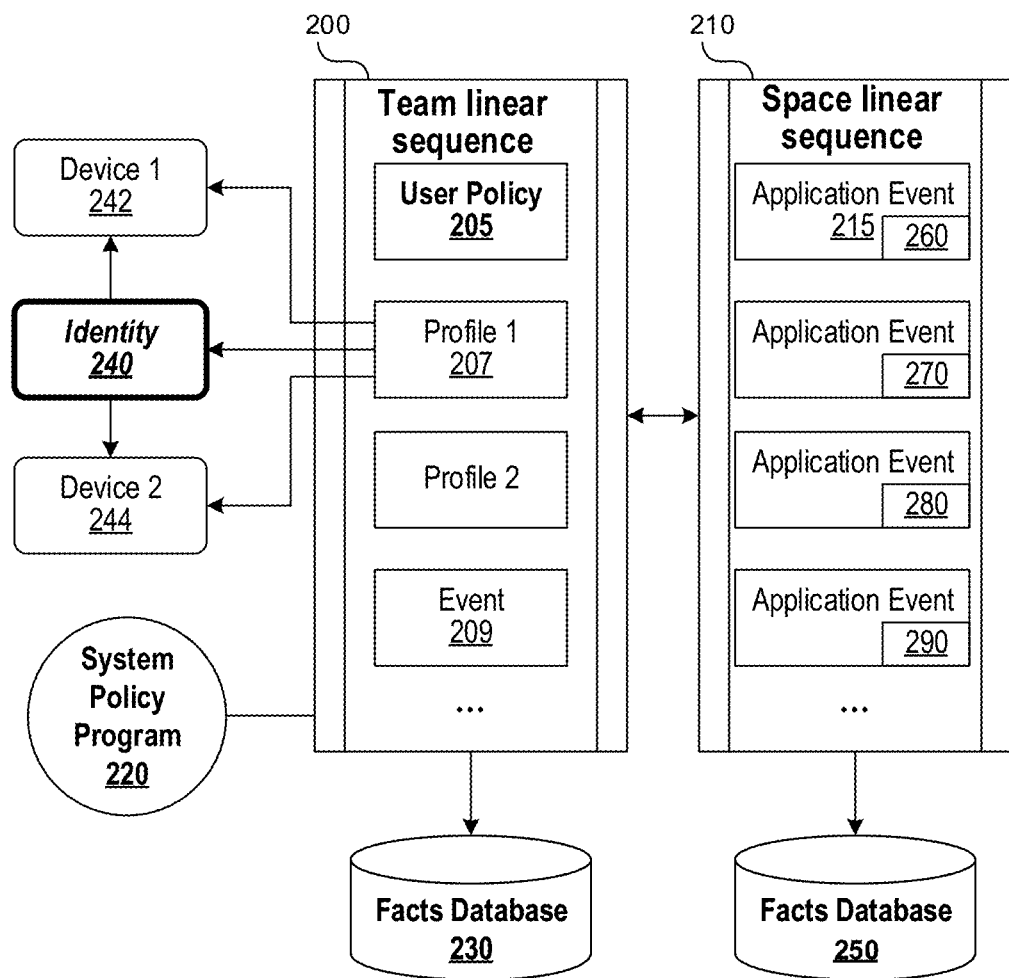
FIG. 2 shows a team linear sequence and a space linear sequence.

FIG. 2 shows a team linear sequence and a space linear sequence. A team linear sequence 200 can be used to track identities of team members and their authority in a team. A space linear sequence 210 can be used to form a secure compartment which can admit a subset of the team members. The secure compartments are used to manage data and negotiate shared keys among the space members. The team linear sequence 200 can be connected to a program 220 containing a system policy, as well as to a database 230 containing facts. The space linear sequence 210 can rely on the team linear sequence 200 to determine policy within the space. The space linear sequence 210 can be connected to a database 250 containing facts.

The team linear sequence 200 and the space linear sequence 210 can each contain multiple blocks 205, 207, 209, 215 (only 4 labeled for brevity). The initial block 205 of the team linear sequence 200 can define a policy for the team. A policy can specify a role and an authority associated with the role. For example, a policy can specify "only administrators can create spaces within a team." A team policy can be obtained from a policy template stored in a policy database and/or can be modified when instantiating the first block 205. Alternatively, the first block 205 can define the team policy without reference to the policy template. A policy program 220 can be shared between different teams. The different teams, however, can have different fact databases 230. The team policy can also be modified by later blocks added to the team linear sequences 200, if the team policy defining block 205 permits modification.

The policy program 220 can store policy templates that can be included and/or modified as policy in the initial block 205. The fact database 230 can contain unique key-value pairs that can define user and user authority within the system. For example, a key-value pair that can be added to the fact database 200 can be "Alice-administrator", after a block that specifies that Alice is an administrator has been verified.

Block 207 of the team linear sequence 200 can include a profile of the user that is a member of the team 200. The user profile can include the user's identity 240 which can be represented by a cryptographic user ID, such as a public-key in an asymmetric cryptographic algorithm such as Rivest-Shamir-Adleman (RSA) or Diffie Hellman (DH). Only the user can be in possession of the private-key. The user profile can also include a cryptographic device ID 242, 244 associated with all the devices that the user has approved.

There are multiple ways that a device can be added to the system. For example, the user can approve the device by sending a request to add the device to the system, where the request is signed with a private key of the user. In another example, to approve a device, the user can perform a multi-step process. In the first step, the user can create a new set of device keys using the asymmetric cryptographic algorithm. In the second step, the user can sign the device keys with the user's private key and construct a device certificate containing the device public-key and the user's private key signatures. In the third step, the device can send a request, which includes the certificate from the second step, to be added to the team, where the request is signed using the device private key. The system can authenticate that a team member has made the request by verifying the request using the public-key of the user. The cryptographic device ID can be a cryptographic hash of the public-key of the asymmetric cryptographic algorithm, while the private-key can be known only to the device and can be used to authenticate actions performed by the device.

Block 209 of the team linear sequence 200 can include an event such as addition of a new user, creation of the space linear sequences 210, a change to policy 205, removal of an existing user, and/or a change of role of a user.

Block 215 of the space linear sequence 210 can include an event such as addition of a user to the space, addition of encrypted data to the space, removal of a user from space, etc. Each event 215 in the space linear sequence 210 complies with the policy defined in the team linear sequence 200. In some embodiments, policy cannot be changed in the space linear sequence 210 and must be changed in the team linear sequence 200. A team can have multiple spaces with different policies by defining multiple space types having different policies, and establishing the spaces corresponding to the different space types. For example, a space type can include an "administrator space type" where all users have administrator roles and administrators add and remove other users and can have read and write access to the encrypted data. In another example, the space type can include "stratified space type" where some users have administrator roles, and some users have user roles, and the administrator roles have more authority than the user roles. Events in the team linear sequence 210 that change authority of a user can be stored in the fact database 250.

User policy 205 can be defined to enable users matching certain attributes to only have access to the space linear sequence 210 and space encrypted data for a limited amount of time. The passage of time can be measured by an always increasing clock that can provide a timestamp 260, 270, 280, 290 for each block 215 in the space linear sequence 210. The timestamp 260 can, for example, state "11:46 AM Nov. 21, 2019 (PST)." In the space linear sequence 210, the timestamp 260, 270, 280, 290 is always increasing between subsequent blocks. To enable time-limited access to the space linear sequence 210 and associated encrypted data, the user policy 205 can state that "user associated with profile 1 can have access to the linear sequence until Dec. 2, 2019."

Figure 3:
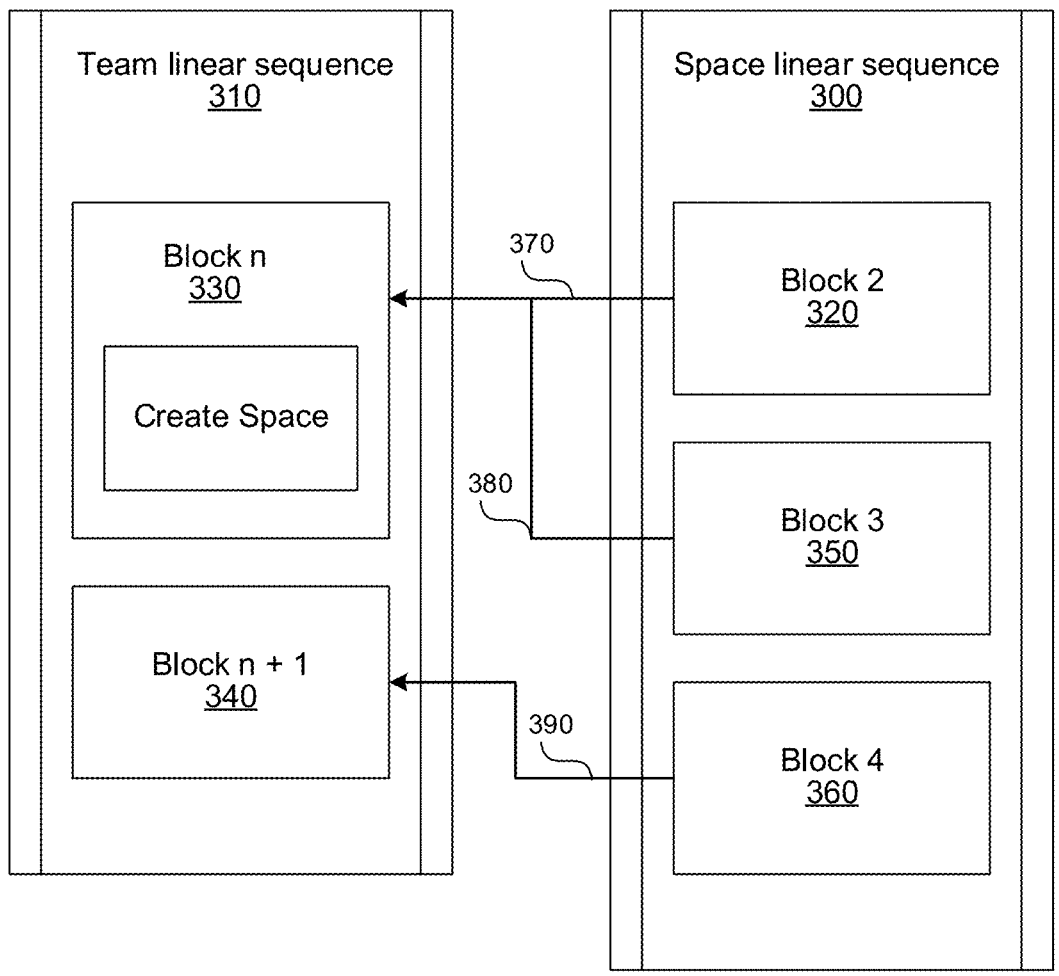
FIG. 3 shows the linear ordering between a team linear sequence and a space linear sequence.

FIG. 3 shows the linear ordering between a team linear sequence and a space linear sequence. Because the policy at least partially defining authority is stored in the team linear sequence 310, to compute an authority in a space linear sequence 300, a reference to the team linear sequence 310 needs to be made.

For example, in block 320 of the space linear sequence 300, the user of the space requests to add another user. In block 330 of the team linear sequence 310, the policy defined authority of the space user to add another space user, however in block 340 of the team linear sequence 310, the policy was modified to prevent space users from adding others space users. To determine whether block 320 is valid and should be added to the space linear sequence 300, the linear sequence of blocks 330, 340 in the team linear sequence 310 and the blocks 320, 350, 360 in the space linear sequence 300 needs to be established.

To establish the linear sequence, a temporal relationship 370, 380, 390 can be established between the blocks 320, 350, 360 in the space linear sequence 300 and the blocks 330, 340 in the team linear sequence 310. The temporal relationship 370, 380, 390 can include a pointer from the space block 320, 350, 360 to the team block which is the immediate predecessor or immediate successor of the space block 320, 350, 360. In FIG. 3, the temporal relationships 370, 380, 390 point from the space block 320, 350, 360 to the immediately preceding team block. For example, temporal relationship 370, 380 indicates that the team block 330 is the immediate predecessor of space blocks 320, 350, meaning that space blocks 320, 350 were created after the team block 330, but before team block 340. Similarly, the temporal relationship 290 indicates that space block 360 was created after team block 340.

Figure 4:
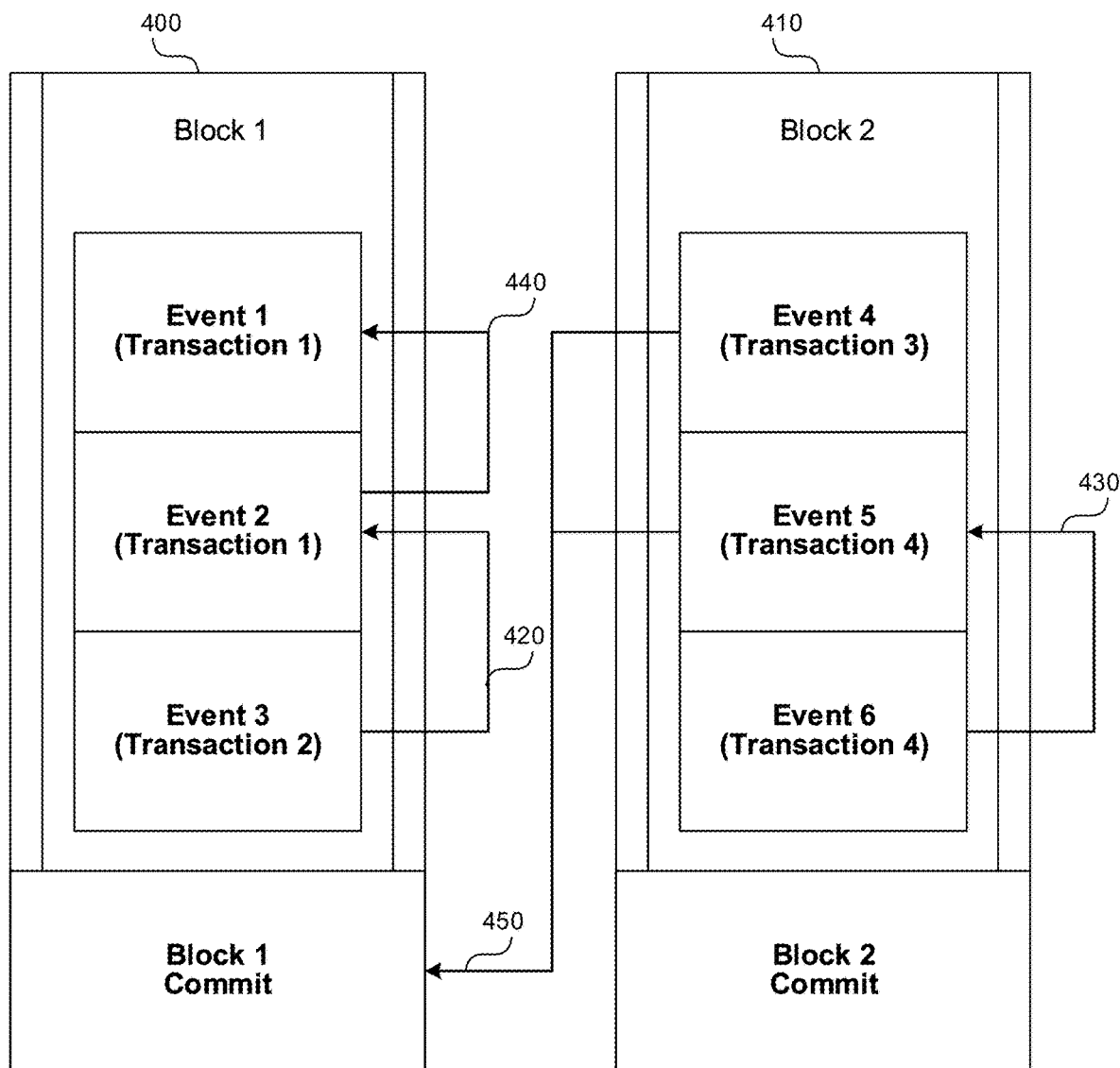
FIG. 4 shows anatomy of a block.

FIG. 4 shows anatomy of a block. The block 400, 410, can contain one or more events 1-6. The events 1-6 in blocks 400, 410 can be atomic. Each event 1-6 is committed in a single block 400, 410.

A transaction can include one or more events where the last event is signed. A transaction can be produced by a single client, such as client 110 in FIG. 1. When a transaction includes multiple events, such as transaction 1 containing events 1 and 2, the events can be ordered by the client prior to being sent to the server. The ordering of the events is indicated using arrows 420, 430, 440, 450. Upon receiving transactions 1-4 from multiple clients, the server can order transactions according to the order indicated by the arrows 420, 430, 440, 450.

Events in a single transaction point to each other, and the last event is signed. For example, events 1 and 2 form a single transaction 1. Similarly, events 5 and 6 form a single transaction 4. The arrow 420 between event 3 and event 2, indicates that a server should commit event 3 to the linear sequence after event 1. Similarly, the arrow 430 between events 5 and 6 indicates that the server should commit the event 6 to the linear sequence after event 5.

In an embodiment, events 1 and 2 come from a single client, while event 3 can come from the same client as events 1 and 2, or from a different client. Similarly, events 5 and 6 come from a single client, while event 4 can come from the same client or a different client. Further to this embodiment, there can be at least one and up to four clients creating transactions 1-4, as shown in FIG. 4. For example, a single client can author transaction 1, including events 1 and 2. A second client can author transaction 2 including event 3. A third client can author transaction 3 including event 4, and a fourth client can author transaction 4 including events 5 and 6.

In the case that more than one event, for example, events 1-3, need to be added in an atomic manner, the events 1-3 can be combined into a single block 400, and the block 400 can be stored in the linear sequence. In the block 400, 410, only the last event, such as event 3, 6, respectively, can be signed and none of the events 1-3, 4-6 in the block 400, 410 are valid unless they all appear in the intended order in the intended block.

The events 1-6 in blocks 400, 410 are cryptographically signed and recorded in an authenticated linear sequence, as explained in this application. The structure of the linear sequences guarantees that devices 110-160 in FIG. 1, which accept a block with some index n, are certain to agree on the contents of all blocks with an index less than n. Blocks 400, 410 have indices 1, 2, respectively, in FIG. 4.

Once the block 400, 410 is finalized, the block 400, 410 gains a block ID. Finalizing a block means committing a block to a durable storage and not changing the block. A block ID is a tuple of the block's index, and the cryptographic hash of its contents. For a given block n, all events intended to be added to the linear sequence in block n+1 can include block ID of block n. This ensures that the intended ordering of events of devices 110-160 is preserved. Additionally, only devices which agree on the block order and contents of blocks 0 through n, can accept an event in block n+1.

Figure 5:
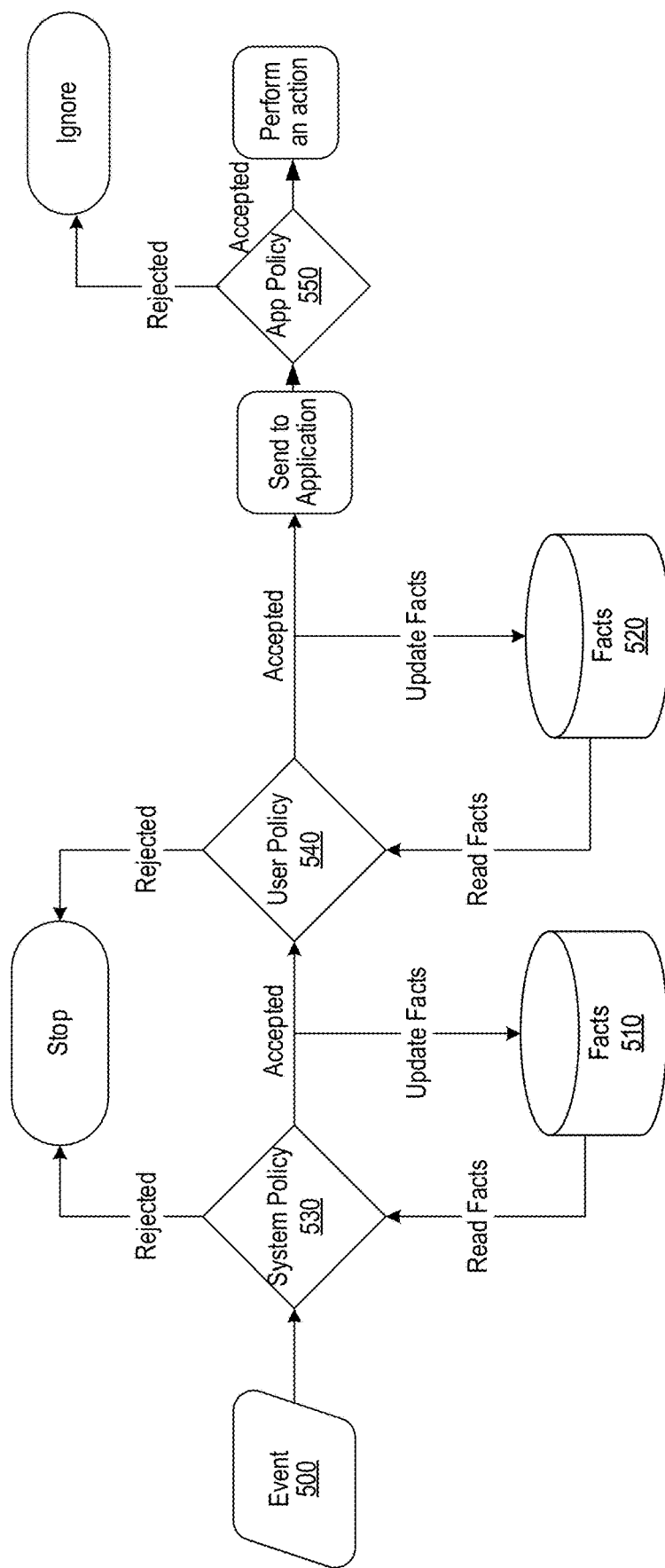
FIG. 5 shows verification of various layers of policies that can exist within the system.

FIG. 5 shows verification of various layers of policies that can exist within the system. An events 500 is processed using a formal policy which may either reject an event 500 or accept an event 500, and optionally update a database of facts 510, 520. A fact database 510, 520 is an index over the linear sequence with respect to the policy. The index is a collection of key value pairs. For example, the fact database 510, 520 can record facts generated by the event 500 and the policy rule which authorized it. The fact database 510, 520 can be read by a policy pressor when deciding if the event 500 is valid and should be accepted in the linear sequence, such as a team linear sequence, or a space linear sequence.

When a server 100 in FIG. 1 receives the event 500, the server can include the event 500 in the next block. When the device 110-160 receives the event 500, the device can process the event 500 based on the business needs.

The system policy 530 is implemented by the device 110-160 and server 100. All cooperating devices 110-160 must use the same system policy 530 when processing the same block. In one embodiment, system policy 530 can be implemented as source code in a programming language such as Rust, Python, Go, or a proprietary policy language. The system policy 530 describes the structure of the blocks themselves. The system policy 530 describes the core protocol of the linear sequences, such as "all events in block n must reference block n−1."

The user policy 540 can be the team policy 205 in FIG. 2. The team policy 205 can be provided by a customer and can be tailored to the customer's organization. To ensure that all parties agree on the user policy 540, the user policy 540 can be stored in the linear sequence, such as the team linear sequence 310 in FIG. 3, and is guaranteed to be the same for all users cooperating on a particular linear sequence. An example of a team policy rule is "only team admins can add new members to a team."

The application policy 550 can be defined per team 160, 170 in FIG. 1. The key difference between the application policy and other policies is that the application policy operates after any cyphertext has been decrypted. Consequently, the application policy cannot be checked by the server. The application policy may not record authority, and can specify low level rules such as "two files cannot have the same name." The application policy 550 can encode rules to resolve low-level conflicts such as "if two files have the same name, the second file is ignored." Policies, including the system policy 530, the user policy 540 and/or the application policy 550, can be fixed in the program or managed using the linear sequences, such as team linear sequence 200 and space linear sequence 210 in FIG. 2.

Figure 6:
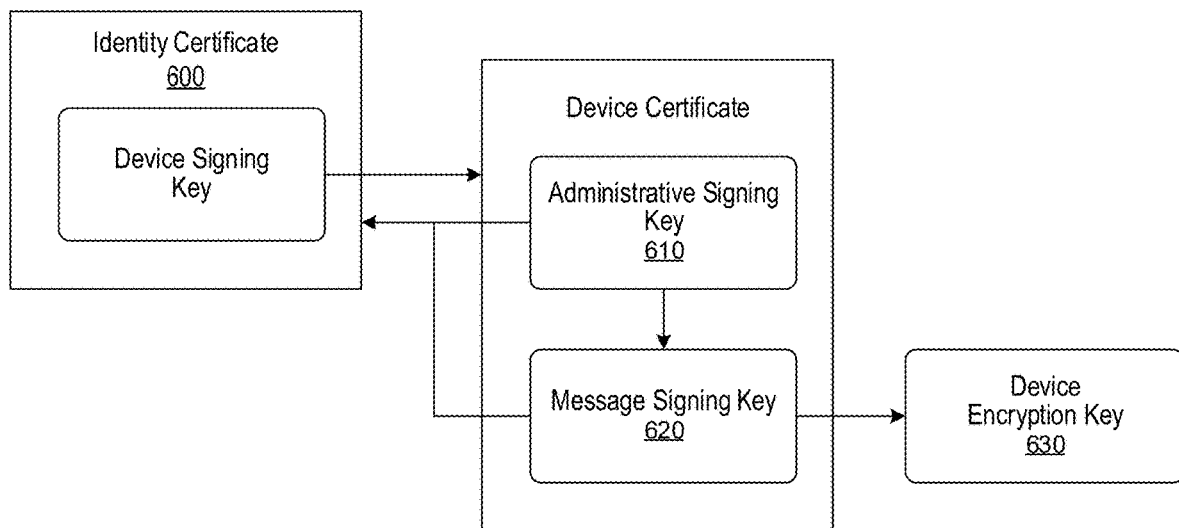
FIG. 6 shows various cryptographic IDs that can exist within the system.

FIG. 6 shows various cryptographic IDs that can exist within the system. Identities form the foundation of the security. Identities are represented by cryptographic identification (ID), such as asymmetric key pairs generated off-line using RSA, DH or other asymmetric algorithms. The public-key from the asymmetric key pair is used as the cryptographic identity of the entity, while the private-key from the asymmetric key pair is known only to the entity. The off-line generation of the root asymmetric key pairs protects the key pair from being compromised by a bad actor. Device keys can be generated online but may be stored in a hardware security module (HSM).

A cryptographic ID, such as a cryptographic device ID or cryptographic user ID, represents a single entity in the system, such as a device or a user, respectively. Consequently, the identity established using the cryptographic ID is globally distinct. In an embodiment, users are unique across teams even if no administrators distinguish them. Even between non-cooperating groups, such as teams that do not share any members, the identity established using the cryptographic ID remains globally distinct.

The cryptographic user IDs can be used to sign/authorize device keys which are used operationally in the system. Devices can use cryptographic device IDs, which can include three keys types: administrative signing keys, message signing keys, and device encryption key. All of these key types are asymmetric key pairs and can be managed outside of the application, in an operating system (OS) keys store or a hardware security module (HSM).

The identity certificate 600 can be deterministically generated from a recovery secret, allowing efficient hand transcription of the recovery secret when provisioning a new device.

The administrative signing key 610 can be used in high-risk operations and can require proof of user presence for any signing request. Examples of the high-risk operations are adding users or changing permissions.

The message signing key 620 can be used to sign most data transmitted by the device 110-160 in FIG. 1 and does not require proof of presence. An example use of the message signing key 620 is to sign messages sent in a chat, or to sign files to be uploaded.

The device encryption key 630 can be used when sending a confidential message to the device is necessary. The device encryption key 630 can be rotated often to provide for forward secrecy for device to device communications.

Figure 7:
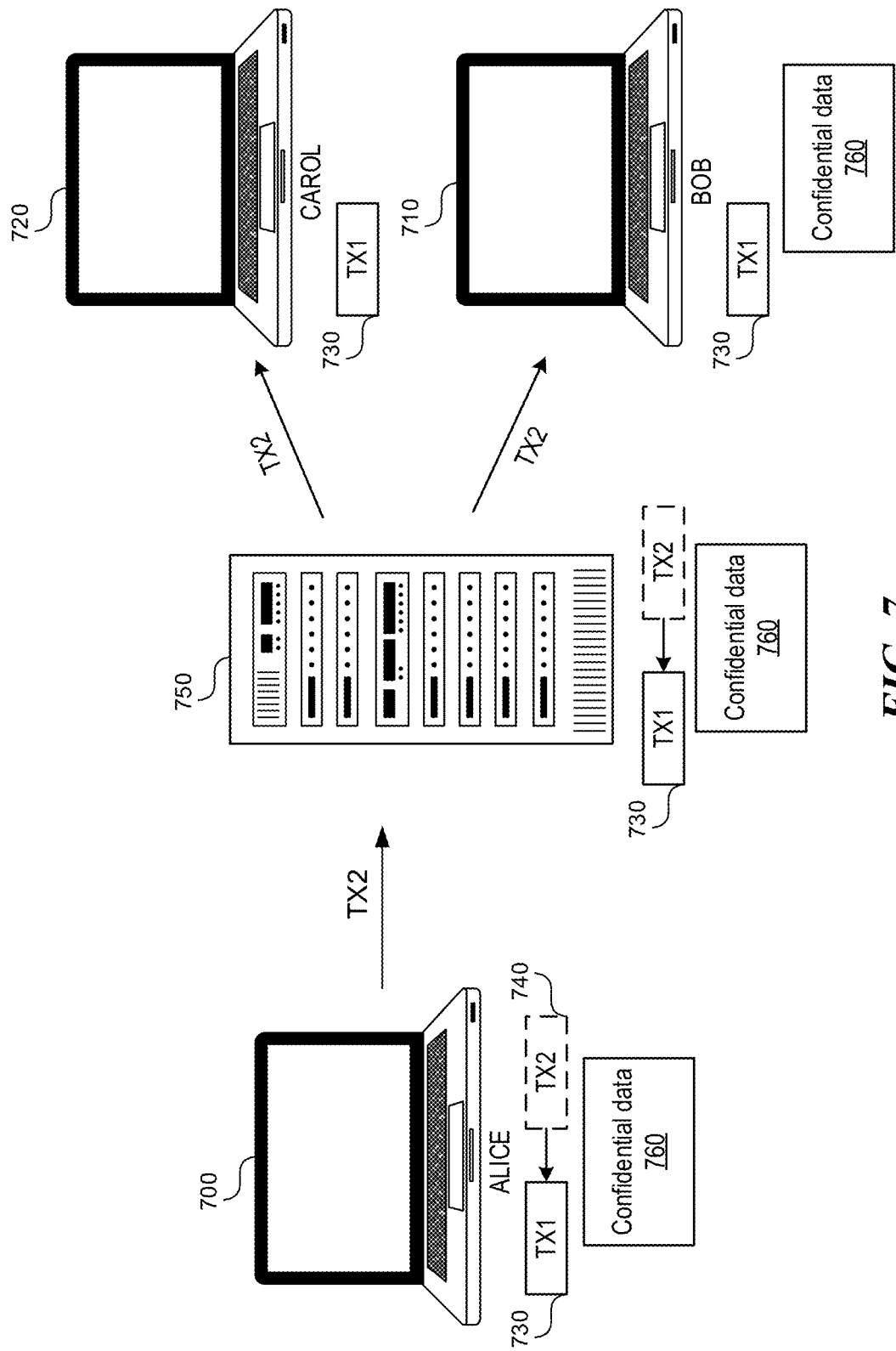
FIG. 7 shows how a block can be distributed to multiple devices.

FIG. 7 shows how a block can be distributed to multiple devices. Devices 700, 710, 720 can belong to the same space and/or team. They all can have a copy of the linear sequence 730. When one of the devices, such as device 700, adds a new block 740 to the linear sequence 700, the device 700 sends the new block 740 to the server 750.

The server 750 also has a copy of the linear sequence 730. The server 750 can compute whether the block 740 is valid by computing whether the user has the authority to perform the operation represented in the block 740. To determine whether the user has the authority, the server 750 can compute the authority from the linear sequence 730. The authority computation is explained below.

Once the server 750 verifies that the block is valid, the server can distribute the block 740 to the devices 710, 720, which in turn can also compute whether the block 740 is valid based on the authority recorded in the linear sequence 730. If the device 710, 720 determines that the block is not valid, the device can shut down because likely a breach of the system has occurred.

The devices 700, 710, 720 can share encrypted data 760, if they are in the same space. The encrypted data 760 is encrypted using at least one cryptographic key, such as a confidential session key, explained below. Different devices 700, 710, 720 can have different authority to the encrypted data 760 such as read-only, write-only, and read and write authority.

The server 750 can also store the encrypted confidential data 760, however the server 750 does not store any of the cryptographic keys, including the confidential session key. The server 750 does not have any authority to the encrypted data 760. The server 750 has a copy of the encrypted data 750 to ensure availability of the data. For example, if the devices 700, 710 are off-line, and the device 720, as a newly added member of the space, requests the encrypted confidential data 760, the server 750 can provide the encrypted confidential data 760 to the device 720, even if the devices 700, 710 are off-line.

Figure 8:
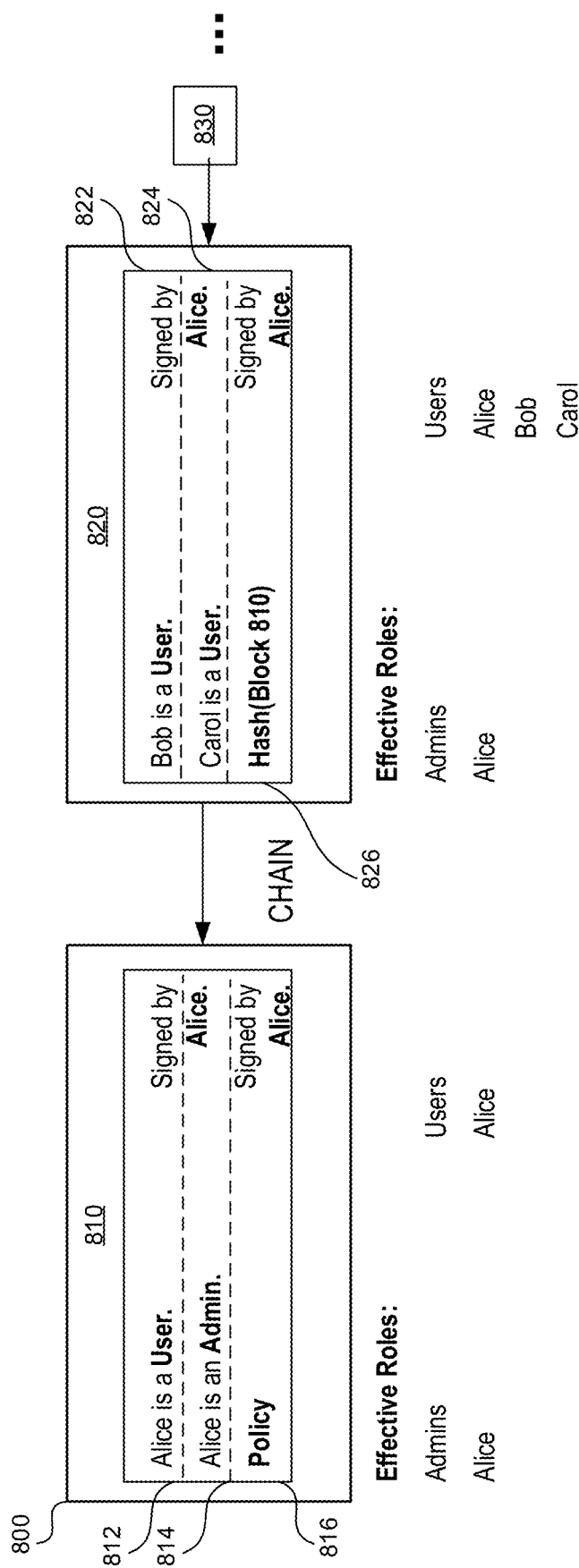
FIG. 8 shows a linear sequence containing blocks.

FIG. 8 shows a linear sequence containing blocks. The linear sequence 800 contains at least blocks 810, 820, 830. Block 810 contains multiple events 812, 814, while block 820 contains events 822, 824. Block 810 is the initial block in the linear sequence 800 and contains the policy 816 defining authority for the linear sequence 800. Each event in the subsequent blocks, such as block 820, can be verified to ensure that the event 822, 824 is consistent with the policy 816.

Each block subsequent to the initial block, such as block 820, includes the cryptographic hash 826 of the previous block, which for block 820 would be the hash of block 810. By including the cryptographic hash of the previous block, the ordering of the blocks in the linear sequence 800 can be guaranteed, and a reordering or editing of existing blocks, and/or an insertion of new blocks within the linear sequence 800 can be detected and automatically rejected.

The linear sequence 800 does not require a proof of work to verify the validity of the block, because the linear sequence 800 is a linear sequence, without any branching. Further, when a block is added to the list, the block's validity has been checked to comply with the policy and authority recorded in the linear sequence 800, and the block cannot be deleted. In other words, the order list 800 cannot be rolled back.

Within the initial block 810, event 812 establishes Alice as the user. The event is signed by Alice, meaning that Alice uses her private-key to encrypt the statement "Alice is a user." To verify that Alice is truly requesting to be established as a user, a processor can verify the signed statement "Alice is a user," using Alice's public-key and if verification succeeded the processor can know that Alice has truly requested to establish the user.

Event 814 establishes Alice as an administrator. Similarly, the event is signed and the processor can verify Alice's identity, as explained above. Because block 810 is the initial block, the policy 816 for the linear sequence is established. For example, policy 816 can state "only administrators can add users." Once block 810 has been committed to the linear sequence 800, the effective roles of the system are that Alice is an administrator and Alice is a user.

Event 822 in block 820 establishes that Bob is a user. To compute whether Alice has the authority to add the user, the processor can check the policy 816 and Alice's role in the system established by events 812, 814. Because the policy specifies that only administrators can add users, the processor checks whether Alice is an administrator. Upon verifying that Alice is an administrator, the processor can verify that Alice has the authority to add Bob as a user. Each event subsequent to the events contained in the initial block 812, 814, can be checked against the policy 816, and the policy authorizing the event can be recorded. For example, for event 822, block 820 can point to the policy stating that "only administrators can add users," and a processor can check that there is a fact stored in a fact database that "Alice is an administrator."

Event 824 adds Carol as a user and must also be signed by Alice, as explained above. Event 822 can also point to the policy that authorized the event, namely the policy stating "only administrators can add users" which is supported by the fact that "Alice is an administrator." The hash 826 creates a linear sequence of blocks 810, 820. After block 820 has been committed to the linear sequence 800, the effective roles in the system are that Alice is an administrator, and Alice, Bob, and Carol are users.

Other roles can be defined within the team such as legal, technical, sales etc. Each role can be granted access to a corresponding space type. For example, if Alice has role of "legal," Alice can be granted access to all spaces that have type "legal." If Alice's "legal" role is revoked, Alice can automatically lose access to the spaces that have type "legal."

Figure 9:
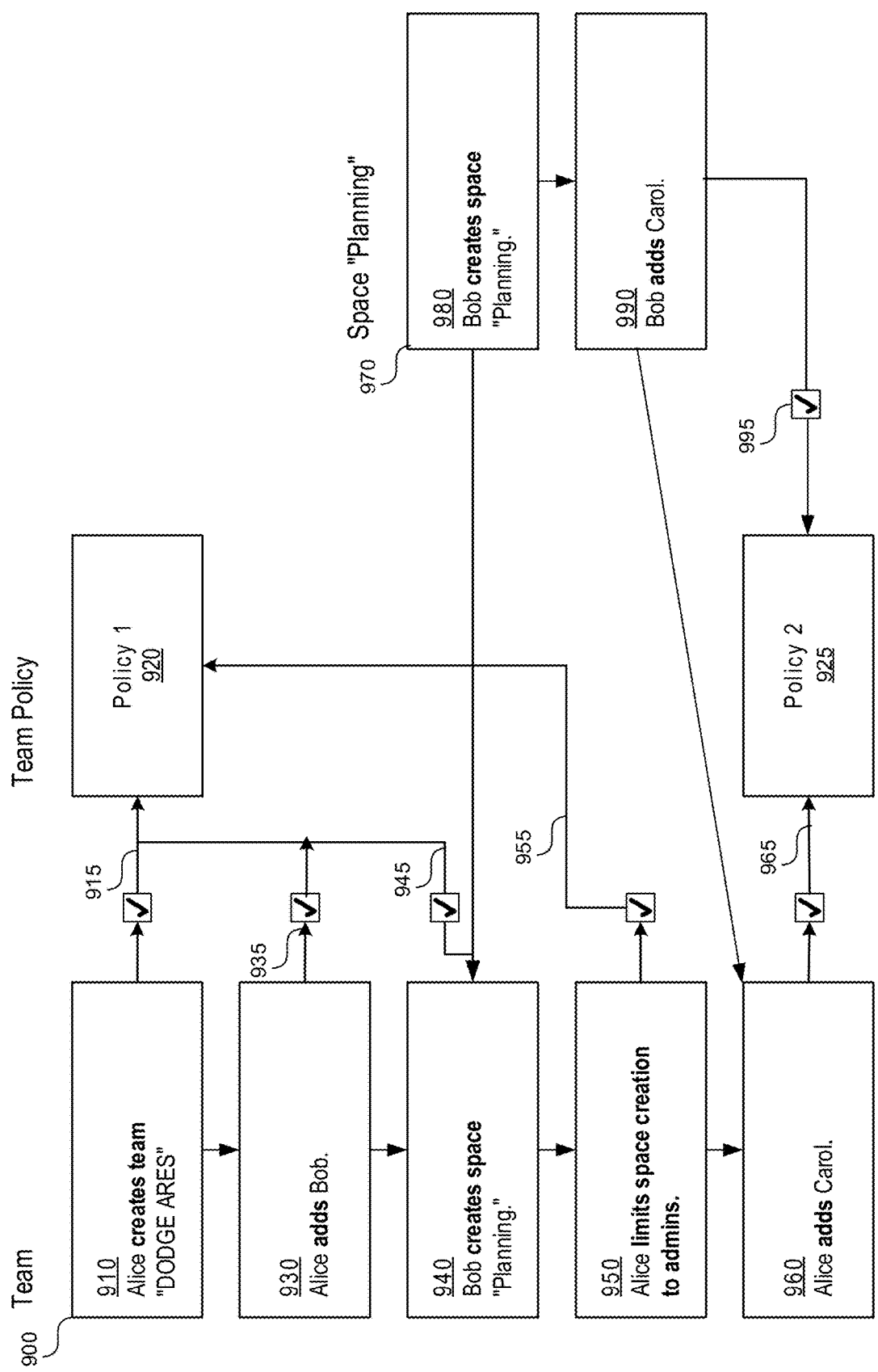
FIG. 9 shows a team linear sequence and a space linear sequence.

FIG. 9 shows a team linear sequence and a space linear sequence. In this example, the team linear sequence 900 and the block linear sequence contain blocks that include only one event. The team linear sequence 900 is initialized with the initial block 910 and using connection 915 linked to the policy 920, which establishes the policy for the team and any spaces. In block 930, Alice adds Bob as a user, and this event can be linked, using connection 935, to the policy 920 that authorizes it.

In block 940, Bob creates space "planning," and the event is linked to the policy 920 to ensure that Bob as the user has the authority to create a space. By default, only the creator of the space is granted administrative authority to the space on the space linear sequence 970. If policy 920 authorizes users to create spaces, the block 930 is validated, the event is linked using connection 945 to the policy 920, and the block 940 is added to the team linear sequence 900. When Bob creates space "planning," space linear sequence 970 is established, with the initial block 980 pointing to block 940 to indicate that the list was created after block 940, but before block 950, explained below.

In block 950, Alice limits space creation to administrators. This action changes the policy 920. To verify whether block 950 is valid, a processor needs to check the policy 920 to see if the policy allows administrators to modify the policy. If the policy 920 allows administrators to modify the policy, the event is linked, using connection 955, to a portion of policy 920 that allows administrators to modify the policy, and the new policy 925 is established. Even though after block 950, Bob cannot create a space, because Bob had the authority in block 942 to create the space, the space that Bob created is valid. In block 960, Alice adds Carol, and the event is checked against the new policy 925. Once the event is approved as authorized by the new policy 925, the connection 965 is established to that portion of the new policy 925 that authorizes the event.

In block 990 of the space linear sequence 970, Bob adds Carol as a user. To verify whether block 990 is valid, the processor needs to check the new policy 925 to see if policy 925 allows space users to add other space users. The policy 925 allows users to add users, and the event is linked, using connection 995, to a portion of the policy 925 that authorizes the event.

As explained earlier, only team members can be added to the space. If Bob attempts to add Carol prior to the block 950, the processor would not authorize the addition of the block 990, because after checking the fact base and/or the team linear sequence 900, the processor can determine that Carol is not a member of the team. However, if Bob attempts to add Carol to the space linear sequence 970 after block 960, the processor will authorize the addition of block 990, because the policy allows space users to add space users, and because Carol is a member of the team.

Figure 10A:
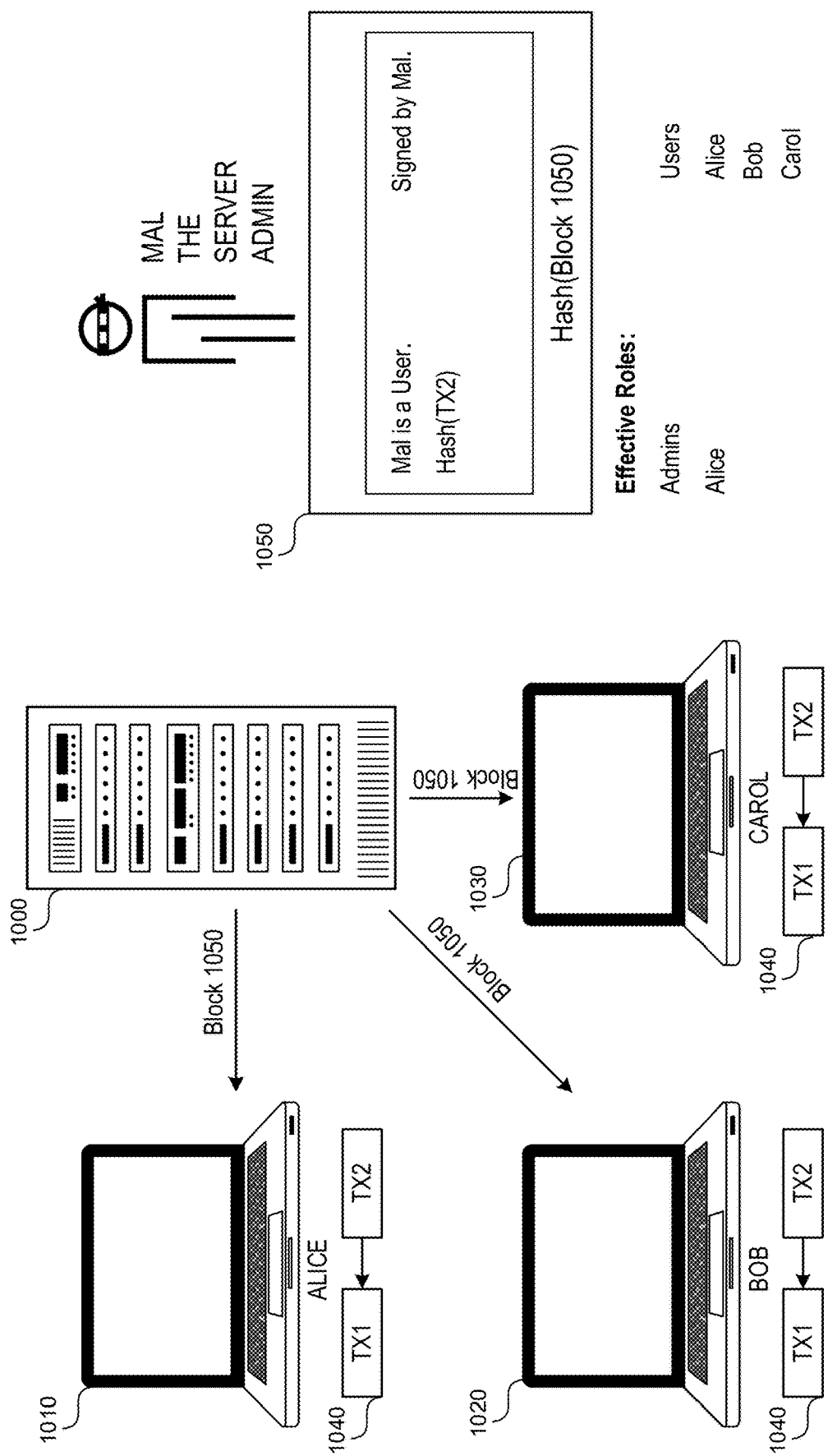
FIGS. 10A-B show authority computation in case a malicious actor tries to infiltrate the system.
Figure 10B:
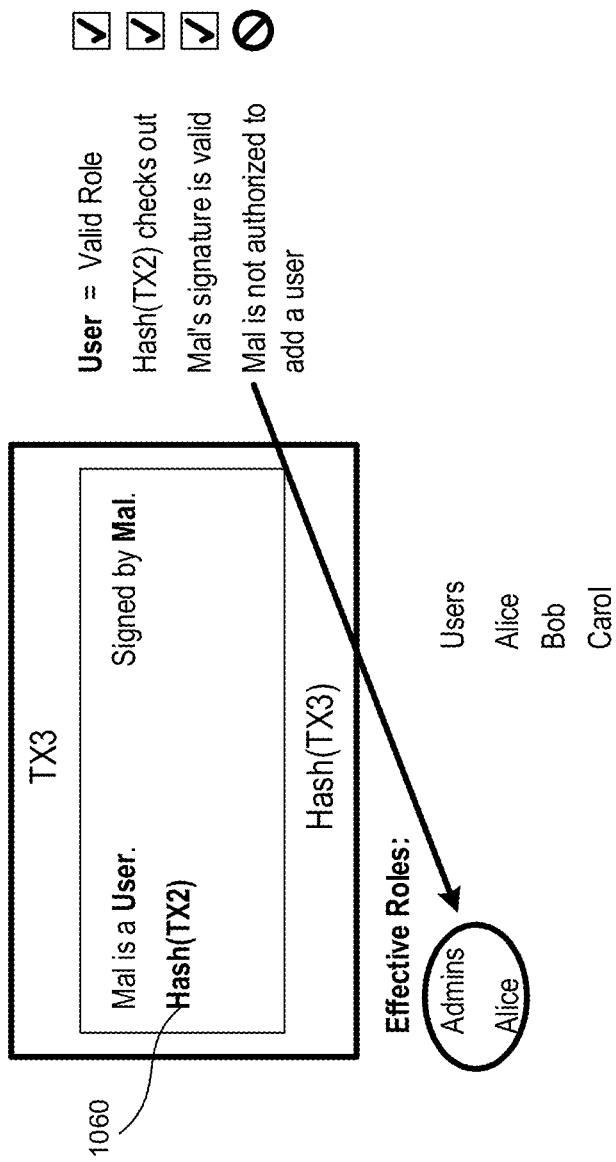

FIGS. 10A-B show authority computation in case a malicious actor tries to infiltrate the system. This example illustrates how a compromise of the server 1000 does not compromise the devices 1010, 1020, 1030 because each device 1010-1030 independently checks and guarantees a validity of the linear sequence 1040 and the authority recorded in the linear sequence 1040.

If the server 1000 is compromised, for example, by a malicious server administrator who coerces the server 1000 into incorrectly verifying and distributing a fraudulent block 1050 to the devices 1010-1030, each device 1010-1030 can independently verify the validity of the block 1050.

In FIG. 10B, each device 1010-1030 can independently verify that the hash 1060 of the last block in the linear sequence 1040 is valid. Each device 1010-1030 can verify that user is a valid role. Each device 1010-1030 can verify that Mal's signature is valid because, prior to submitting block 1050, Mal has requested that the server 1000 generate a public-key and a private-key for him and distribute the public-keys to the devices 1010-1030. However, the device 1010-1030 can determine that block 1050 is not valid because, according to system policy, only existing members, such as administrators or users, can add new users, and Mal is not an administrator or a user. Because the block 1050 does not satisfy policy, all the devices 1010-1030 can reject the block 1050. In addition, the devices 1010-1030 can shut down once an invalid transaction is received from the server 1000, because the devices 1010-1030 can conclude that the server 1000 has been compromised.

Figure 11A:
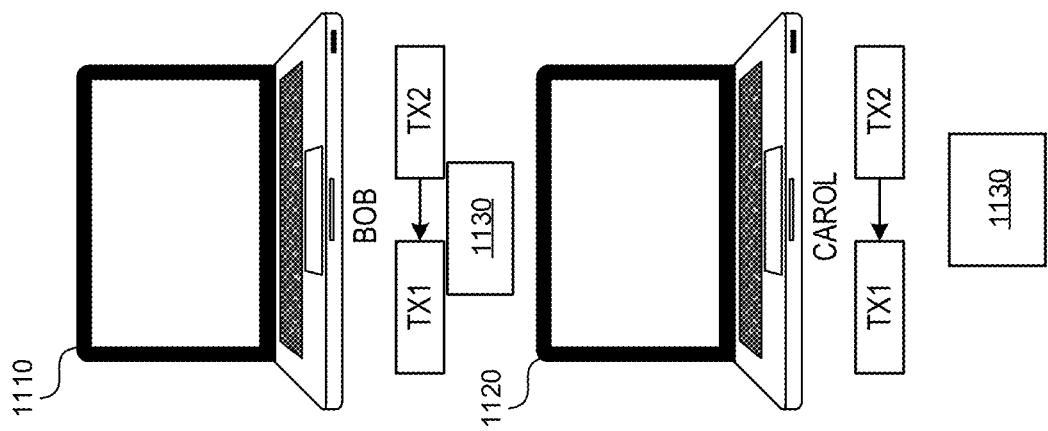
FIGS. 11A-C show how access to encrypted data can be controlled upon authority revocation.
Figure 11A:
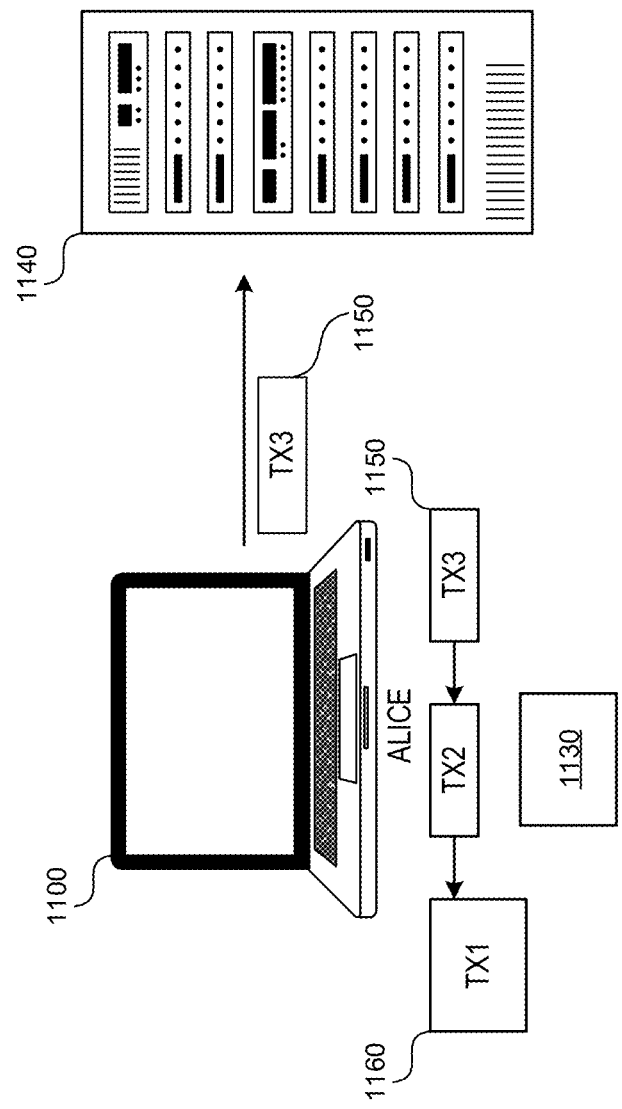
Figure 11B:
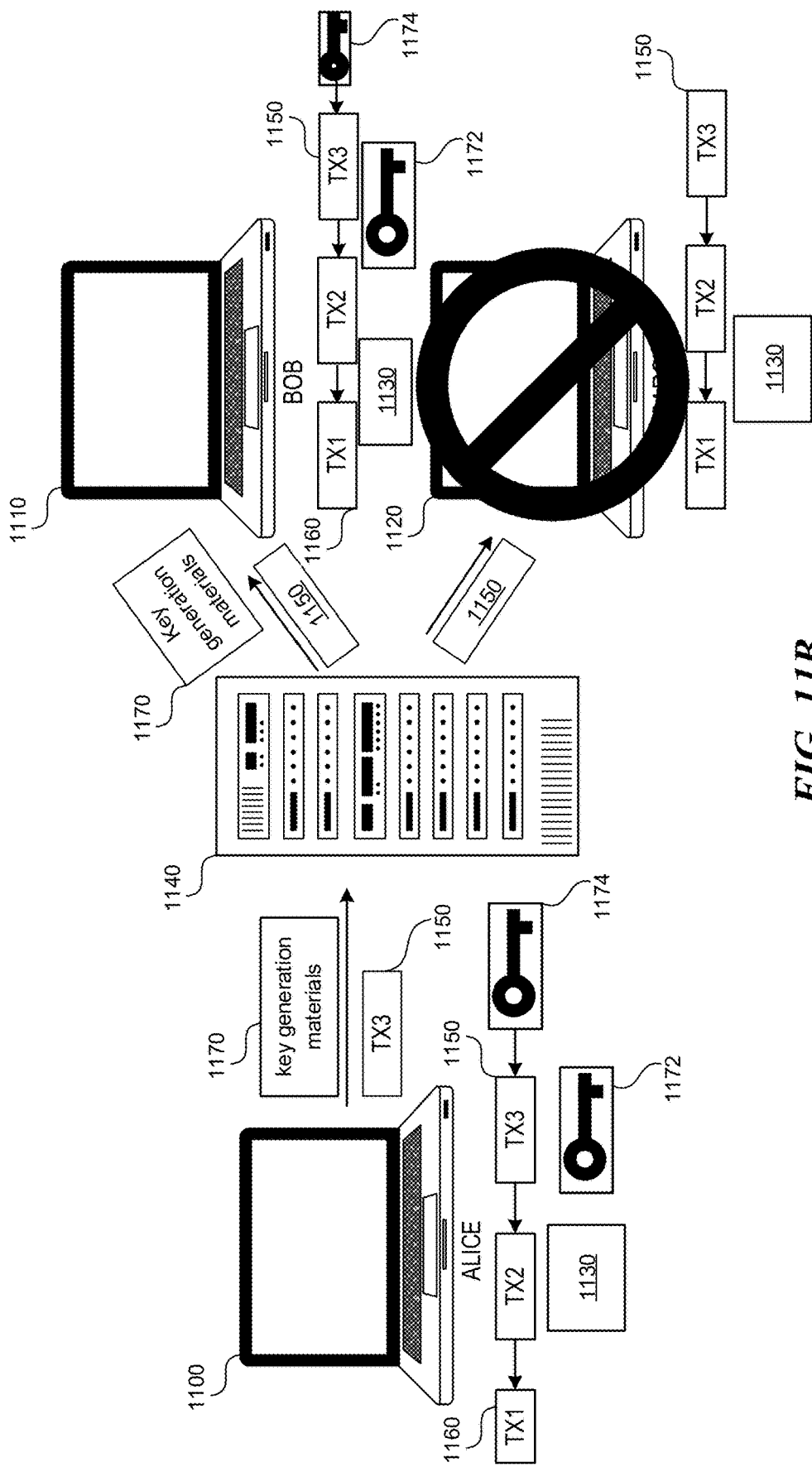
Figure 11C:
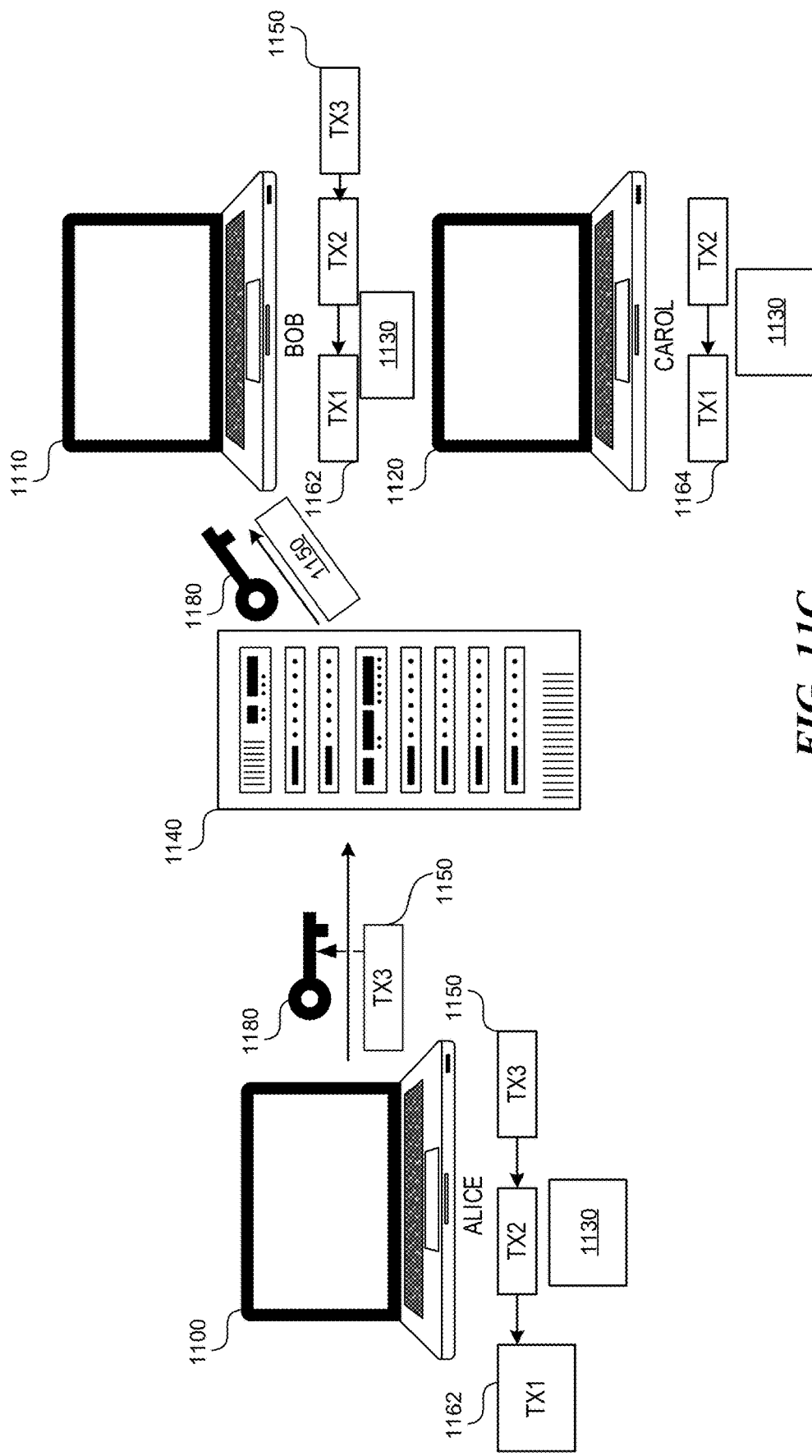

FIG. 11A-C show how access to encrypted data can be controlled upon authority revocation. Devices 1100, 1110, 1120 can share encrypted data 1130, by, for example, being part of the same space. The encrypted data 1130 can be encrypted using an Advanced Encryption Standard (AES), a symmetric-key algorithm using the same key for both encrypting and decrypting the data. The encrypted confidential data 1130 can be stored on the devices 1100-1120 and the server 1140. The AES key can be known only to the devices 1100-1120 that have the authority to access the encrypted data 1130.

Assuming Alice is an administrator and has the authority to remove users, Alice can submit a block 1150 to the server, that states "Carol is not a user," thus revoking Carol's authority to any future encrypted data shared between Alice and Bob. The server 1140 can distribute the block 1150 to all the devices 1110-1120, as seen in FIG. 11B.

Upon validation of the block 1150, by the devices 1110-1120, Carol and her device 1120 lose the authority to access any future encrypted data. To ensure that Carol and her device 1120 cannot access any future encrypted data shared between Alice and Bob, devices 1100, 1110 generate a new channel session key.

The new channel session key can be generated using the cryptographic methods such as elliptic curve cryptography, for example, using a P-384 elliptic curve. The channel session key can be generated using secret key generation materials 1170, such as domain parameters in the case of elliptic curve cryptography. The domain parameters can include the constants A, B defining the elliptic curve $Y^2=X^3+AX+B$.

The new group of devices that share the key is computed based on the linear sequence 1160. The secret key generation material 1170 is encrypted using each of the public-keys of an asymmetric cryptographic algorithm belonging to the devices remaining in the new group of devices. The encrypted secret key generation materials 1170 are distributed to all the devices in the group. The devices 1100, 1110 can use their own private-keys of the asymmetric cryptographic algorithm to decrypt the received encrypted message. As a result, only devices 1100, 1110 having the private key corresponding to the public-key used in encryption can calculate the new channel session key.

Devices 1100, 1110 receiving the secret key generation materials 1170 can compute a private portion 1172 of the channel session key and a public portion 1174 of the channel session key, and can record the public portion 1174 of the channel session key to the linear sequence 1160. As a result of committing the public portion 1174 of the channel session key to the linear sequence 1160, a client having an access to the linear sequence 1160 can access the public portion 1174 and have write-only access to the linear sequence 1160. The client cannot read any of the encrypted data associated with the linear sequence 1160, because the client does not have the secret key generation materials 1170 and/or the private portion 1172 of the channel session key. The private portion 1172 of the channel session key is not recorded in the linear sequence 1160.

Because the linear sequence 1160 does not require proof of work, and duplicating the linear sequence 1160 can be computationally feasible, a compromised server 1140 can present two different linear sequences 1162, 1164 to two groups of users, as seen in FIG. 11C. For example, the compromised server 1140 can refuse to distribute block 1150 to device 1120, thus leading the device 1120 to believe it is still in the group and to attempt to share encrypted data 1190 of device 1120 with devices 1100 and 1110. Consequently, a new channel session key 1180 can be computed based on the hash of the last block 1150 in the linear sequence 1160. For example, the new channel session key 1180 can be obtained by performing HKDF (channel session key in FIG. 11B, hash of block 1150). As a result, since devices 1100 and 1110 do not share the same last block with the device 1120, device 1120 cannot compute the same channel session key 1180.

In addition to the users of the same space Alice and Bob, a guest user can be temporarily granted access to the encrypted data contained in the same space as Alice and Bob. The guest user does not have access to the team linear sequence 1160 and cannot validate authority of a user within the space linear sequence 1160. However, the guest user can still negotiate a channel session key with Alice and Bob and be granted a temporary access to the encrypted data 1130.

Figure 12:
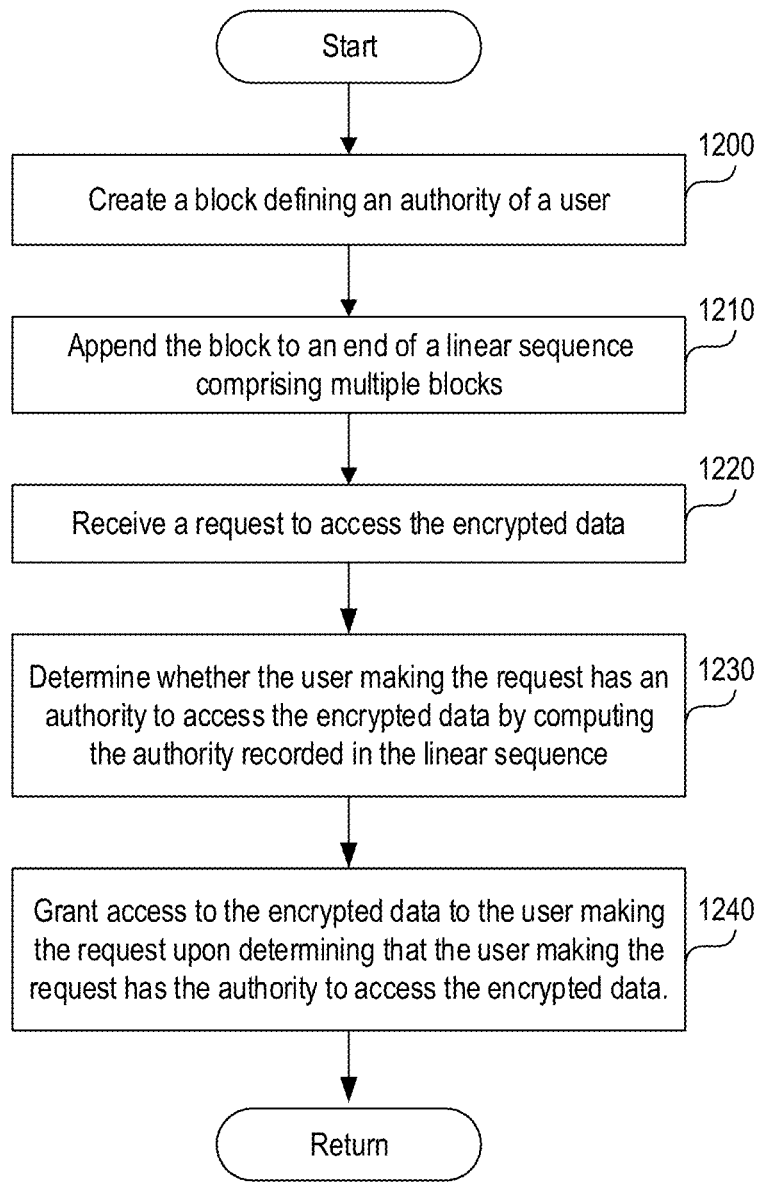
FIG. 12 is a flowchart of a method to manage authority, via a distributed ledger, separately from access to encrypted data by one or more trusted devices, wherein each of the trusted devices corresponds to at least one cryptographic key-based identity.

FIG. 12 is a flowchart of a method to manage, via a distributed ledger, authority separately from access to encrypted data by one or more trusted devices, wherein each of the trusted devices corresponds to at least one cryptographic key-based identity. In step 1200, a processor can create a block defining an authority of a user. The block can include a cryptographic user ID uniquely identifying the user and an authority associated with the cryptographic user ID. The authority can define at least an operation associated with the cryptographic user ID to perform on the encrypted data. The operation can include read-only, write-only, or read and write. Unlike a bitcoin ledger which requires approval to work, the block does not require an entry approving work, thus generation of the block is less processor intensive compared to bitcoin, which, on average, requires 10 minutes of processor time to generate a proof of work for the block.

In step 1210, the processor can append the block to an end of a linear sequence, including multiple blocks defining an authority associated with the encrypted data, and preserves a membership and an ordering of each block in the multiple blocks. To preserve the membership of the block, no block in the linear sequence can be deleted. In other words, deletion is not allowed operation on the linear sequence. To preserve ordering of each block among multiple blocks, rollbacks are not an allowed operation of the linear sequence. In other words, the linear sequence cannot branch, and contents of a block in the linear sequence cannot be modified and/or edited once the block is added to the linear sequence. The prohibition of deletion and modification of blocks ensures integrity of the linear sequence. In other words, once a block is added to the linear sequence, the block is permanently in the linear sequence. Further, before a block is added to the linear sequence, the contents of the block must be verified to ensure they are consistent with the preceding blocks in the linear sequence.

In step 1220, the processor can receive a request to access the encrypted data. The request can include a cryptographic user ID associated with the user making the request. Access to the encrypted data can include read-only, write-only, or both read and write access.

In step 1230, the processor can determine whether the user making the request has an authority to access the encrypted data by computing the authority recorded in the linear sequence as shown in FIGS. 8, 9, and 10A-B. To compute the authority, the processor can check the linear sequence from an initial block to a last block to determine user roles and authority associated with each role, and to compare the request from the user to the user role. In other words, the processor can manage access to the encrypted data by the cryptographic user ID by checking that the access by the cryptographic user ID is permitted by the authority recorded in the linear sequence.

In step 1240, the processor can grant access to the encrypted data to the user making the request upon determining that the user making the request has the authority to access the encrypted data.

The processor can create an initial block in the linear sequence defining a policy specifying a role and an authority associated with the role. For example, the initial block 810 in FIG. 8 defines policy 816 in FIG. 8. Further, the processor can create the block in the linear sequence defining a role associated with the cryptographic user ID. The block can be the initial block 810, as shown in FIG. 8 which, in addition to defining policy, defines that Alice is an administrator in event 814 in FIG. 8, or the block can be a subsequent block, such as block 820 in FIG. 8, which defines Bob and Carol as users.

To preserve the ordering of each block in the multiple blocks, the processor can include a cryptographic hash ("hash") of each previous block in each subsequent block, thus enabling detection of any change in the ordering sequence, as explained in FIG. 8. For example, the processor can compute a second cryptographic hash of data contained in a second block in the multiple blocks. The second block can be the initial block, or any block, in the linear sequence. The processor can store the second cryptographic hash within the second block, and can include the second cryptographic hash in data contained in a block subsequent to the second block.

To preserve the membership of blocks within the linear sequence, the processor can define a set of operations to be performed on the linear sequence, where any operation outside of the defined set cannot be performed in the linear sequence. The defined set can exclude operations such as deletion, branching of the linear sequence, and/or modification of data within the linear sequence.

To reduce the likelihood of a failure, such as corrupting the linear sequence and/or the encrypted data by a compromised central server, the processor can distribute the linear sequence to multiple devices. Each device in the multiple devices can be cryptographically verified by a cryptographic user ID associated with the linear sequence, as explained in FIG. 2. For example, to add a device to the list of authorized devices, an already authorized cryptographic user ID needs to request access for the device, as explained in FIG. 2. Upon receiving the request, the processor can verify that the cryptographic user ID indeed made the request by decrypting the request using the public-key of the cryptographic user ID. Upon verification, the processor can assign a cryptographic device ID to the device.

Each device among the multiple devices having the cryptographic device ID can independently verify the validity of a request based on the authority computed based on the linear sequence, as explained in FIGS. 10A-B. If a device cannot verify that the block is valid based on the computed authority, the device can refuse to add the block. Upon failure to verify, the device can shut down to prevent tampering with the encrypted data on the device.

The processor can define a team of cryptographic user IDs, for efficiency purposes, so that not all the cryptographic IDs have to be searched to find a group of people who can share encrypted data amongst themselves. To create the team, the processor can create a team linear sequence including multiple blocks. The multiple blocks can include one or more policy blocks, one or more profile blocks, and one or more authority blocks. The one or more policy blocks can define a policy establishing a role and an authority associated with the role, the one or more profile blocks can establish a cryptographic user ID and a cryptographic device ID associated with the cryptographic user ID, and the one or more authority blocks can define the role associated with the cryptographic user ID. The team linear sequence is an instance of, and has the same properties as, the linear sequence described in this application.

The policy recorded in the initial block of a linear sequence, such as the team linear sequence, can be modified if the policy recorded in the initial block permits modification. If the policy recorded in the initial block does not permit modification, any block attempting to modify the policy will not be verified by the multiple devices.

To modify the policy, the processor can obtain a request to modify the policy defined in the one or more policy blocks and a cryptographic ID of a user making the request. The processor can check whether the cryptographic user ID is authorized to modify the policy by determining authority associated with the cryptographic ID from the team linear sequence. Usually only administrators are allowed to modify the policy, and the processor can check whether the cryptographic user ID has a role of an administrator or a user. If the cryptographic user ID has the role of a user, the processor can refuse to verify the block. Upon determining that the cryptographic user ID is authorized, the processor can create a policy block specifying the modification and can append the policy block defining the modification to the end of the team linear sequence.

Once the processor defines the team, the processor can define a space within the team, which has a subset of the team members that can privately share encrypted data. The space membership can be the same as the team membership or can be smaller than the team membership. The space is a virtual compartment defining encrypted data and access to the encrypted data. The space can include the encrypted data using a cryptographic key known only to the members of the space.

To define the space the processor can represent the members and the encrypted data by creating a space linear sequence. For efficiency, the space linear sequence can be subdivided into multiple linear sequences. For example, the space linear sequence can be subdivided into an authority linear sequence, and the encrypted data linear sequence. The authority linear sequence can define a role within the space of the cryptographic user ID. The cryptographic user ID is a member of the space and the role is consistent with the policy defined in the one or more policy blocks of the team. The encrypted data linear sequence can record operations performed on the encrypted data such as addition, deletion or modification of at least a portion of the encrypted data.

The encrypted data can include multiple types of encrypted data such as files, emails, messages, etc. The processor can create a linear sequence for each of the encrypted data types. So, instead of creating one encrypted data linear sequence, the processor can create a linear sequence for the files, a linear sequence for the emails and a linear sequence for the messages.

By creating a separate linear sequences for authority and for each type of encrypted data, the processor can speed up the computation of authority because to compute the authority, the processor need only examine the linear sequence of blocks containing data pertaining to authority, as opposed to examining linear sequence containing authority blocks as well as encrypted data blocks. Assuming that there are as many authority blocks as encrypted data blocks, by splitting up the space linear list into the authority linear list and encrypted data linear list, the processor can speed up the computation of authority by a factor of two. Similarly, the processor can speed up retrieval of encrypted data by approximately a factor of 2, because to retrieve the encrypted data, the processor need only examine the encrypted data linear sequence, as opposed to linear sequence containing both encrypted data blocks and the authority blocks.

The processor can revoke membership of a cryptographic user ID associated with the space. When membership is revoked, the cryptographic user ID must be prevented from accessing and encrypted data shared within the space after the revocation of cryptographic user IDs membership. To prevent the cryptographic user ID from accessing encrypted data added to the space after the revocation, the processor can generate a cryptographic session key unknown to the cryptographic user ID whose membership has been revoked, and can encrypt the encrypted data added to the space after the revocation using the cryptographic session key. The data contained in space prior to the revocation can also be encrypted using the new cryptographic session key.

The new cryptographic session key can be an AES key computed using the following 4 steps. In step 1, the AES key can be computed using elliptic curve algorithm such as P-384. In step 2, the remaining group of devices is computed from the space linear sequence, for example, the authority linear sequence within the space. In step 3, the AES key is encrypted using a public device key of each device still in the space, and the encrypted AES key is distributed to each device within the space. Each device can decrypt encrypted AES key because each device knows its own private device key. Since no other devices know the private-key of the device, no eavesdroppers can decrypt the encrypted AES key. In step 4, a message encrypted using the AES key can be distributed to the devices within the space to ensure that everybody can decrypt the message.

In some instances, such as described in FIG. 11 C, the computation of the session key can include an additional step performed before step 3, in which the computation of the session key also includes a cryptographic hash of the last block in the space linear sequence, such as the authority linear sequence of the space. Specifically, once the AES key is computed in step 1, to generate the final key an additional step of combining the AES key and the cryptographic hash of the last block can be performed. The combination can be computed using the HKDF cryptographic function which takes his arguments the AES key and the cryptographic hash of the last block to produce the final key. The final key is then encrypted and distributed to all the devices.

In addition to computing the new session key once a member is removed from the list, the new session key can be computed when a new member is added, and the intent is to prevent the member from accessing the encrypted data shared within the space prior to the member joining.

The processor can enable a linear ordering of the team linear sequence in the space linear sequence by establishing a temporal relationship between multiple team blocks belonging to the team linear sequence and multiple space blocks belonging to the space linear sequence, as explained in FIG. 3. There can be various types of temporal relationships, such as a space block can be bound to a team block immediately preceding the space block, or the space block can be bound to a team block immediately succeeding the space block, etc. Establishing the linear order is important in authority computation as well as auditing.

For example, to determine the authority, reference needs to be made to the current policy defined in the team space at a time prior to the addition of the block. In another example, when performing auditing of the linear sequences, to determine whether a block was correctly added to a space linear sequence, the current authority needs to be computed which can be partially defined on the team linear sequence. To determine the current policy, a linear order of the blocks within the space linear sequence and the team linear sequence needs to be determined, so that the authority recorded in the team list prior to addition of a block can be computed.

Consequently, every time a block is added to the space linear sequence, the block is bound to the team linear sequence to determine the linear order between the team linear sequence and the space linear sequence. The linear order between two space linear sequences does not need to be established because the authority within the one space linear sequence does not affect the authority within the other space linear sequence.

Figure 13:
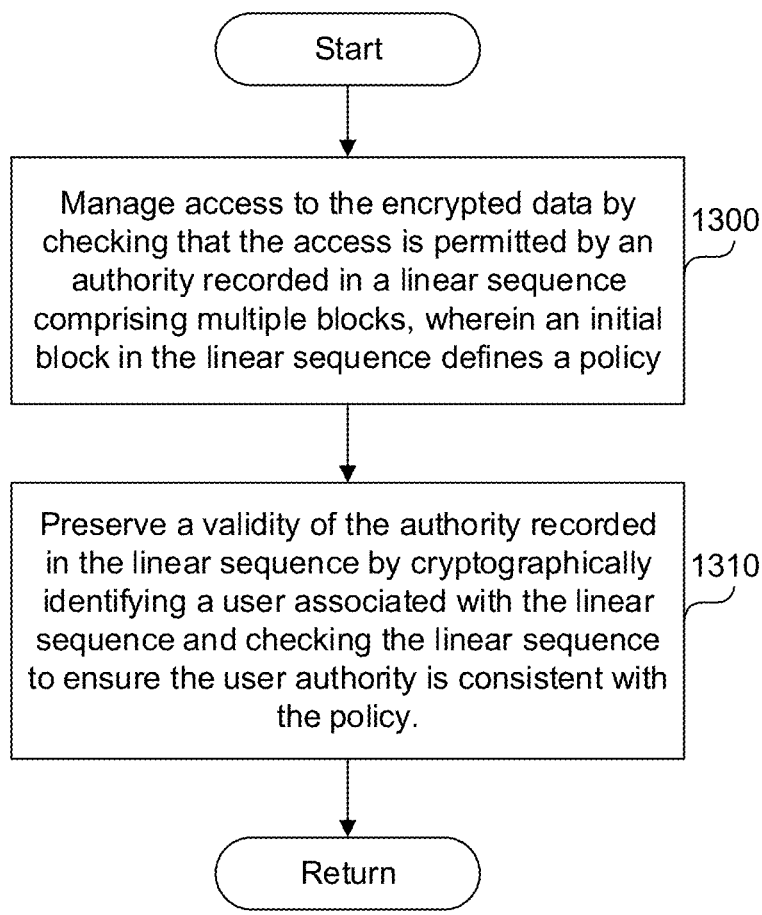
FIG. 13 is a flowchart of a method to manage access to encrypted data using a distributed ledger.

FIG. 13 is a flowchart of a method to manage access to encrypted data using a distributed ledger. In step 1300, a processor can manage access to the encrypted data by checking that the access is permitted by an authority recorded in a linear sequence including multiple blocks arranged, where an initial block in the linear sequence defines a policy specifying a role and an authority associated with the role.

In step 1310, the processor can preserve a validity of the authority recorded in the linear sequence by cryptographically identifying a user associated with the linear sequence, thus preventing an authorized user from accessing the linear sequence. Prior to adding a block associated with a user authority to the multiple blocks, the processor can check the linear sequence to ensure the user authority is consistent with the policy. Upon ensuring that the user authority is consistent with the policy, the processor can add the block associated with the user authority to the multiple blocks.

The processor can determine a user role associated with the user, an authority associated with the user role and can ensure the user authority associated with the block is within the limits of the authority associated with the user role.

For example, a block to be added to the sequence can request a modification of the policy. Prior to adding the block to the sequence, the processor can check whether the policy permits verification, and what role can modify the policy. For example, the policy can state that the policy can be modified but that only an administrator can modify the policy. If that is the case, the processor can check whether the user requesting modification is an administrator or not.

To prevent unauthorized access to the data by a compromised central server, the processor can distribute a linear sequence to multiple devices associated with multiple users, wherein each device in the multiple devices is cryptographically authenticated by a user in the multiple users. The determination whether to add a block to the linear sequence can be made independently by each of the devices, instead of being made by the central server, which creates a single point of failure.

The processor can authenticate each user using a cryptographic user ID, which can be a public-key generated using an asymmetric cryptographic algorithm. The cryptographic user ID can be a string of 2,048 bits. The asymmetric cryptographic algorithm can be RSA or DH, and can generate two keys, a public-key and a private-key. The processor can provide a first key (i.e., the private-key) in the asymmetric cryptographic key pair only to the user, and the cryptographic user ID (i.e., the public-key) in the asymmetric cryptographic key pair to multiple users into the whole system. The processor can use the public-key is a way to identify the user throughout the system. As a result, the user can assume different names in different teams or spaces, and the various names can be tied to one cryptographic user ID.

For example, to verify the user's identity, the processor can receive a text message and the text message can be signed using a private-key of the user. To verify the user's identity, the processor can use the user's public-key (i.e., the cryptographic user ID) to reverse the signing process. The processor can then compare the text message and the message obtained by reversing the signing process. If the text message and the message obtained by reversing the signing process are an exact match, the processor can verify the user's identity. Otherwise, the processor cannot verify the user's identity.

For efficiency purposes, the processor can create a team. To create a team the processor can obtain multiple cryptographic user IDs identifying multiple users. The processor can create the linear sequence including the multiple blocks arranged in the linear sequence, where the initial block in the linear sequence defines the policy specifying the role and the authority associated with the role, and where a block in the multiple blocks defines a role associated with a cryptographic user ID in the multiple cryptographic user IDs identifying a user in the multiple users.

To create a space within the team, the processor does not have to search all the cryptographic IDs in the system and can only search the cryptographic IDs contained in the team, thus preserving CPU cycles. For example, if a team contains 10 users, the whole system contains tens of thousands of users, the number of processor cycles used to create the space is reduced by approximately 1,000. The space can contain a subset of the cryptographic user IDs of the team. The space can include the data encrypted using a cryptographic key known only to the members of the space. The space can include a space linear sequence representing the members and the encrypted data.

As explained in this application, the space linear sequence can contain two or more sub-sequences for efficiency reasons. The space linear sequence can include an authority linear sequence containing blocks modifying the authority within the system, such as adding or removing users and/or administrators. Encrypted data linear sequence can include the linear sequence adding, deleting, and modifying encrypted data within the system. Encrypted data linear sequence can be further subdivided into multiple linear sequences depending on the type of the encrypted data, such as files and/or messages.

The team linear sequence, the space linear sequences, and the encrypted data can be stored in a memory configured to be continuously available to one or more computers over a network, such as the central server. So, in case most of the devices within the space are off-line, a device in the space can request encrypted data and/or can add a block to the space ordered sequence from the central server.

Figure 14:
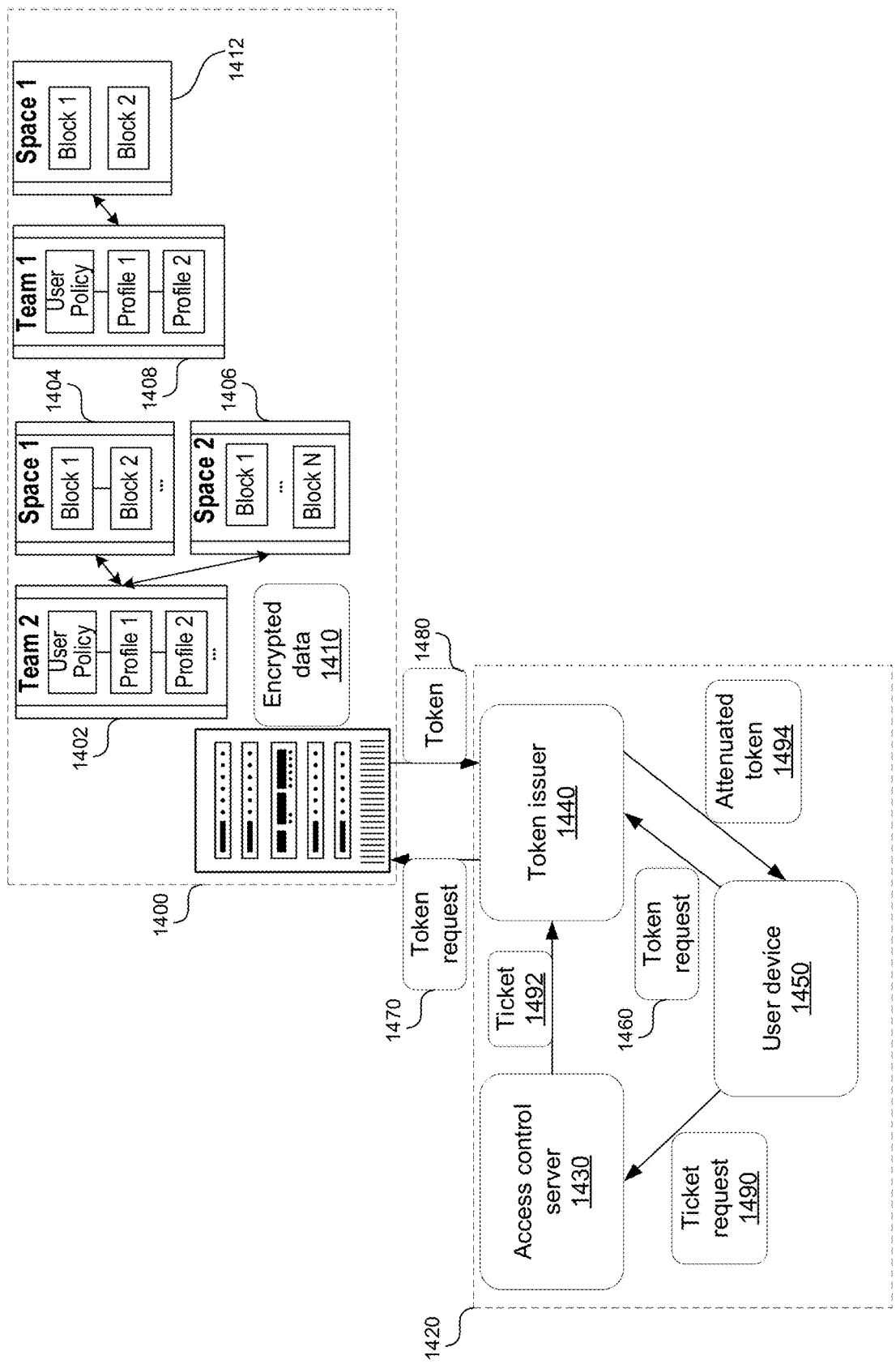
FIG. 14 shows how the secure file system can be integrated into an enterprise information technology (IT) infrastructure, according to one embodiment.

Integration of a Block Chain Managing Group Authority and Access in an Enterprise Environment FIG. 14 shows how the secure file system can be integrated into an enterprise information technology (IT) infrastructure, according to one embodiment. The server 1400 can store encrypted data 1410, which can include confidential data such as the file system, emails, instant messages, etc. The server 1400 can also store the block chains 1402, 1404, 1406, 1408, 1412 which can represent a team linear sequence or a space linear sequence, as described in this application. A block chain is a growing list of records, called blocks, that are linked using cryptography. Each block contains a cryptographic hash of the previous block, for example, 826 in FIG. 8, and data, for example, 812, 814, 816, 822, 824 in FIG. 8. A block can also include a timestamp, for example, 260, 270, 280, 290 in FIG. 2.

The block chains 1402, 1404, 1406, 1408, 1412 can record authority associated with a cryptographic user ID, as explained in this application. The block chains 1402, 1404, 1406, 1408, 1412 can be stored in plain text, and the server 1400 can control access to the block chains 1402, 1404, 1406, 1408, 1412 by allowing access to the plain text only to authorized requesters. To authorize a requester, the server 1400 can issue and manage tokens, as explained below.

The system 1420 can be implemented on customer premises, as part of an enterprise IT infrastructure. The system 1420 can include an access control server 1430, a token issuer 1440 and a user device 1450.

The access control server 1430 can control the user device's 1450 access to web applications, services and/or files running on the enterprise infrastructure by granting or denying permission to the user device 1450 based on a set of enterprise policies. The access control server 1430 can run various software such as, Microsoft® Active Directory, or Apple® Open Directory.

The token issuer 1440 can act as middleware between the access control server 1430, the user device 1450 and the server 1400. The token issuer 1440 can receive a token request 1460 from the user device 1450 requesting access to a portion of the block chain 1402, 1404, 1406, 1408, 1412. The token request 1460 can include a cryptographic user ID associated with the user making the request, and a specification of the portion of the block chain 1402, 1404, 1406, 1408, 1412 being requested. For example, the token request 1460 can include the cryptographic user ID in the form of an alphanumeric string, such as "9EDaleMN9CUy1V7VSYyAUTkfEGC7MUDMkugmXV VsM7Z5r01Wpg," and an identification of a team block chain 1402, 1408 or a space block chain 1404, 1406, 1412.

The token issuer 1440 can send a request 1470 for a token from the server 1400 granting permission to the user device 1450 to access the specified portion of the block chain. The token request 1470 can include the cryptographic user ID and the identification of the team block chain 1402, 1408 or the space block chain 1404, 1406, 1412 contained in the token request 1460.

Upon receiving the token request 1470, the server 1400 can compute whether the cryptographic user ID has the authority to access the requested portion of the block chain 1402, 1404, 1406, 1408, 1412 based on the membership information stored in the block chain 1402, 1404, 1406, 1408, 1412. For example, if the cryptographic user ID requests access to space block chain 1404, the server 1400 can check whether the cryptographic user ID is a member of the space block chain 1404. If the cryptographic user ID is a member of the space, the server 1400 can determine that the cryptographic user ID has the necessary authority and can issue a token 1480. Otherwise, the server 1400 can determine the cryptographic user ID is not authorized to access the space block chain 1404 and can refuse to issue the token 1480.

The token 1480 can grant unlimited read access to the requested portion of the block chain, such as the space block chain 1404. In other words, whenever the server 1400 and/or the token issuer 1440 receive the token 1480 from any source, the server 1400 does not perform the authority computation described above, and immediately grants access to the portion of the block chain specified in the token 1480, such as the space block chain 1404. Effectively, the token 1480 creates an efficiency gain by allowing the server 1400 to not perform the expensive computation of calculating authority every time the cryptographic user ID requests access to the space block chain 1404. Instead, the token 1480 allows the server 1400 to perform a less expensive calculation of simply verifying the token 1480, as described below.

Before passing the token 1480 to the user device 1450, the token issuer 1440 can check with the enterprise access control server 1430 for what kind of permissions the user device 1450 has regarding the space block chain 1404. To perform the check, the user device 1450 can send a ticket request 1490 to the access control server 1430. The ticket request 1490 can contain the access control server user identification, such as the user's login ID and the user's password. The user's login ID and the user's password used to identify the user to the access control server 1430 are different from the cryptographic user ID used to identify the user to the server 1400.

Upon verifying the user's identification, such as the login ID and the password, the access control server 1430 can check a permission that the user has according to the company policy and send the ticket 1492, including the permission, to the token issuer 1440. For example, the company policy can specify that while the user is on vacation, the user does not have access to email. Consequently, the permission can specify various restrictions such as "the user is allowed access only when the user is at a particular location, such as inside the company building," "the user is allowed access only during a particular time," and/or "the user is only allowed access when the user device 1450 is connected to a particular network," such as the company network.

The token issuer 1440 can incorporate the permissions specified in the ticket 1492 into the token 1480 to obtain an attenuated token. The permissions specified in the ticket 1492 may not increase the permissions granted by the token 1480 but can either leave the permissions unchanged or attenuate, that is, reduce, the permissions granted by the token 1480.

In addition, the token issuer 1440 can add additional restrictions to an attenuated token, such as when the attenuated token expires (e.g., within 3 or 5 minutes), location restrictions, Internet address restrictions, etc. The additional restrictions can be added to the attenuated token to produce the attenuated token 1494, which is sent to the user device 1450.

The user device 1450 can request to be added to a team block chain 1402, 1408. To be added to the team, the user device 1450 can authenticate itself with the access control server 1430, which can send the ticket 1492 authenticating the user, to the token issuer 1440. In addition, the token issuer 1440 can authenticate the user with the server 1400 by asking the server to compute the authority stored in the team block chain 1402, 1408 for the cryptographic user ID associated with the user. If both the access control server 1430 and the server 1400 authorize the user, the user can be added to the team block chain 1402, 1408.

Even if the access control server 1430 is controlled by an adversary, because the access control server 1430 cannot increase the permissions granted by the token 1480, the adversary would still only have the authority that is in the block chain 1402, 1404, 1406, 1408, 1412 and granted by the token 1480. If the adversary controls the token issuer 1440, the adversary can only control tokens 1480 for the teams that the token issuer 1440 has received from the server. In both cases, the adversary would only be able to read the plain text data, and not the encrypted data 1410. Further, the adversary would not be able to modify the plain text data.

The token issuer 1440 can receive an indication of how much the access control server 1430 is trusted. If the access control server 1430 is not trusted, the token 1494 can be issued or a user can be added to a team 1, 2 without involving the access control server 1430.

Figure 15:
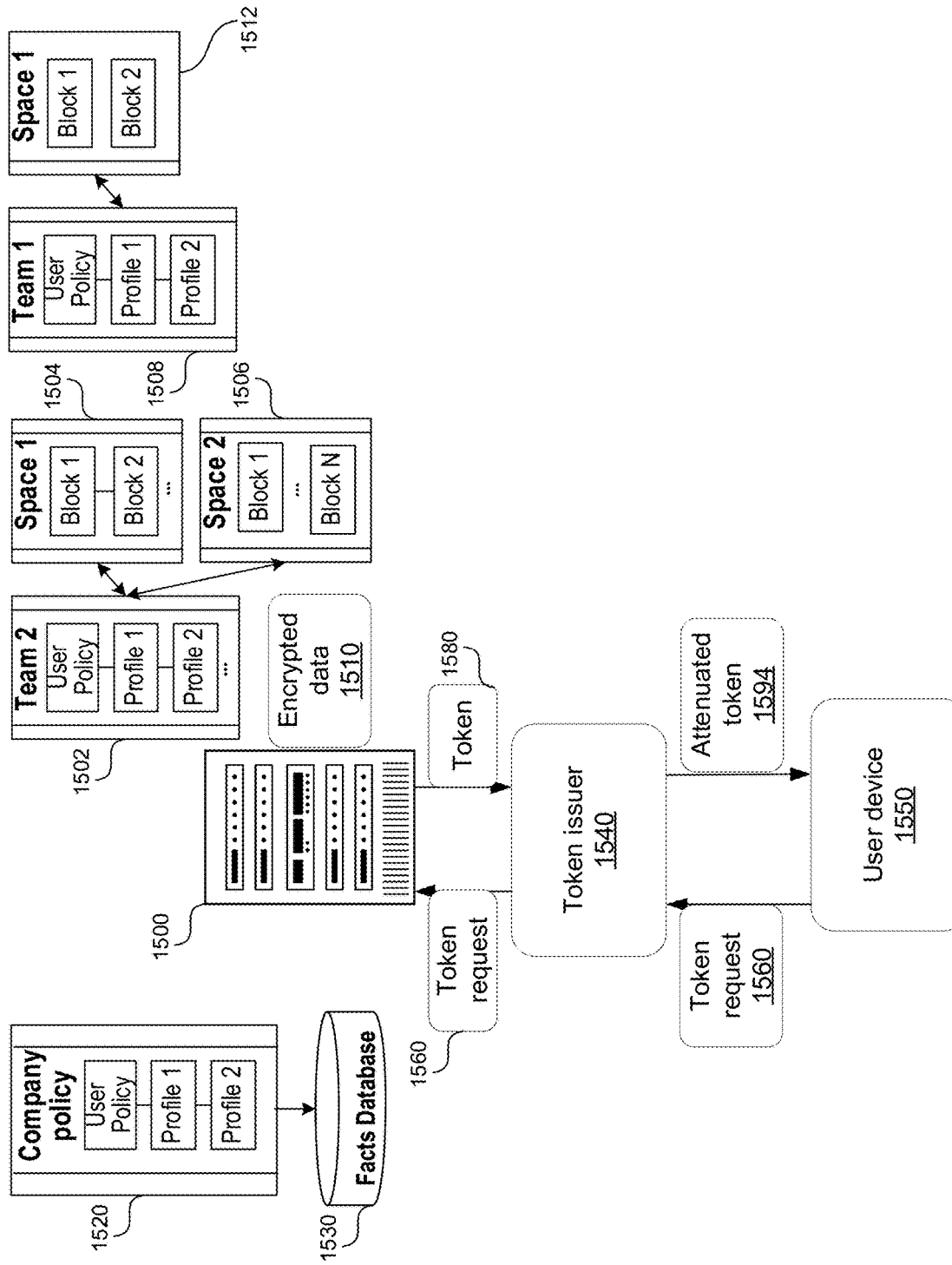
FIG. 15 shows how the secure file system can be integrated into an enterprise IT infrastructure, according to another embodiment.

FIG. 15 shows how the secure file system can be integrated into an enterprise IT infrastructure, according to another embodiment. The access to the block chain 1502, 1504, 1506, 1512 can be managed without the access control server 1430 in FIG. 14. The company policy implemented by the access control server 1430 can be recorded on a block chain 1520, or can be part of a fact database 1530. The block chain 1520 and the fact database 1530 can exist independently of a team 1, 2 or a space 1, 2. The server 1500 and the token issuer 1540 can be part of the enterprise IT infrastructure, and/or can be provided as a cloud service. Removing the access control server 1430 reduces a number of potential security issues and allows the system to function even if the access control server 1430 is not trusted.

When a user device 1550 requests a token using the token request 1560, the token issuer can forward the token request 1560 to the server 1500. The token request 1560 can contain the cryptographic user ID and an identification of a portion of the block chain 1502, 1504, 1506, 1508, 1512 to which the access is being requested. For example, the identification of the portion of the block chain can identify the team block chain 1508.

The server 1500 can compute the authority of the cryptographic user ID recorded in the team block chain 1508, to determine whether the cryptographic user ID is a member of the team. If the cryptographic user ID is not a member of the team, the server 1500 can refuse to send a token to the token issuer 1540. If the cryptographic user ID is a member of the team, the server 1500 can check the facts database 1530 and/or the company policy block chain 1520 to determine whether the company policy puts any restrictions on the access of the cryptographic user ID. In this case, a single cryptographic user ID can be used to check both the permissions associated with the server 1500 and permissions associated with the company policy, as opposed to requiring separate authentication, as explained in FIG. 14.

The server 1500 can send a message 1580 to the token issuer 1540. The message 1580 can include a token granting unrestricted read access to the team block chain 1508, and permissions associated with the company policy. The token issuer 1540 can create the attenuated token 1594 by combining the token and the permissions associated with the company policy and forward the attenuated token 1594 to the user device 1550.

The user device 1550 may want to further attenuate the attenuated token 1594 to grant a permission to a third party to access the team block chain 1508. To do so, the user device 1550 can send a request to the token issuer 1540 containing the attenuated token 1594 and the additional permission imposed on the attenuated token, for example a temporal permission. The token issuer 1540 can incorporate the additional permission into the attenuated token 1594, and issue a new token to send to the user device 1550, which the user device 1550 can forward to the third party.

Clock

Figure 16A:
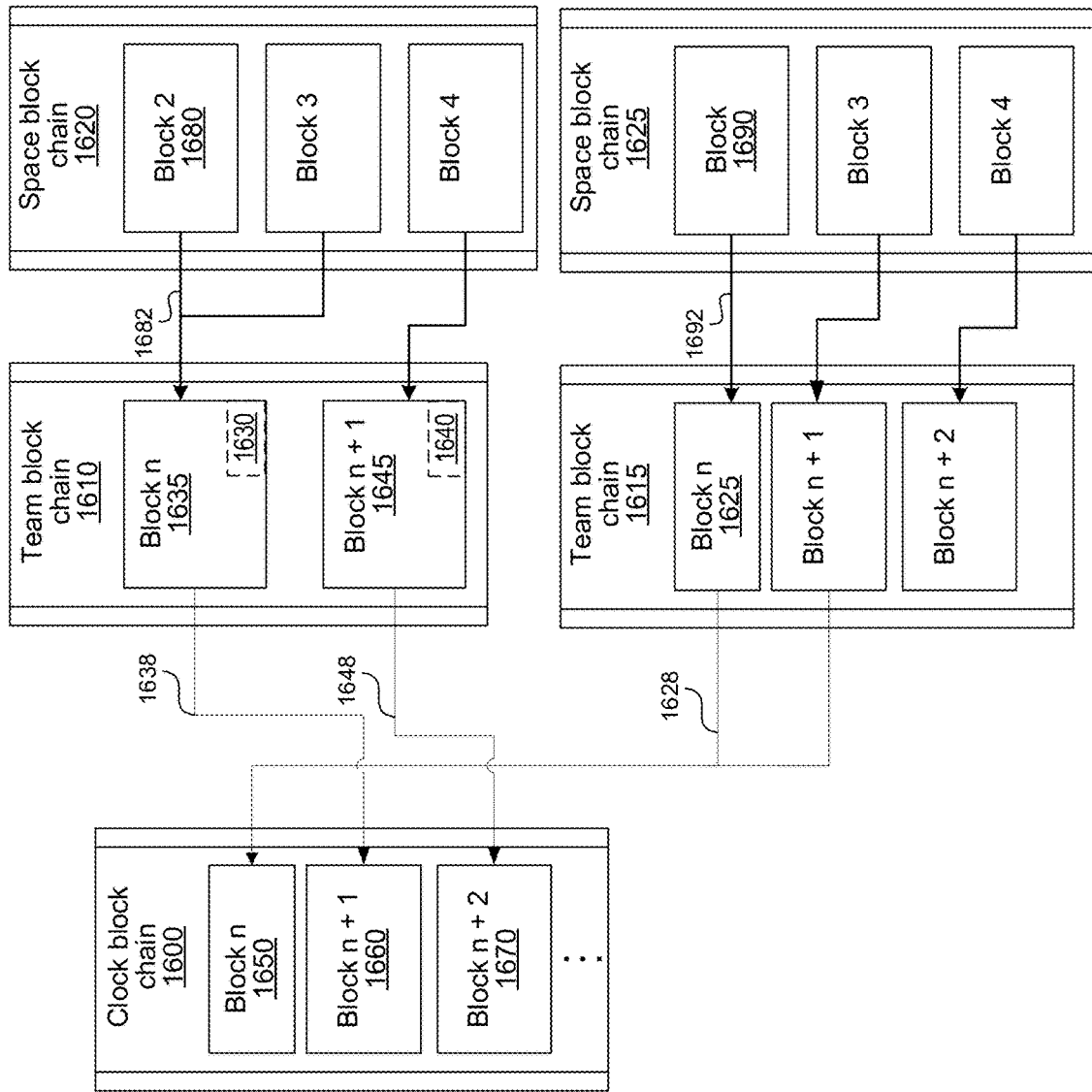
FIG. 16A shows how a clock can be implemented using a block chain.

FIG. 16A shows how a clock can be implemented using a block chain. To incorporate the temporal permission, discussed in FIG. 15, a processor can create an always increasing clock, as explained for example in FIG. 2, where each block 1635, 1645 (only two labeled for brevity) in the block chain 1610, 1615, 1620, 1625 is time stamped, such that optional timestamps 1630, 1640 within the blocks 1635, 1645 are always increasing.

The temporal permission in a token can be expressed in terms of the timestamps, such as, the token is valid 5 minutes after the timestamp 1630. So, if the timestamp 1640 is more than 5 minutes after the timestamp 1630, a token holder is not allowed read access to the block 1645. The blocks 1635, 1645 can be ordered within the team and the sequence but may not be able to be ordered between two different teams or two different sequences. The timestamps 1630, 1640 can be placed within the header of the block 1635, 1645, respectively.

Instead, or in addition, the clock can be implemented using the block chain 1600. The clock block chain 1600 can include blocks 1650, 1660, 1670, etc., each representing a tick of the clock, such as 1 second, 1 minute, 5 minutes, half an hour, an hour. The frequency of the blocks 1650, 1660, 1670 can be related to the computational resources of the enterprise. The higher the computational resources, the more frequent the block 1650, 1660, 1670, and the lower the computational resources the less frequent the blocks 1650, 1660, 1670.

Each block 1625, 1635, 1645 (only three labeled for brevity) in team block chain 1610, 1615 can have a binding 1628, 1638, 1648, respectively, to a corresponding block 1650, 1660, 1670 in the clock block chain 1600. For example, the team block 1625 has a binding 1628 to the block 1650, meaning that the team block 1625 was created after the creation of the block 1650, and before the creation of the block 1660.

The blocks 1680, 1690 (only two labeled for brevity) in the space block chains 1620, 1625 can have a binding 1682, 1692, respectively, to a corresponding block 1635, 1625 to the team block chains 1610, 1615. For example, the binding 1682 indicates that the block 1680 is created after the block 1635, but before the block 1645.

Consequently, each block 1680, 1690 in the space block chains 1620, 1625 is bound to the corresponding block in the team block chains 1610, 1615, and indirectly to the block 1650, 1660, 1670 in the clock block chain 1600. For example, based on the bindings shown in FIG. 16A, block 1690 is created after block 1650, but before block 1660.

The temporal permission in a token can be expressed in terms of the clock block chain 1600, block 1650, 1660, 1670, or in terms of a wall clock. The clock block chain 1600 can correspond to the wall clock, with the constraint that the blocks 1650, 1660, 1670 in the clock block chain 1600 are always increasing.

For example, when the temporal permission is formulated in terms of the wall clock, the temporal permission can state that the token is valid until Dec. 1, 2020. The first block 1650, 1660, 1670 that has a timestamp after the specified date designates the time at which, and after which, the token is no longer valid. All the blocks bound to the first block designating such time are not accessible to the token holder.

In another example, when the temporal permission is formulated in terms of the block 1650, 1660, 1670, the temporal permission can state that the token is valid for 1 ½ hours after block 1650. The first block 1660, 1670 that has a timestamp after the specified time designates the time at which, and after which, the token is no longer valid. All the blocks bound to the first block designating such time are not accessible to the token holder.

Figure 16B:
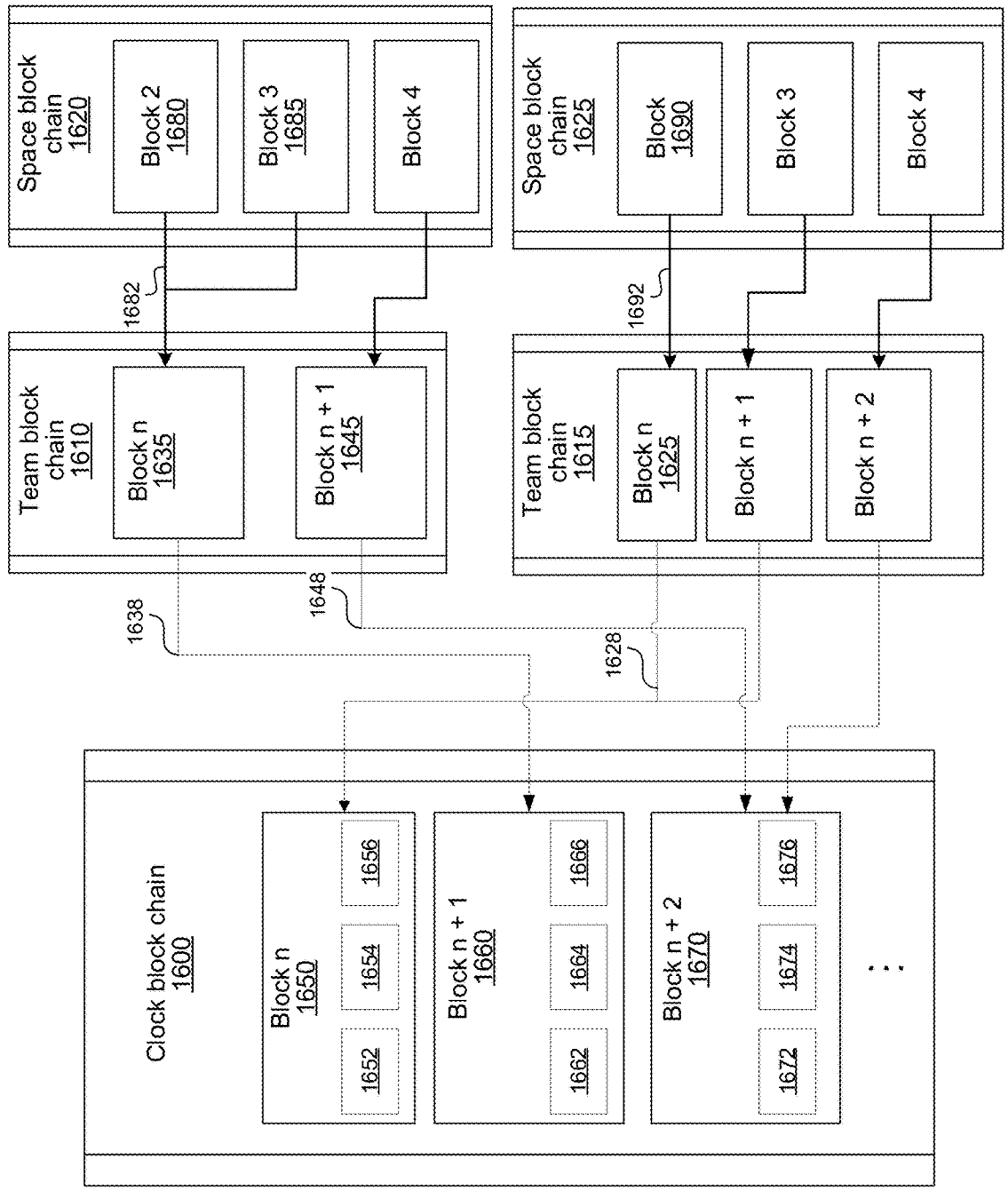
FIG. 16B shows contents of a clock block chain.

FIG. 16B shows contents of a clock block chain. The block 1650, 1660, 1670 of the clock block chain 1600 can contain several fields including a wall clock field 1652, 1662, 1672, sequence clock field 1654, 1664, 1674 and a root of cryptographic hash tree field 1656, 1666, 1676.

The wall clock field 1652, 1662, 1672 can be a record of the time indicated by a clock of a server storing the clock block chain 1600. The wall clock fields 1652, 1662, 1672 do not have to be always increasing, so the fields 1652, 1662 can have the same value, or the field 1672 can indicate a time before the time indicated by field 1652.

The sequence clock 1654, 1664, 1674 is always increasing. The sequence clock can be indicated by multiple servers that are measuring and agreeing on the current time. The multiple servers provide redundancy, so that if one server fails, the clock block chain 1600 can continue measuring time. The current time agreed upon has the property of being greater than the previous current time. The current time can be the latest time measured by the multiple servers, or it can be a time that the most servers agree on, as long as the current time is greater than the previously agreed-upon current time.

The root of cryptographic hash tree field 1656, 1666, 1676 can be a Merkle root, and can include the cryptographic hash of all the most recent blocks in the block chains bound to the block 1650, 1660, 1670. For example, the cryptographic hash tree field 1662 can contain the cryptographic hash of block 1635 and block 1685. The reason to provide a root of the cryptographic hash tree, instead of a list of all the most recent blocks, can be to preserve bandwidth and storage resources because communicating and storing the root is less expensive than communicating and storing the list of all the blocks. Another reason can be to keep the list of all the blocks secret, by only providing the root from which, with some additional information, the list of all the blocks can be calculated.

Figure 17:
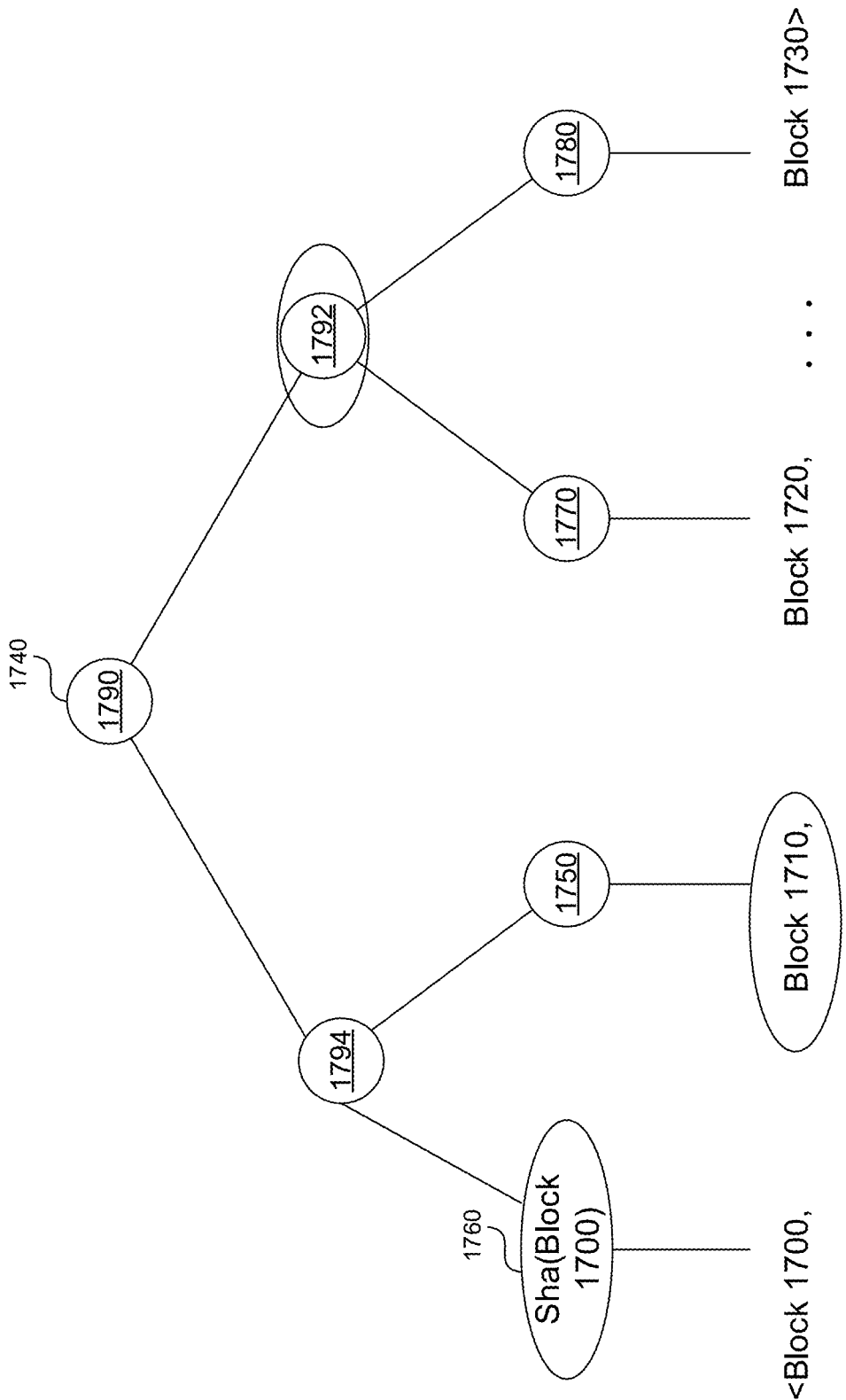
FIG. 17 shows a cryptographic tree.

FIG. 17 shows a cryptographic tree. The endpoints represent block 1700, 1710, 1720, 1730 that are all of the most recent blocks in the block chains bound to a block in the clock block chain 1600 in FIG. 16. The cryptographic tree 1740 is constructed by, at each node, computing a cryptographic hash such as SHA of the child nodes. For example, node 1750 is computed by computing the cryptographic hash of block 1710, while the node 1792 is computed by computing the cryptographic hash of nodes 1770, 1780. Finally, the root 1790 is computed by computing the cryptographic hash of the nodes 1792, 1794.

The root 1790 can be stored in the clock block chain 1600. The value of the root 1790 is unique to the sequence of blocks 1700, 1710, 1720, 1730 that generated the cryptographic tree 1740. Storing a single value, such as root 1790, in the clock block chain 1600 preserves bandwidth and storage space compared to storing the value of all the blocks 1700, 1710, 1720, 1730. Further, storing the root 1790 does not disclose all the blocks 1700, 1710, 1720, 1730 used in constructing the cryptographic tree 1740.

To check whether a block is part of the cryptographic tree 1740, only a subset of all the elements in the cryptographic tree 1740 needs to be supplied. For example, if there are N endpoints, that is, N blocks used in constructing the cryptographic tree 1740, only log (N) elements need to be supplied to check whether the root 1790 contains a particular element.

In a more specific example, to check whether block 1710 is a member of root 1790, only the block 1710 and nodes 1760, 1792 need to be supplied. Once supplied, the value of the node 1750 can be computed from the value of block 1710. The value of the node 1794 can be computed from the value of the nodes 1750 and 1760, but, for example, by computing SHA(node 1760, node 1750). The root node can be computed from the values of nodes 1794 and 1792. If the so computed root node matches the root 1790 stored in the clock block chain 1600, the membership of the block 1710 in the cryptographic tree 1740 can be confirmed.

Token

Figure 18:
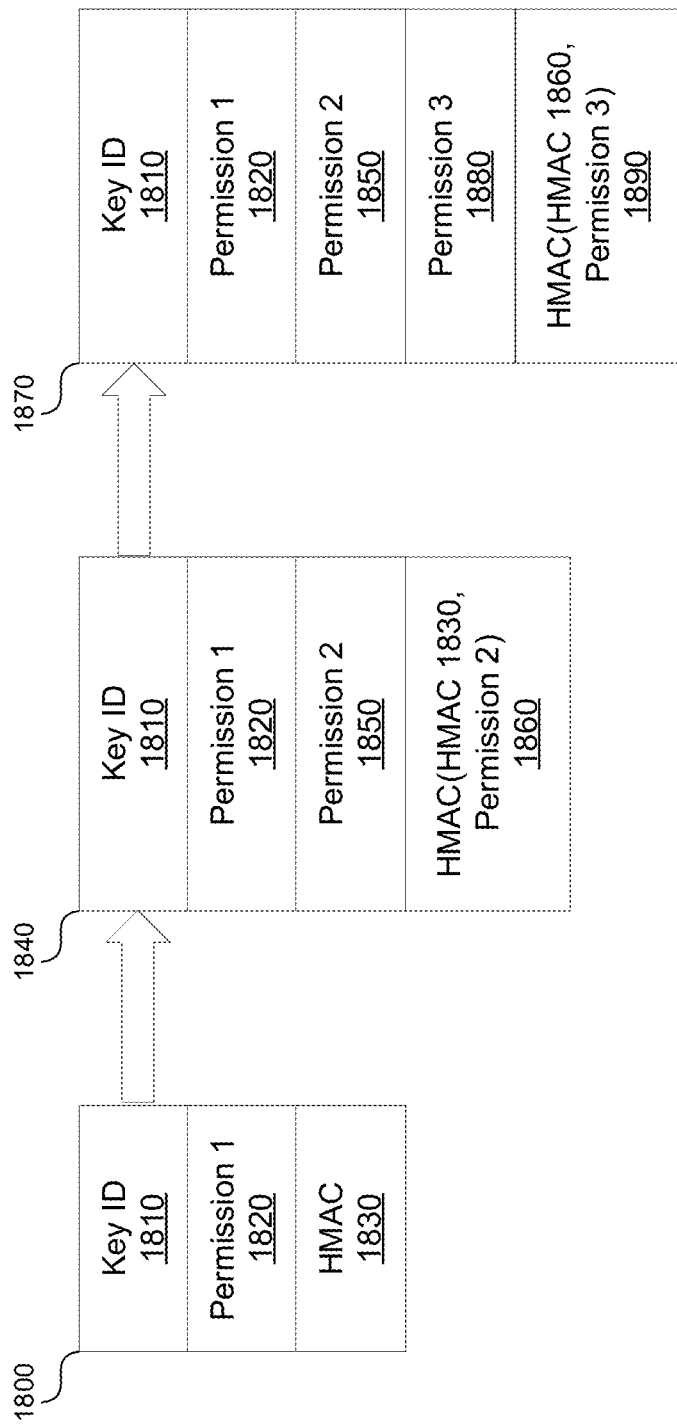
FIG. 18 shows anatomy of a token.

FIG. 18 shows the anatomy of a token. The token 1800 can be the token 1480 in FIG. 14, 1580 in FIG. 15, granted by a first authority source, such as the server 1400 in FIG. 14, 1500 in FIG. 15 storing the authority-defining block chains 1402, 1404, 1406, 1408, 1412 in FIG. 14, 1502, 1504, 1506, 1508, 1512 in FIG. 15.

The token 1800 can include a key identifier (ID) 1810 identifying a secret root key, a permission 1820 and a cryptographic hash 1830 of the permission 1820 and the secret root key. The secret root key can be known to the server 1400, 1500 and/or to the token issuer 1440 in FIG. 14, 1540 in FIG. 15. Using the key identifier 1810, the server 1400, 1500 and/or the token issuer 1440, 1540 can retrieve the secret root key. The cryptographic hash 1830 can be HMAC, sometimes expanded as either a keyed-hash message authentication code or a hash-based message authentication code. HMAC can be used to simultaneously verify both the data integrity and the authenticity of a message, as with any MAC. Any cryptographic hash function, such as SHA-256 or SHA-3, may be used in the calculation of an HMAC. As with all cryptographic hashes, the cryptographic hash 1830 is not reversible, meaning given the output of the cryptographic hash 1830, determining the inputs into the cryptographic hash is not computationally feasible.

The token 1800, with an addition of a second permission 1850, can change to become an attenuated token 1840. The attenuated token 1840 can be the token 1494 in FIG. 14, 1594 in FIG. 15. The second permission 1850 can be granted by a second authority source such as the access control server 1430 in FIG. 14 or the company policy recorded in the block chain 1520 in FIG. 15. The token 1800 can contain any number of permissions, which are also called constraints or caveats.

To obtain an attenuated token 1840, the server 1400, 1500 can add the second permission 1850 to the token 1840, compute a second cryptographic hash 1860 of the first cryptographic hash 1830 and the second permission 1850 and remove the first cryptographic hash 1830 from the token, thereby obtaining the attenuated token 1840.

The second permission 1850 is interpreted to only decrease the first permission 1820. By removing the cryptographic hash 1830 from the first token, token 1840 is created where the first permission 1820 is limited by the second permission 1850. Because the cryptographic hash 1860 is not reversible, an attacker cannot guess the cryptographic hash 1830, and the token 1840 is secure. Consequently, the largest authority is granted by the original token 1800, having only one permission 1820.

For example, the first permission 1820 can specify the cryptographic user ID is being granted access to read metadata associated with block chains 1402, 1404, 1408, 1412, 1502, 1504, 1508, 1512. The second permission 1850 can specify a team block chain, such as team block chain 1402, 1408, 1502, 1508, to which the cryptographic user ID has access. Additional permissions can be added to the attenuated token 1840 to make an even more attenuated token 1870.

In one embodiment, the attenuated token 1870 can be generated upon request by a user device. For example, a third permission 1880 can specify a space block chain 1404, 1406, 1412, 1504, 1506, 1512 within the team block chain 1402, 1408, 1502, 1508 to which the cryptographic user ID can have access. A third cryptographic hash 1890 can be included in the attenuated token 1870, or the cryptographic hash 1890 can be a cryptographic hash of the cryptographic hash 1860 and the third permission 1880. The cryptographic hash 1860 can be removed from the token 1870.

In another embodiment, the user device can grant the attenuated token 1870 to a third party. For example, the third party can have a proprietary video processing algorithm, and the attenuated token 1870 can grant access to a video that the user device has access to. The reason for granting the access to the third party can be that a third party has access to a faster network connection than the user device. The attenuated token 1870 can contain a third permission 1880 specifying the video to which the attenuated token 1870 grants access.

To request the video, the third party can send the attenuated token 1870 to the server 1400, 1500 and/or to the token issuer 1440, 1540. The server can verify the token, as explained below, using the secret root key, and can grant access to the video to the third party.

Figure 19:
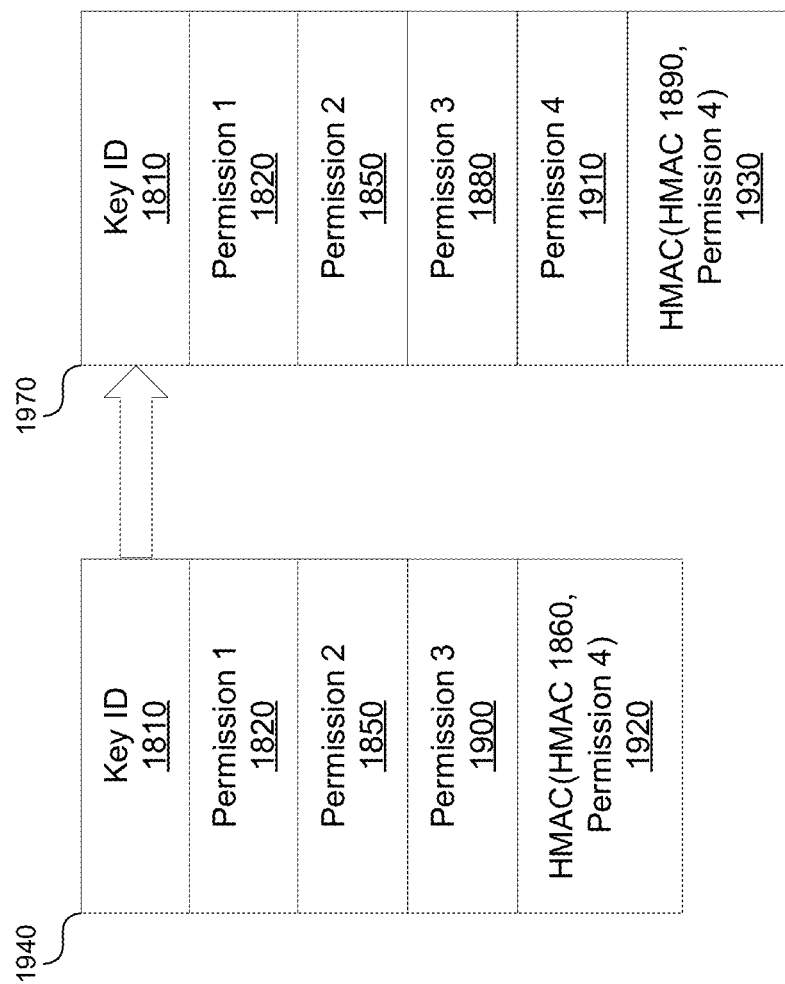
FIG. 19 shows a token preventing a replay attack.

FIG. 19 shows a token preventing a replay attack. To prevent an attacker from performing a replay attack by obtaining the token, and providing a copy of the token to the token issuer 1440 in FIG. 14, 1540 in FIG. 15, and/or the server 1400 in FIG. 14, 1500 in FIG. 15, the attenuated tokens 1840, 1870 in FIG. 18 can include a single use permission 1900, 1910 to obtain attenuated tokens 1940, 1970. The cryptographic hash 1920 can be a cryptographic hash of the cryptographic hash 1860 in FIG. 18 and the third permission 1900, while the cryptographic hash 1930 can be a cryptographic hash of the cryptographic hash 1890 in FIG. 18 and the fourth permission 1910. If the tokens 1940, 1970 are intercepted on request, replaying the token 1940, 1970 does not grant any access to the attacker because the tokens 1940, 1970 are not valid after the one request is satisfied.

Recovery Key

Figure 20:
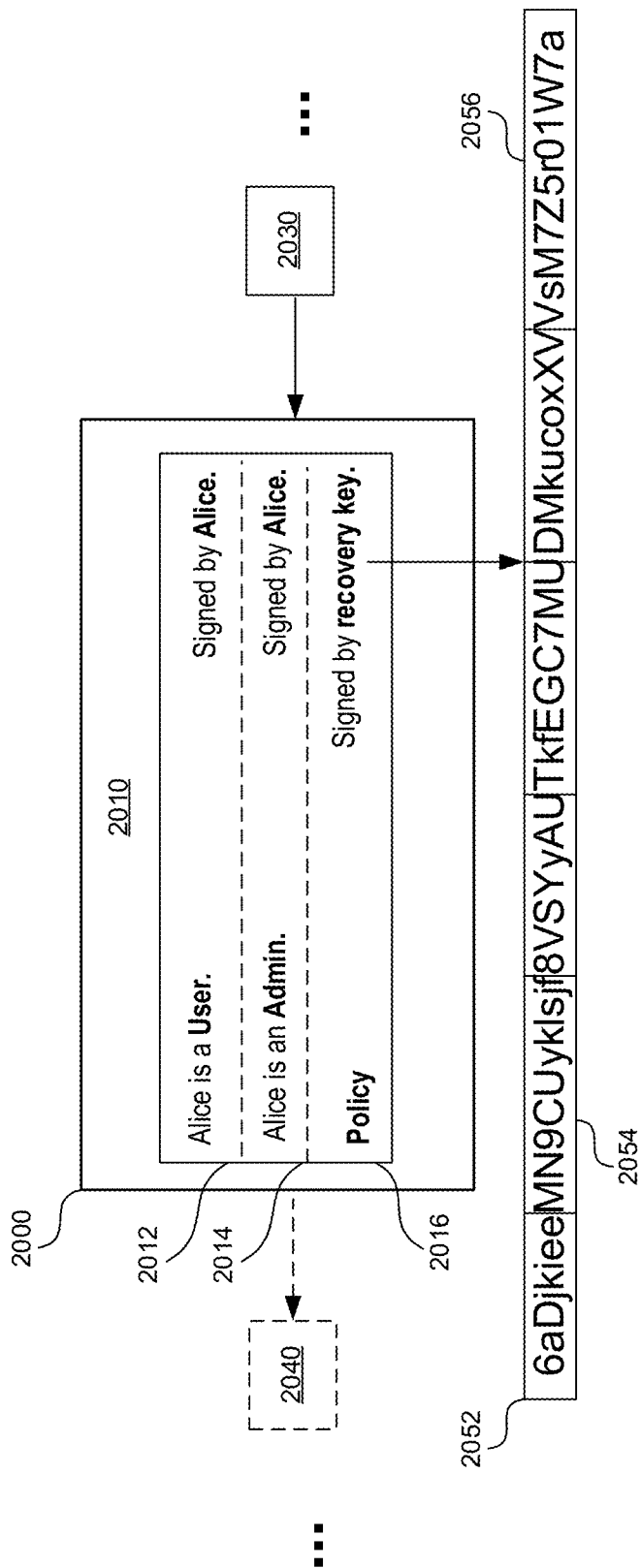
FIG. 20 shows how a recovery key can be used.

FIG. 20 shows how a recovery key can be used. Block chain 2000 can contain block 2010. Block 2010 can be the initial block of the block chain 2000, or it can be any other block in the block chain 2000. Block 2010 can contain multiple events 2012, 2014, 2016. Most of the events in the block chain 2000, like events 2012 and 2014, are signed by a public key of a user entering the event, such as Alice. However, an event, such as the event 2016, can be signed by a recovery key 2050.

The recovery key 2050 is a special key that circumvents entire authority and policy computation. Before a processor even determines whether the policy authorizes the event 2016, the processor can determine whether the event is signed by the recovery key 2050. If the event is signed with the recovery key 2050, the processor determines that the event is allowed regardless of authority and policy. Thus, the recovery key 2050 overrides the entire authority and policy.

The recovery key 2050 needs to be protected extremely well. Consequently, the recovery key 2050 can be split into multiple parts 2052, 2054, 2056 (only three labeled for brevity), such as 30 parts. The different parts 2052, 2054, 2056 can be put in different safe places, such as different HSMs, each having different operating procedures. The different parts 2052, 2054, 2056 can be encrypted, and one person can have a password to store the key parts 2052, 2054, 2056 in a file, and a different person can have a password to retrieve the key parts 2052, 2054, 2056 from the file. The assembly of the recovery key 2050 can require the participation of all, or at least a majority of, devices and users having parts of the 2052, 2054, 2056 of the recovery key 2050, thereby safeguarding accidental use of the recovery key 2050.

The existence and the use of the recovery key 2050 can be optional. The recovery key can be set to a predetermined value, such as all zeros, which indicates to the processor that the recovery key 2050 has not been generated and does not exist. The processor can ignore any event signed by the recovery key 2050 set to the predetermined value.

Split Key

Figure 21:
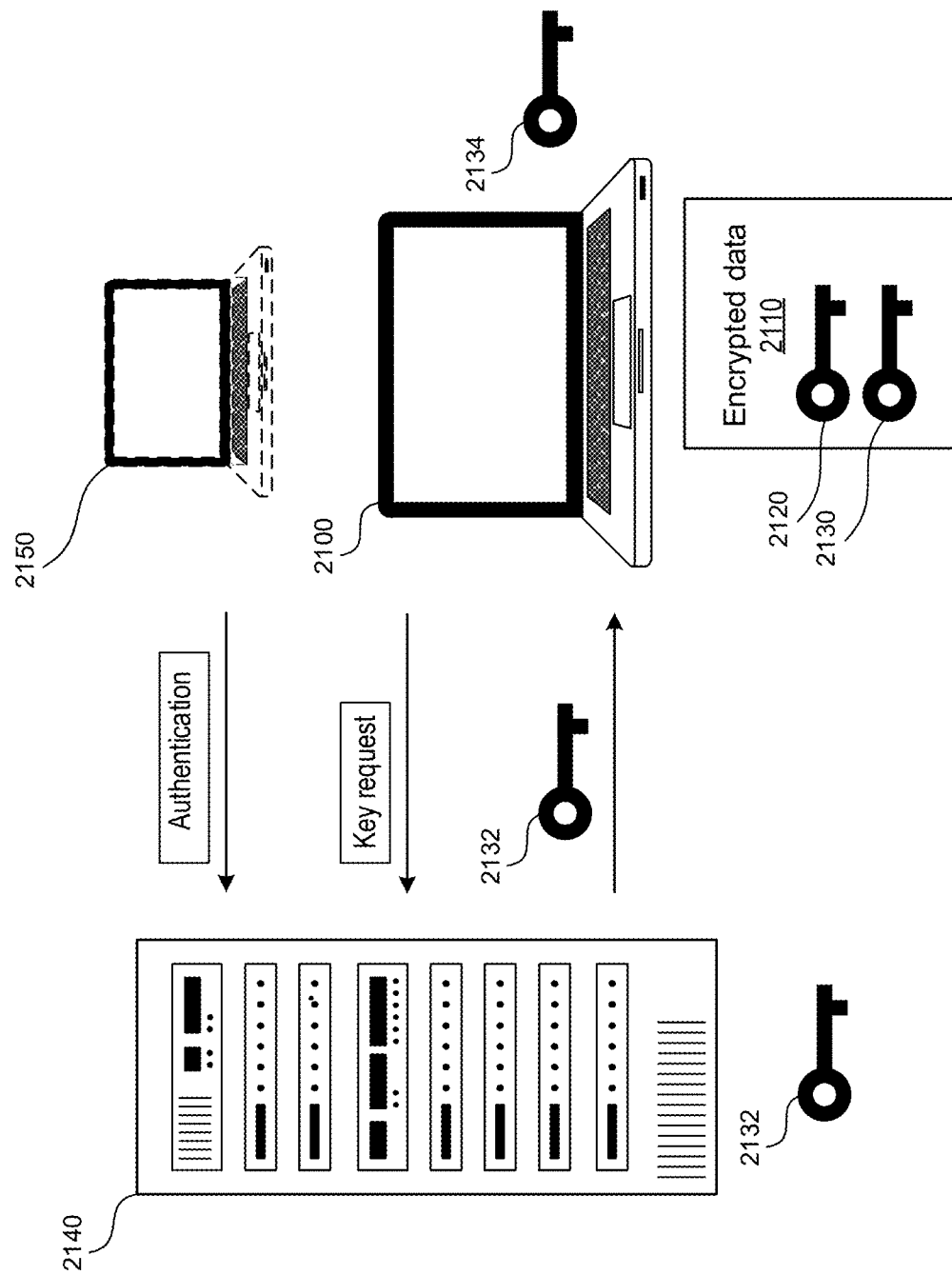
FIG. 21 shows a split key system limiting an attack to the encrypted data when a user device is compromised.

FIG. 21 shows a split key system limiting an attack to the encrypted data when a user device is compromised. The user device 2100 can store data 2110 encrypted using multiple keys, such as a channel session key 2120, as described in this application, as well as a split key 2130. The split key 2130 can be separated into at least two parts 2132, 2134. The first key part 2132 can be stored on the server 2140, while the second key part 2134 can be stored on the user device 2100.

To encrypt data, the user device 2100 can request the first key part 2132 from the server 2140. Upon receiving the first key part 2132, the user device 2100 can calculate a key derivation function (KDF) that is a combination of the first key part 2132 and the second key part 2134 to obtain the split key 2130 with which to encrypt the data. Similarly, to decrypt the encrypted data 2110, the user device 2100 can request the first key part 2132 from the server 2140 and calculate the split key 2130 using the KDF, which is a combination of the first key part 2132 and the second key part 2134.

Once the user device 2100 calculates the split key 2130, the user device 2100 can forget the first key part 2132 based on a predetermined rule. The predetermined rule can state that for every time the user device 2100 is suspended and/or rebooted, the first key part 2132 is forgotten; for every three files that are opened using the split key 2130, the first key part 2132 is forgotten; for every time the application associated with the key derivation function is closed, the first key part 2132 is forgotten; for every time a geolocation and/or an IP address of the user device 2100 is outside of a predefined space, the first key part 2132 is forgotten; etc.

Because the user device 2100 forgets the first key part 2132 based on the predetermined rule, the server 2140 can revoke access to the user device 2100. For example, if the server 2140 is notified that the user device 2100 has been compromised, such as by being stolen and/or hacked by an attacker, the server 2140 can record that the request for the first key part 2132 from the user device 2100 should be refused. The next time the user device 2100 requests the first key part 2132, the server 2140 can refuse to provide the first key part 2132. Consequently, the encrypted data 2110 remains encrypted on the user device 2100 and is not available to the attacker.

To increase security of the first key part 2132, the server 2140 can require a multifactor authentication before providing the first key part 2132. For example, the server 2140 can require a second device 2150 to provide an authentication to the server 2140. Once the server 2140 receives the authentication from the second device 2150, the server 2140 can provide the first key part 2132 to the user device 2100.

System Updates

Figure 22:
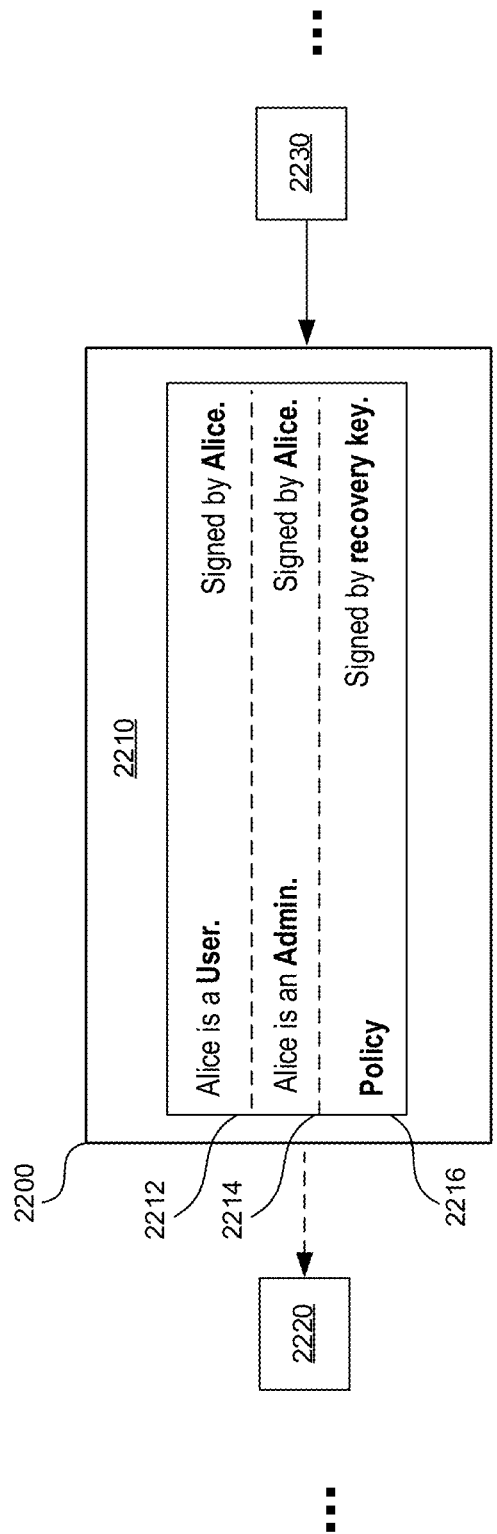
FIG. 22 shows an update to the interpretation of the semantics of a block chain.

FIG. 22 shows an update to the interpretation of the semantics of a block chain. The block chain 2200 can contain blocks 2210, 2220, 2230, etc. Rules for interpreting the semantics of the block chain 2200 can be coded in the blocks 2210, 2220, 2230, and can be represented as a source code in a programming language such as Rust, Python, Go, or a proprietary language. Updating interpretation of the semantics of the block chain 2200 (including authority, policy, etc.) can happen in the block chain 2200.

For example, the block 2210 can contain source code updating how to interpret the blocks 2230, subsequent to the block 2210. By putting the semantics in the block chain 2200, every instance of the system, spread across multiple clients and containing different block chains, can update the local rules for interpreting the semantics of the block chain when they receive the block 2210. So, blocks 2220 preceding the block 2210 are interpreted according to a first set of rules, while the blocks 2230 subsequent to the block 2210 are interpreted according to the second set of rules established by the block 2210.

For example, the rules for interpreting the semantics of the block chain 2200 can govern how race conditions are resolved. Such rules can be specified in system policy 530 in FIG. 5, user policy 540 in FIG. 5 or application policy 550 in FIG. 5. Consequently, the block 2210 can update system 530, user 540, and/or application 550 policy.

To prevent introducing a bug into the rules for interpreting the semantics of the block chain 2200, the policy engine 530, 540, 550 can be formally verified. Formal verification is the act of proving the correctness of the policy 530, 540, 550 with respect to a certain formal specification or property, using formal methods of mathematics. The formal verification can provide assurance that there are no bugs in the policy 530, 540, 550.

Flow Diagrams

Figure 23:
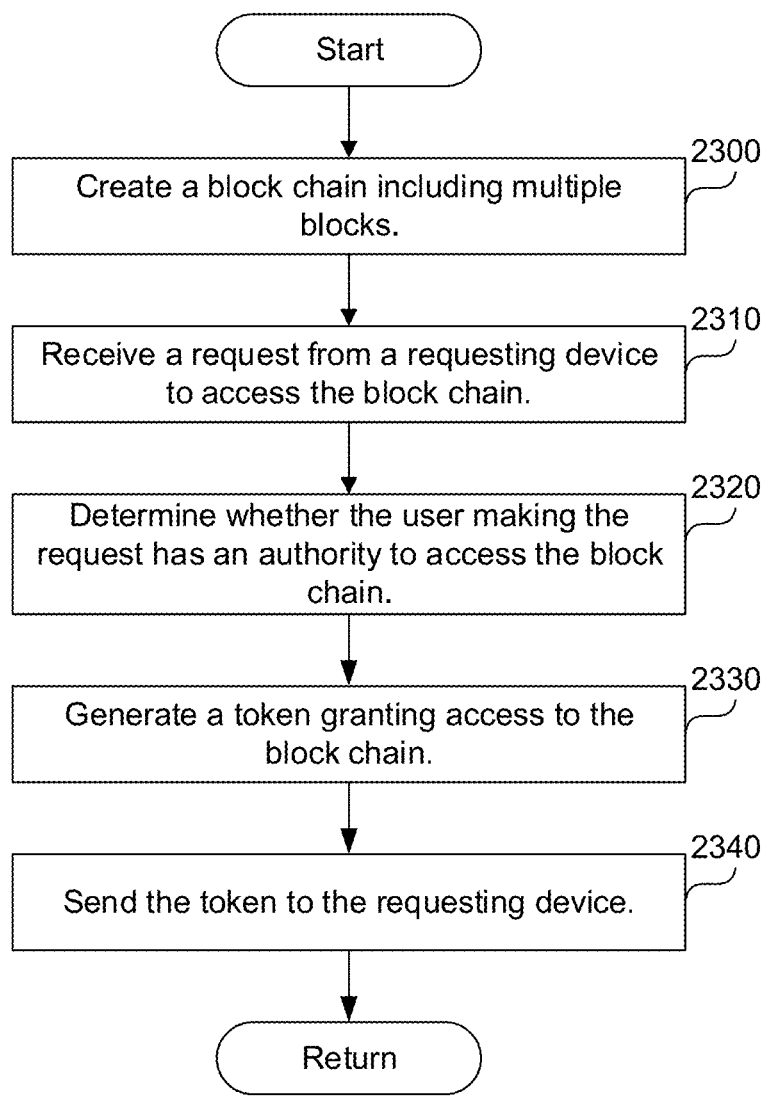
FIG. 23 is a flowchart of a method to generate a token providing authorization credentials.

FIG. 23 is a flowchart of a method to generate a token providing authorization credentials. In step 2300, a processor can create a block chain including multiple blocks by creating a block defining an authority of the user in appending the block to the end of the block chain. The block can include a cryptographic user ID identifying the user and an authority associated with the cryptographic user ID. The authority can define at least an operation associated with the cryptographic user ID to perform on the block chain. For example, the operation can include read access, write access, and/or read/write access to the block chain and/or to an encrypted data associated with the block chain. The block chain may not be encrypted.

In step 2310, the processor can receive a request from a requesting device to access the block chain. The request can include a cryptographic user ID associated with the user making the request, where the cryptographic user ID can be authorized by the block chain to perform certain operations. The requesting device can be a user device.

In step 2320, the processor can determine whether the user making the request has an authority to access the block chain by computing the authority recorded in the block chain including checking the block chain from an initial block to a last block. Performing the authority computation can be expensive.

In step 2330, the processor can generate a token granting access to the block chain to the user making the request upon determining that the user making the request has the authority to access the block chain. The token can be a certificate that proves the processor has done the expensive operation of, for example, computing the authority on the block chain, or checking the user's password. So, the next time the processor receives the token, the processor does not have to perform the expensive operation, and instead can check the token, which can be a cheaper operation than, for example, computing the authority in the block chain. In step 2340, the processor can send the token to the requesting device.

The token can include a message and an HMAC taking two arguments, namely, the message and a secret root key, as explained in this application. For example, the message can be a permission identifying the user authorized to access the block chain.

In one embodiment, when the user wants to read the block chain, the user can send a signed message providing the cryptographic user ID and identifying a portion of the block chain, such as a team and/or a space, that the user wants to read. A processor having access to the block chain can check the public key associated with the cryptographic user ID, the signature and the fact database to confirm that the cryptographic user ID has the permission to access the requested team and/or space. If the processor does not make the confirmation, the processor can deny access to the user. If the processor confirms that the user has authority to access the team and/or the space, the processor can create a token including the cryptographic user and an indication of the requested team and/or space. The token can grant a read permission to the cryptographic user ID.

To generate the token, the processor can create a key identifier identifying a secret root key. The key identifier can be implemented as an index into a database associated with the server. The secret root key can be further protected using public-key or secret-key encryption. The processor can create a permission to the block chain granted by the token, such as the user ID or the team and/or the space ID. Further, the processor can create a cryptographic hash of the secret root key and the permission. The cryptographic hash can be an HMAC. The processor can add the key identifier, the permission and the cryptographic hash to the token. The token can give read permission to the team and/or the space.

To determine whether the user making the request has the authority to act as the block chain, the processor can determine whether the request is signed with a recovery key without computing the authority recorded in the block chain. As explained in this application, the recovery key can override the authority recorded in the block chain. The processor can generate a second token granting unlimited access to the block chain to the user making the request upon determining that the request is signed with the recovery key.

To prevent attackers from gaining access to the recovery key, the recovery key can be separated into multiple parts, where each part is encrypted using a different secret encryption key, and each encrypted part is distributed among multiple devices such as HSMs.

To prevent attackers from gaining access to the system by compromising an endpoint, for example, a user device, the encrypted data can be additionally encrypted with a split key. The split key can be separated into two parts, the first part that is stored on a server, and the second part that is stored on the user device. To decrypt encrypted data, the user device has to request the first part of the split key, that is, the first cryptographic key, from the server. Upon receiving the request for the first cryptographic key, the server can determine whether the user device is permitted to receive the first cryptographic key.

For example, the user device can be reported as stolen and consequently not permitted to receive the first cryptographic key. The server can refuse to send the first cryptographic key upon determining that the user device is not permitted to receive the first cryptographic key. If the user device receives the cryptographic key, the user device can compute a key derivation function which is a combination of the first and the second cryptographic keys, such as HMAC, to obtain a key which can be used in decrypting the encrypted data.

The software updates to the computation of authority and/or policy stored in the block chain can be stored, themselves, in the block chain. The server can receive an update regarding an interpretation of semantics of the block chain. The server can ensure consistency of the interpretation of the semantics of the block chain across multiple user devices by storing the update within the block chain.

Figure 24:
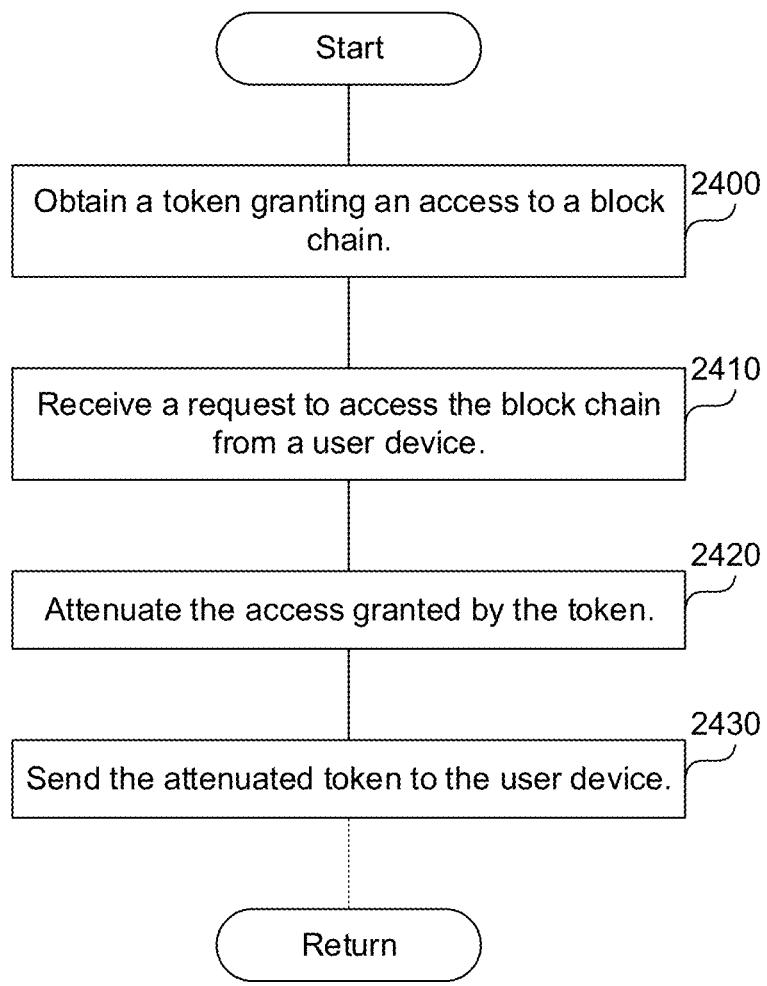
FIG. 24 is a flowchart of a method to create an attenuated token.

FIG. 24 is a flowchart of a method to create an attenuated token. In step 2400, a processor can obtain a token granting an access to a block chain. The access to the block chain can be permitted by a first authority source defined by the block chain. In other words, the first authority source can be the block chain recording authority and policy, itself. The token can include a key identifier identifying a secret root key, a first permission to access the block chain authorized by the first authority source and a first cryptographic hash of the secret root key and the permission. Access to the block chain can be granted based on whether the requester has read access to the encrypted data, or membership in the requested team and/or space.

The first permission can include a cryptographic user ID to whom the first permission is granted, and an identification of at least a portion of the block chain to which the cryptographic user ID has access, such as the team or space. The first permission can include an operation permitted to be performed by the cryptographic user ID, or the permitted operation may not be included and can be assumed that operation is read-only.

In step 2410, the processor can receive a request to access the block chain from a requesting device, with a second permission from a second authority source limiting access associated with the requesting device. The second authority source can be an access control server such as an active directory. The access control server can be part of an enterprise IT system.

The second permission can include a time limitation or a geolocation limitation. For example, the second permission can specify a time window within which the axis is permitted, or a geolocation within which access is permitted. In a more specific example, if the user leaves the building, access to the block chain can be revoked. The second permission can also include an Internet address limitation, for example, permitting access to the requesting device as long as the Internet protocol (IP) address of the requesting device is within a specified IP address range.

In step 2420, the processor can attenuate the access granted by the token by adding the second permission from the enterprise to the token, computing a second cryptographic hash of the first cryptographic hash and the second permission, and removing the first cryptographic hash from the token, thereby obtaining an attenuated token. The first permission and the second permission obtained from the first authority source and the second authority source, respectively, can be translated into multiple permissions and entries in the token and the attenuated token. In step 2430, the processor can send the attenuated token to the requesting device such as the user device.

To obtain the token, the processor can compute the authority stored in the block chain. The block chain can include multiple blocks wherein a block in the block chain defines an authority of a cryptographic user ID. The authority can define at least an operation associated with the cryptographic user ID to perform on the block chain. To determine whether the user making the request has an authority to access the block chain, the processor can compute the authority recorded in the block chain including checking the block chain from an initial block to a last block. The processor can generate the token granting access to the block chain to the user making the request upon determining that the user making the request has the authority to access the block chain.

The processor can grant access to the block chain upon receiving a valid token. The processor can receive a request to access a portion of the block chain and the attenuated token. The processor can obtain the secret root key using the key ID stored within the attenuated token. The processor can calculate the cryptographic hash of the secret root key and the first permission to obtain a third cryptographic hash. The processor can calculate the cryptographic hash of the third cryptographic hash and the second permission to obtain a fourth cryptographic hash. The processor can determine whether the second cryptographic hash included in the attenuated token matches the fourth cryptographic hash by comparing the second cryptographic hash included in the attenuated token and the fourth cryptographic hash. Upon determining that the second cryptographic hash included in the attenuated token and the fourth cryptographic hash match, the processor can grant the request to access the portion of the block chain. If the second cryptographic hash and the fourth cryptographic hash do not match, the processor can refuse to grant the request because the attenuated token is not valid.

The attenuated token can be attenuated further by adding additional permissions, that is, constraints or caveats, to the attenuated token. For example, the attenuated token holder may want to delegate a portion of his access to the block chain to a third party. Consequently, the attenuated token holder can request a creation of an additional attenuated token granting a portion of the access to the third party. For example, the token holder can specify specific blocks within the team to which the third party can have access.

To create an even further attenuated token, the processor can receive the attenuated token and a request for a third permission. In one embodiment, the processor can determine whether the third permission is authorized by the first permission and the second permission. For example, the first permission and the second permission may grant access to team 1 user Alice, while the third permission can request access to team 2. The processor can determine user Alice does not have access to team 2 and can refuse to create the attenuated token. In another example, upon determining that the third permission is authorized by the first permission and the second permission, the processor can create a second attenuated token by computing the cryptographic hash of the second cryptographic hash and the third permission, deleting the second cryptographic hash from the attenuated token, adding the third permission to the attenuated token, and adding the third cryptographic hash to the attenuated token, thereby creating the second attenuated token.

In another embodiment, the processor does not determine the validity of the permissions, and instead only creates the attenuated token. The validity of the permissions can be determined at the time when the validity of the token is determined. If the third permission requests data not granted by the first and second permissions, a null response can be provided to the requester.

The processor can grant the token based on a recovery key. The processor can determine whether the user making the request for the token has an authority to access the block chain by determining whether the request is signed with the recovery key without computing the authority recorded in the block chain. The processor can generate a second token granting unlimited access to the block chain to the user making the request upon determining that the request is signed with the recovery key. As described in this application, the processor can break up the recovery key into multiple parts, such as 30 parts, encrypt each part, distribute the encrypted key parts to multiple devices, and require participation of at least the majority of the devices to assemble the recovery key from the multiple parts.

To guard against an attacker infiltrating the system by compromising the user device, the processor can implement a split key, where the first cryptographic key is stored on the server, and the second cryptographic key is stored in the user device. When the processor receives the request for the first cryptographic key from the user device, the processor can determine whether the user device is permitted to receive the first cryptographic key upon receiving the request. For example, if the user device is reported as stolen, the processor does not permit the user device to receive the first cryptographic key stored on the server. If the user device receives the cryptographic key, the user device can perform a KDF which is a combination of the first and the second cryptographic key, such as HMAC, to obtain a key which can be used in decrypting encrypted data.

The processor can receive an update regarding an interpretation of semantics of the block chain. The processor can ensure consistency of the interpretation of the semantics of the block chain across multiple user devices by storing the update within the block chain.

To enforce time sensitive permissions, such as time sensitive permissions stored in the token, the processor can create a clock block chain including multiple blocks. Each block among the multiple blocks can include a timestamp greater than a timestamp of a preceding block. The processor can create a temporal relation between a block in the block chain and a clock block in the clock block chain. For example, a link between the block and the clock block can indicate that the block has been created before the clock block, after the clock block, at the same time as the clock block, within specified time after and/or before the clock block, etc.

The processor can receive the token including a time-limited permission, and a request to access a portion of the block chain. The processor can determine whether the time-limited permission is authorized by the clock block chain associated with the requested portion of the block chain. The processor can refuse the request to access the portion of the block chain upon determining that the time-limited permission is not authorized by the clock block chain. For example, the latest block in the clock block chain can be past the time-limited permission, or the requested portion of block chain has been created outside of the time-limited permission window, etc.

Secure Orbit Communication

Introduction

The traditional approach to operating spacecraft involved one single party operating the craft, it's payload, and the ground network that supported it. This vertical integration allowed for the information security of the spacecraft to be built around the trust within an organization.

Technology has moved into an era where operators are using third party ground stations, even separating out the roles of spacecraft and payload operators. In this hybrid, multi-party, environment, security can no longer be based on trust. The integrity, confidentiality, and authority of commands and data can be implemented using controls which are near-impossible to circumvent for the ground station network and the operators of the spacecraft upon which the payloads ride.

The system disclosed herein provides tools to:
1. Secure the communications for the management of spacecraft and payloads, such that only authorized parties may command the assets.
2. Secure the communications for the management of spacecraft and payloads, such that only authorized parties may receive telemetry from the assets.
3. Secure the communications for observations made by payloads, such that only authorized parties may gain access to the contents.
4. Secure the management of spacecraft and payloads, such that authorized parties are granted the minimum privilege required for their duties.

It is essential that these features are delivered in such a way that the complexity of implementation and recourses required by the assets is minimized; thus, the system disclosed herein places lightweight requirements on the assets.

Additionally, the system disclosed herein works with existing mission planning, scheduling, and control solutions and integrates with the heritage solutions upon which the industry has come to rely. The disclosed system, including an OrbitSecure protocol, can be deployed into a customer's environment and can provide agile key management as a service for mission planning and Space C2 (C2) software. The OrbitSecure protocol is a cryptographic protocol, as described in this application, that ensures the integrity and confidentiality of mission data, command and control, and telemetry.

Multiple key control agents can be deployed to various segments of a Ground infrastructure. To provide forward deployed secure product distribution, client applications, such as CrossClave, can be deployed to end users. CrossClave application allows communication and data-sharing that is secured across any network with end-to-end encryption. An implementation of the OrbitSecure protocol can provide Multi-Key-per-Pass (MKP) solutions. More involved integrations with C2 and Mission Planning & Scheduling software can allow Multi-Key-per-Collect (MKC).

The OrbitSecure protocol provides a strong assurance of the authority, identity, integrity, and confidentiality of the space architecture data and systems entrusted to it. A flexible protocol, OrbitSecure is capable of integrating with older systems on-orbit for years, and new systems yet to launch.

Integration

The following sections outline multiple scenario types for both key scenarios and various integration opportunities for either Pre- or Post-Launch.

Pre-Launch Scenarios

In FIGS. 25-35, all blue assets are considered trusted; all yellow assets are considered untrusted, but have metadata access; and finally, all red assets are completely untrusted within the infrastructure.

Ground Station as a Service (GaaS) Use Case

Figure 25:
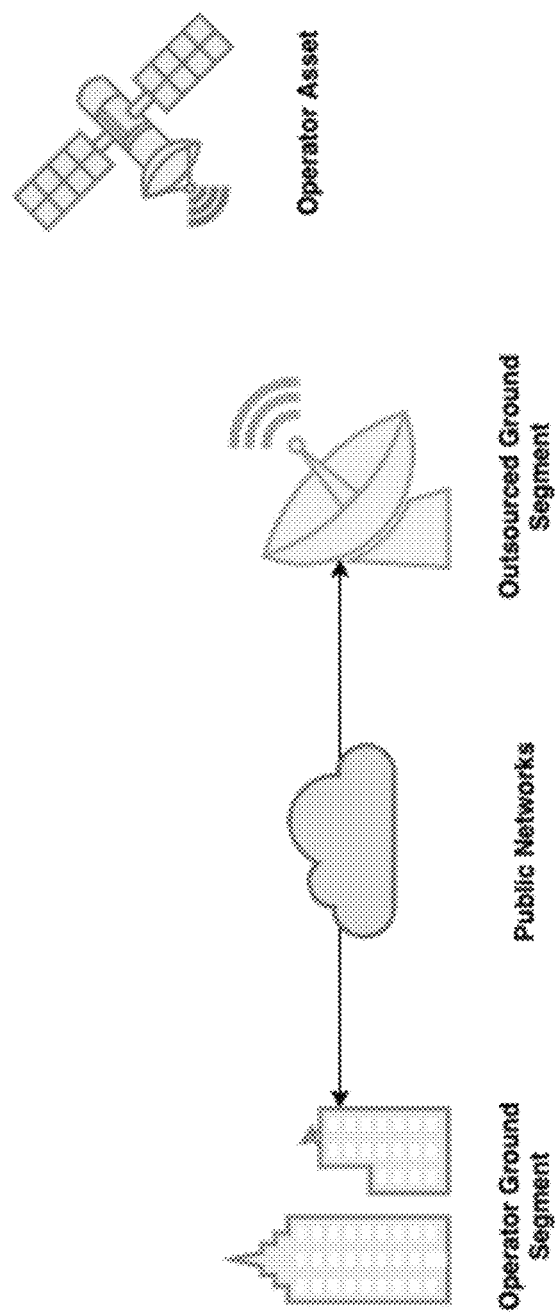
FIG. 25 shows a Ground Station as a Service (GaaS) use case.

FIG. 25 shows a GaaS use case. In the GaaS use case only the Operator's ground segment and their asset are fully trusted. The public networks used to reach the ground station are untrusted, and the ground station itself is trusted only to faithfully relay commands to the satellite, telemetry, and mission data back to the Operators Ground Segment. Telemetry is the collection of measurements and onboard instrument readings required to deduce the health and status of all of the subsystems on the Operator asset, such as the satellite. Mission data is the data relevant to the mission that the satellite has gathered. In the model we have three types of information:

1. Commands for the satellite.
2. Telemetry data from the satellite.
3. Mission data from the satellite.

In this protocol:

The Operator and Satellite have visibility into all types of data.

The public networks only know that there are encrypted communications between the Operator and Ground station provider.

The Ground station provider knows only how many commands were sent and the volume of telemetry and data but not the contents.

Keys are assigned to 4 unique entities: Operator Ground Segment, Processing Segment, Ground Antenna and Asset Operator. Ground creates two channels: (1) C2, and (2) Telemetry C2. Channel members include Operator Segment and Asset. Telemetry channel members include Operator, Antenna, and Asset. Processing creates two channels: (1) Full Payload, and (2) Metadata Only. "Full Payload" channel members are Processing and Asset. "Metadata Only" channel members are Processing, Asset, and Ground Segment. A channel a caries a type of data such as telemetry, mission data, etc.

Communications Use Case

Figure 26:
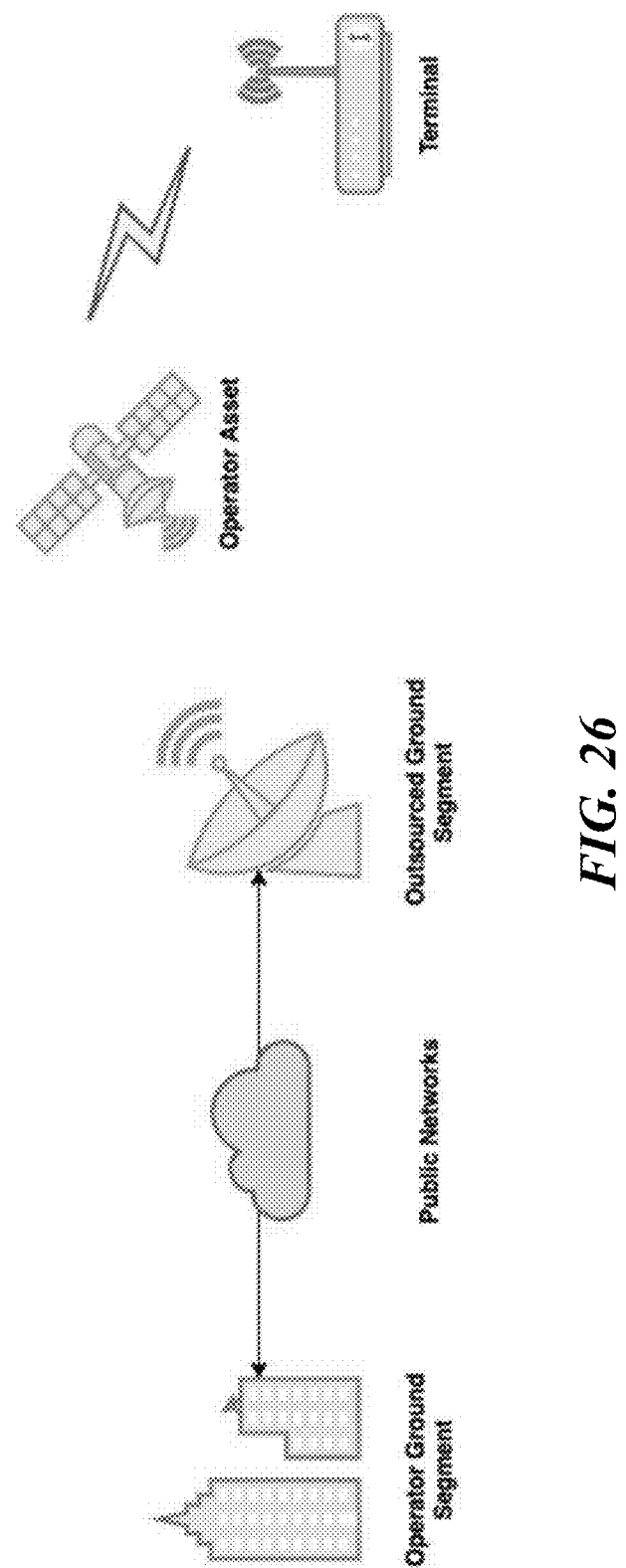
FIG. 26 shows a communications use case with a remotely deployed ground terminal.

FIG. 26 shows a communications use case with a remotely deployed ground terminal. In this use case the only two trusted endpoints of the system are the owner-operated ground segment and a field deployed communications terminal. This communications terminal can be a person, IoT device, or otherwise communicating entity. In this case, the satellite provider is only aware of the need to collect. The operator asset, such as a satellite, will need to know on which frequency to communicate and the appropriate band/ method on which to listen or pulse, if commands are to be sent to the field deployed device.

Payload Use Case

Figure 27:
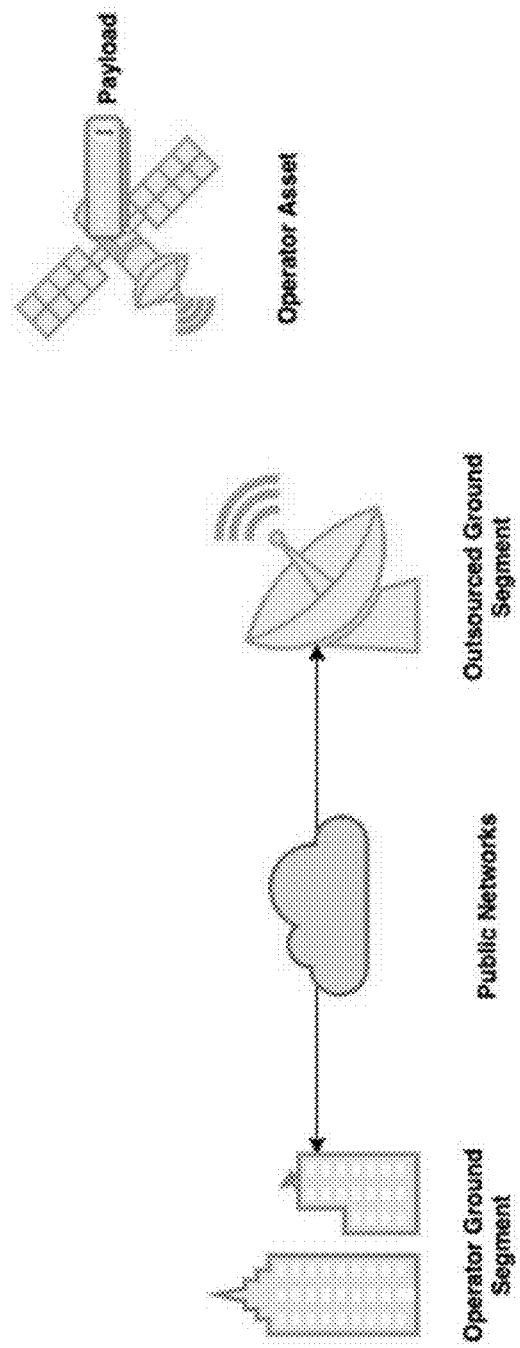
FIG. 27 shows a hosted payload use case.

FIG. 27 shows a hosted payload use case. In this use case, a single operator asset, such as a satellite bus, is hosting one or more payloads which perform various functions. The payload owner/operator does not own/control the satellite bus, and thus does not trust it. In this case, the hosted payload may use the OrbitSecure protocol to protect its specific payload data from the rest of the satellite bus/ platform. Additionally, this approach could support multiple payloads on a satellite bus to keep each payload data and communications cryptographically separate.

Post-Launch Scenario

In this scenario an organization's assets are already on-orbit. Therefore, integrating the disclosed system with these assets should be performed differently. While every platform will vary in practice, the following overall Concept of Operations (CONOP) will apply:

1. The inflight software is updated to support key rotation. This can be accomplished either by using a schedule with a fixed set of managed keys, or by using a root key and a key derivation function (KDF).
2. The inflight software is updated to use keys from either the schedule or KDF when engaging in protected communications.
3. Where possible, cypher selection can be updated to use modern authenticated encryption modes.

The above CONOP can be accomplished by utilizing the OrbitSecure protocol. All other operations are the same as the prelaunch scenario.

Key Management

Multi-Key-per-Pass (MKP) Use Case

For example, satellite company A can use OrbitSecure to separately protect the payload data its satellite collects. User X orders an image collect. User Y orders an image collect. The system can create N number of virtual channels per pass for the each collect performed. In this example, the system can create one pass with 2 collects—so, two channels. Although in the real world a single pass may have dozens or hundreds of collects this example only uses two collects for simplicity. The system can scale up to real-world collect levels for modern remote sensing assets. Through the mission planning and scheduling software, the system can provide the collection cryptographic key ("collection key") for each upcoming collect. Each planned collect which is part of the schedule loaded to the vehicle, such as a satellite, also can contain the collection key which will be used to encrypt the payload for that individual collect. As described in this application, the collection key can be determined using a schedule with a fixed set of managed keys, or by using a root key and a KDF.

During one single pass, both User X's and User Y's collects occur, separately. They are communicated to the ground and are received by the processing segment, such as a computer processor. The payload data passes through the downlink antenna and the ground control segment with no knowledge of payload data. If those segments were to try to interrogate the data, they see only cipher-text. Only the trusted processing segment has the requisite collection key to read and process that data. Upon successful product creation, the processing segment sends the resultant product to the end customer.

Product transmission to the end user can be done either within the same collection channel or a new channel. Due to the flexible nature of the system, users can maintain channels by sensor type, by Country Code, and/or by individual user within a requesting organization. The cryptographic channel through which the collect is made does not have to be the same channel the finished product is disseminated through to an end customer.

Attack Scenarios

The system can prevent various threat models and attacks with respect to on-orbit assets. Ground stations or actors masquerading as ground stations can perform numerous attacks against satellites. OrbitSecure protocol can prevent against a number of attack scenarios, which described below in further detail.

In these attack scenarios implementation defects such as logic bugs or remote code execution attacks (RCE) are not covered. Rather, the common architectural weaknesses found in many CONOPS are addressed, and how the system defends against attacks.

Attacks or discussed based on the operational segment in which they occur: Network, Control Plane, and Processing Segment.

Attacks in the Network

Network can be any equipment or infrastructure that exists between operational components of the system, such as between mission control and ground stations, ground stations and orbit, or ground stations and the processing segment.

A mission control center (MCC), sometimes called a flight control center or operations center) is a facility that manages space flights, usually from the point of launch until landing or the end of the mission. It is part of the ground segment of spacecraft operations. A staff of flight controllers and other support personnel monitor all aspects of the mission using telemetry, and send commands to the vehicle using ground stations. Personnel supporting the mission from an MCC can include representatives of the attitude control system, power, propulsion, thermal, attitude dynamics, orbital operations and other subsystem disciplines.

A ground station, earth station, or earth terminal is a terrestrial radio station designed for extraplanetary telecommunication with spacecraft (constituting part of the ground segment of the spacecraft system), or reception of radio waves from astronomical radio sources. Ground stations may be located either on the surface of the Earth, or in its atmosphere. Ground stations communicate with spacecraft by transmitting and receiving radio waves in the super high frequency or extremely high frequency bands (e.g., microwaves). When a ground station successfully transmits radio waves to a spacecraft (or vice versa), it establishes a telecommunications link. A principal telecommunications device of the ground station is the parabolic antenna. Ground stations may have either a fixed or itinerant position.

The system can assume that all network traffic is encrypted with modern authenticated cyphers such as AES¬GCM and that there are not defects in the cryptographic implementations.

Key Distribution

When any two devices wish to secure their communications cryptographically, they can first agree on a secret used to establish security. This is either done by manual distribution or using public key cryptography to exchange or agree on keys. Whatever method is used, assuring that the keys received were not intercepted and are properly authenticated, is a challenging problem.

The system addresses this issue by using device and user onboarding to establish a basis for trust which allows for secure attenuated key distribution. Leveraging onboarding to establish a root of trust takes advantage of existing protocols and procedures to meet mission specific needs. The ground side key management authority and satellite can be provisioned with matching cryptographic keys. The cryptographic keys can be stored in a secure hardware module associated with the ground side key management authority and a secure hardware module on the satellite.

In addition, the system can use a second outer layer of encryption which uses existing protocols, such as Transport Layer Security (TLS) Public Key Infrastructure (PKI), thus guaranteeing our protocol introduces no new weaknesses in key distribution. TLS is a cryptographic protocol designed to provide communications security over a computer network. PKI is a technology for authenticating users and devices in the digital world. The purpose of a PKI is to securely associate a key with an entity.

Attacks at Terminators

In many network configurations used in space communications, encryption approaches change between each link. For example, the Mission Control to Ground Station encryption differs from Ground Station to Satellite encryption. In this approach, data must be decrypted and re-encrypted at the ground station. Each time decryption happens, a new opportunity opens up for attackers to gain access. In response, the system uses an end-to-end approach with protects data even as it passes from one link type to another, internet ground network to L or X band, for example; meaning only the intended final recipient and the asset are privy to confidential data. In other words, the data may not be decrypted between the endpoints.

The L band is the Institute of Electrical and Electronics Engineers (IEEE) designation for the range of frequencies in the radio spectrum from 1 to 2 gigahertz (GHz).

The X band is the designation for a band of frequencies in the microwave radio region of the electromagnetic spectrum. In some cases, such as in communication engineering, the frequency range of the X band is rather indefinitely set at approximately 7.0-11.2 GHz. In radar engineering, the frequency range is specified by the Institute of Electrical and Electronics Engineers (IEEE) at 8.0-12.0 GHz. The X band is used for radar, satellite communication, and wireless computer networks.

Attacks in the Control Plane

Eavesdropping

Adversaries who gain access to the control plane are in most systems able to see all commands, telemetry, and collections related to associated assets. In practice, most points in the control plane need only limited access to observe the data. The use of differentiated keys in the system for each concern, such as commands, telemetry, and collections, and/or each communication link in each concern means that access is limited to only what is strictly necessary.

Integrity and Completeness

In a communications system, faithfully and completely communicating data by forwarding parities is important. If an adversary in the control plane can modify or drop messages, then any trust in any part of the system is difficult to establish. The system uses cryptographic MACs on all messages and monotonic sequence numbering to make any manipulation tampering evident and fail closed.

Temporal Authority

A control that implements temporal authority is one where the authority is granted for a limited, possibly future, interval. Common approaches to key management usually lead to a violation of temporal authority restrictions. For example, a ground station which is given a key to communicate with a satellite for one pass can use the key to talk with the satellite on subsequent and prior passes even if it was not commanded to do so. The disclosed system prevents this from happening by, for example, using clocks and tokens, as described herein. With the OrbitSecure protocol, the utilization of agile re-keying allows each key to remain valid for only a single pass (or access within a pass), preventing the use of a key outside of its intended scope.

Command Authorization

In the traditional approach to on-board command scheduling, an asset will accept any schedule entries transmitted by any party which knows the radio channel encryption keys. In most cases these transmitting parties are entities such as ground stations which are authorized only to relay commands from mission control. In practice, there are often no controls to enforce this—allowing an attacker-compromised ground station to issue commands of the attacker's choosing.

The system solves this issue by having all commands issued from mission control use unforgeable authenticators, such as cryptographic keys, which can be validated by the controlled device. This limits the commands that a ground station can successfully transmit to only those issued by mission control.

Replay Attacks

Even if commands include unforgeable authenticators, it is important that a command can only be received by an asset once; otherwise an adversary in the control plane can build a catalog of commands which it can replay at will in order to reach its goals. The OrbitSecure command protocol includes replay protection so that each command is processed only once, and in the intended order, to prevent replay and other attacks. The replay protection is achieved by using a sequence clock such as a monotonic counter or by using hash chaining where each command includes the cryptograph hash of the previous command. The choice of sequence lock or hash chaining depends on the capabilities of the hardware and mission requirements.

Attacks in the Processing Segment

Poisoned Data and Product Chains

If any error, corruption, or anomaly is discovered in a data product, it is often challenging to track down and inform consumers of derived products. This is made even more challenging in an environment where audit teams may not be authorized to know some or all of the final data products produced. The OrbitSecure protocol, deployed at the processing segment, allows for products to be cryptographically hashed for tracking of provenance through the data lifecycle. Further, the algorithms executed on both the raw and processed data can be stored on the processing ledger, thereby cryptographically assuring the algorithms themselves, their change over time, and the products generated from their use. Users of the OrbitSecure protocol would be able to know what products were processed, by which algorithms, and the version of that algorithm used. Further, the audit trail can be held at a different level than the data products; thus, you avoid needing compensating controls to prevent auditors from accessing products for which they should not have access.

The processing ledger can be a block chain, akin to the team linear sequence 200 in FIG. 2, 310 in FIG. 3, the space linear sequence 210 in FIG. 2, 300 in FIG. 3, and/or the clock block chain 1600 and FIGS. 16A-16B. The processing ledger can store encrypted information about what data was processed, when was the data processed, which algorithms were used in processing the data and the version of the algorithm used.

Trust Doesn't Exist

OrbitSecure protocol prevents unauthorized access, provides explicit channel membership, and end-to-end encryption backed with private ledger guarantees integrity. As explained herein, man-in-the-middle attacks are prevented, only endpoints can maintain keys. Orbit secure protocol is a true no-knowledge system.

OrbitSecure Protocol

OrbitSecure protocol can work with existing assets—no hardware encryption is needed. Sharing and trust can be added or removed in seconds or less. OrbitSecure protocol can work on ATAC (Automatic Targeting Attack Communicator) or similar systems. OrbitSecure protocol provides for straight forward Mission Partner sharing, allows for secure, trusted handoff of C2 between operators, and allows for U.S. Government (USG) entities to securely receive commercial data from commercially operated sensor. OrbitSecure protocol can provide pixel provenance.

Figure 28:
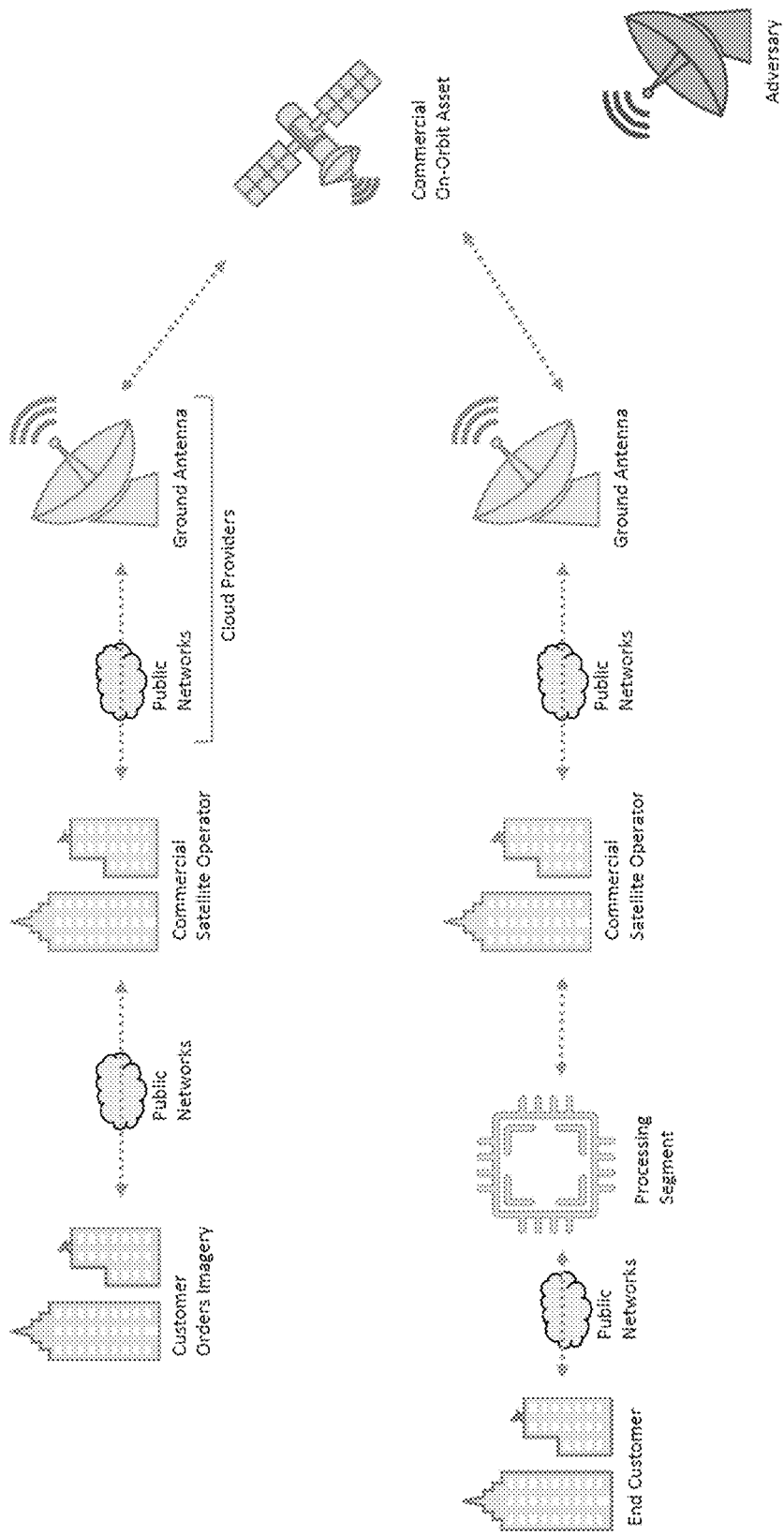
FIGS. 28-30 show architectures of the system using a commercial satellite.
Figure 29:
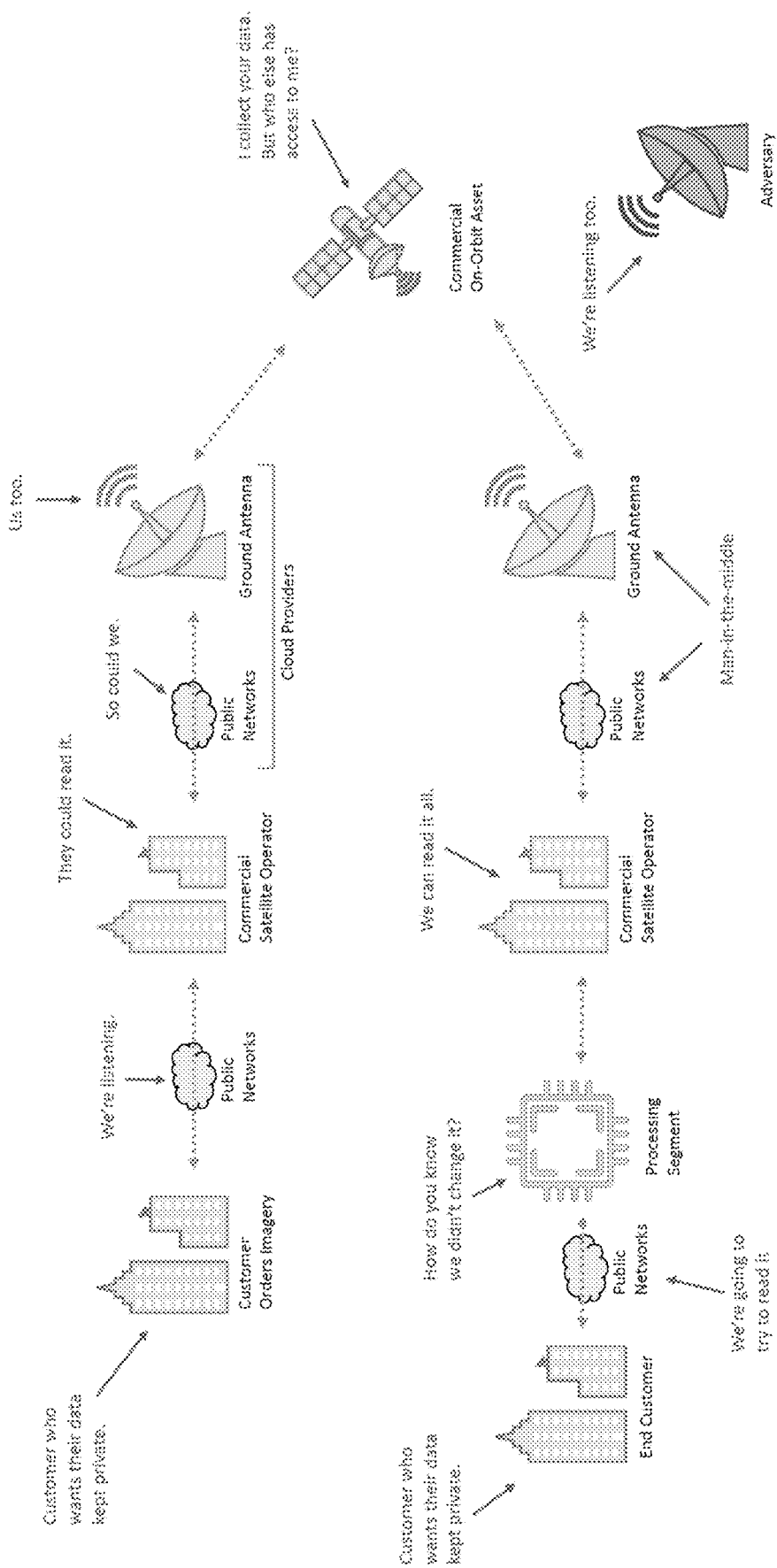
Figure 30:
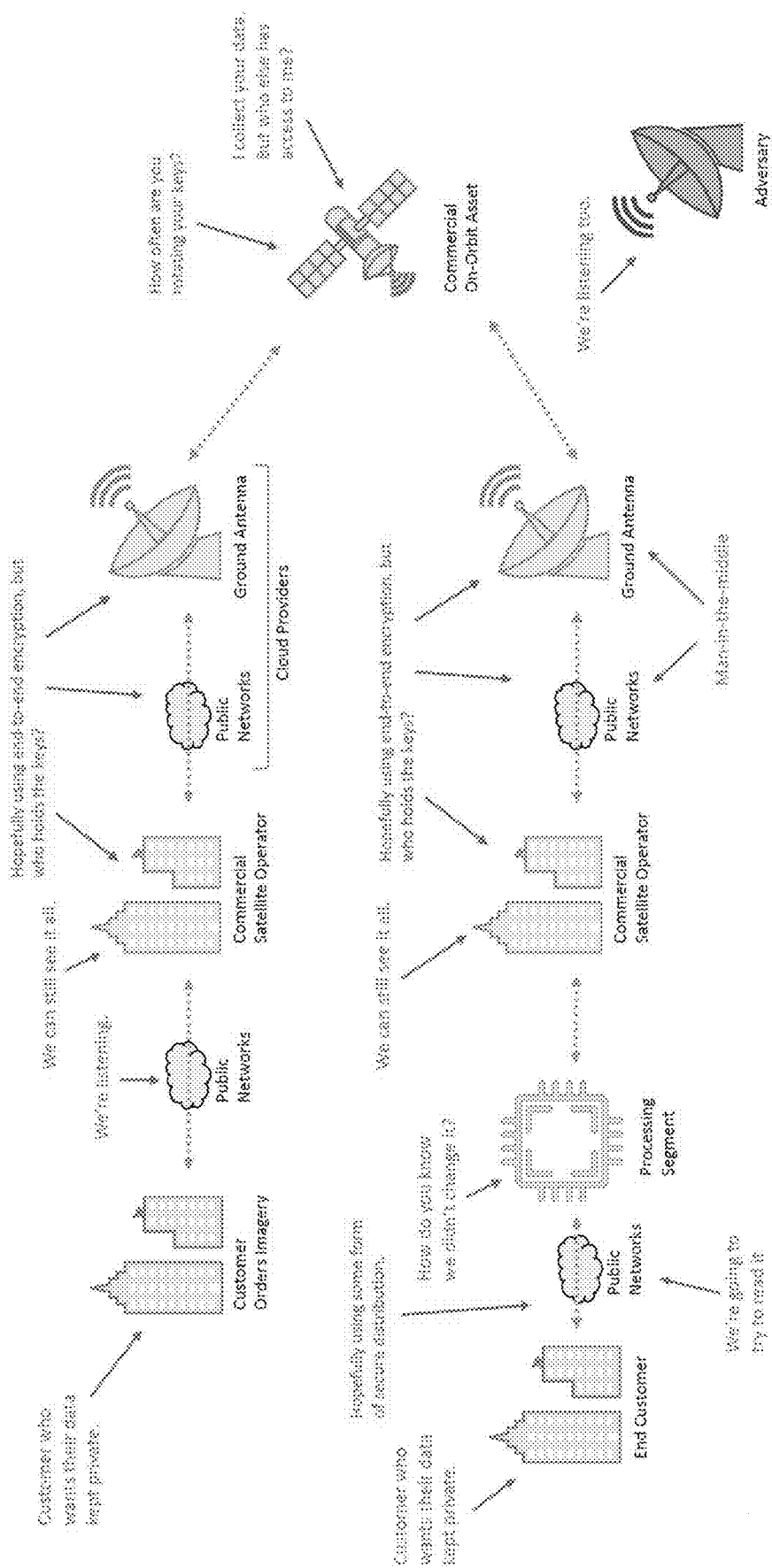

FIGS. 28-30 show architectures of the system using a commercial satellite. FIG. 28 shows a flow of data endpoint-to-endpoint. FIG. 29 shows how the data flow shown in FIG. 28 can be attacked at multiple points in the commercial satellite architecture. FIG. 30 shows potential points in the commercial satellite architecture in FIG. 28, where encryption can be applied to increase authority, identity, integrity, and confidentiality of the user data.

Figure 31:
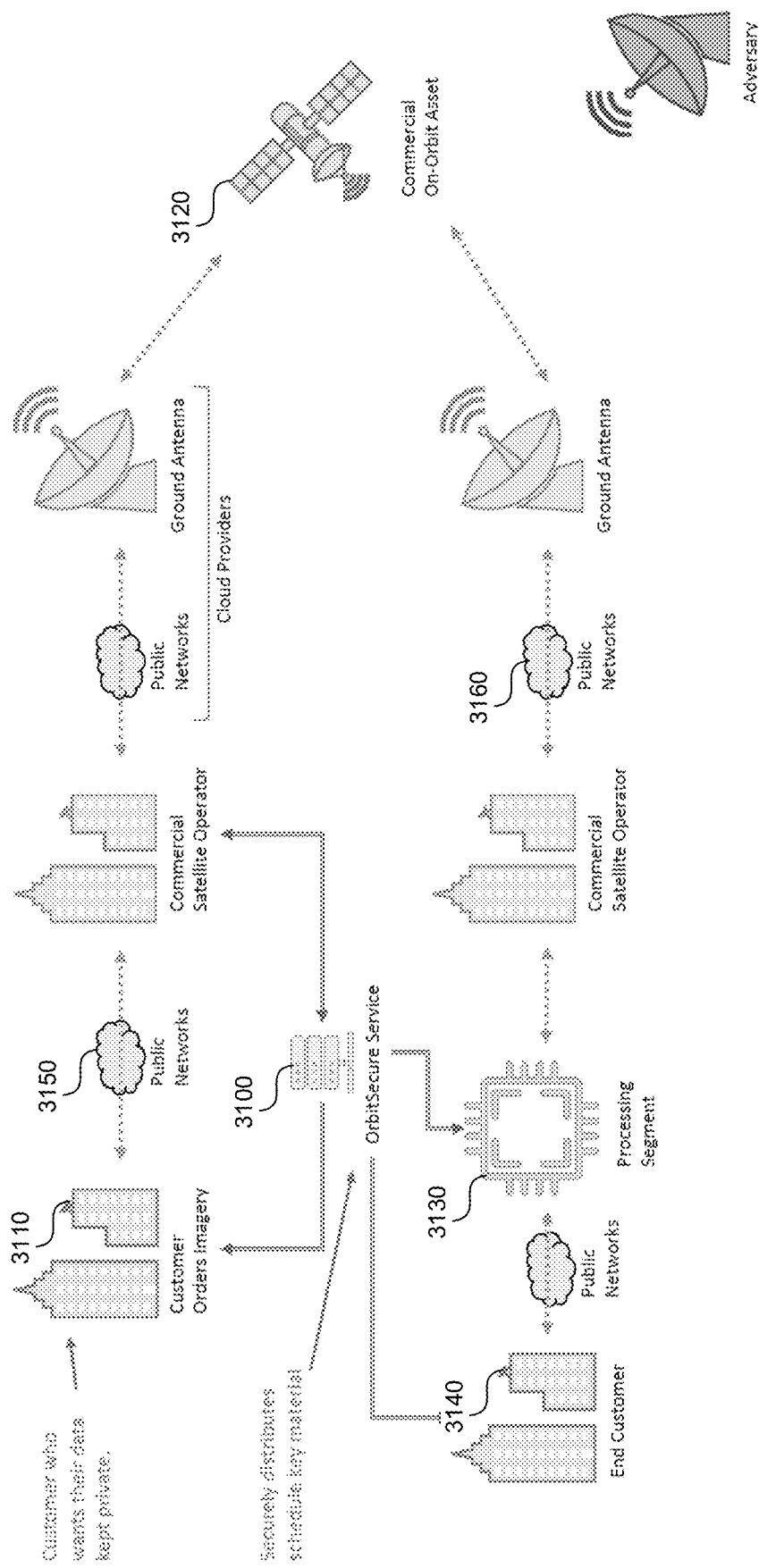
FIG. 31 shows a use of OrbitSecure protocol to ensure authority, identity, integrity, and confidentiality throughout the data lifecycle.

FIG. 31 shows a use of OrbitSecure protocol to ensure authority, identity, integrity, and confidentiality throughout the data lifecycle. The OrbitSecure protocol communicates using the block chain approach described in this application to provide cryptographic keys to devices 3110, 3130, 3140 who have authorization to access some type of data on the satellite 3120 at a given time. Each type of data and time will have distinct keys.

The data is encrypted end to end, and only accessible to devices 3110, 3120, 3130, 3140.

The server 3100 can securely distribute the key material, such as cryptographic keys, key generation materials. The server 3100 can distribute the key material to various system elements such as the initiating device 3110, the commercial satellite operator 3120, the processing segment 3130 and the end customer 3140.

A key schedule is an algorithm that calculates all round keys from an original key, which can be distributed by the server 3100. In a key schedule, ciphering and deciphering of data is typically done as an iteration of rounds. The setup for each round is generally the same, except for round-specific fixed values called a round indicator, and round-specific data derived from the cipher key called a round key. In the initial round, the round key can be the original key. After N-round key (where N is an integer) is used, the round indicator, N, can be increased, and the next round key, e.g. N+1-round key, can be calculated based on the round indicator, and data derived from the N-round key.

Figure 32:
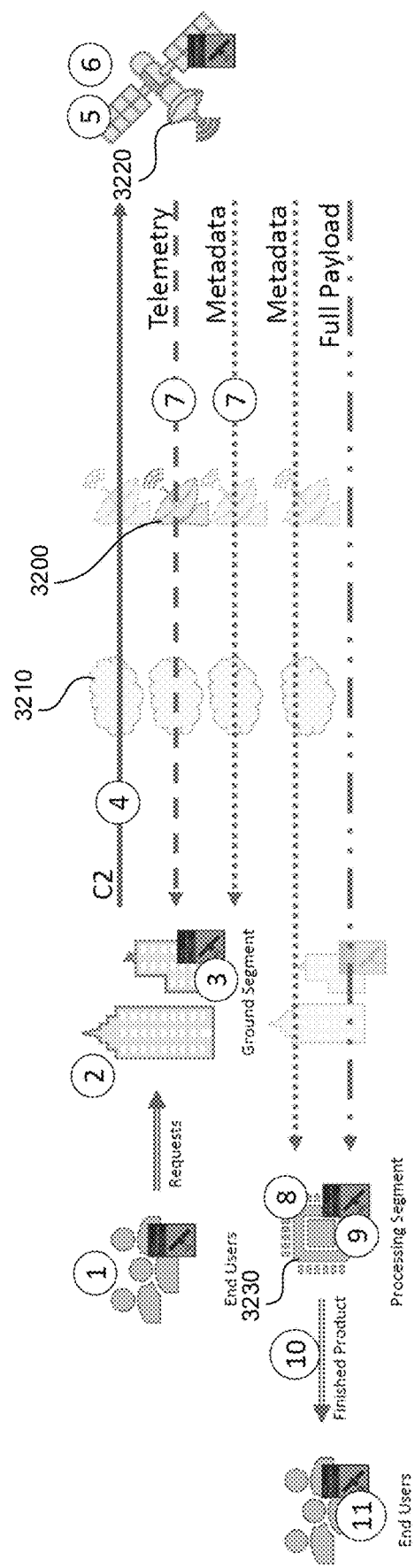
FIG. 32 shows a logical view of the data flow through the system.

FIG. 32 shows a logical view of the data flow through the system. The un-trusted assets such as antenna 3200 and public cloud 3210 see only cipher text blocks. In some embodiments, the antenna 3200 can have access to telemetry data.

In step 1, ground segment receives user collection requests as input. In step 2, processing segment calls Orbit-Secure protocol service. OrbitSecure protocol uses the ground segment key and the on-orbit asset key to derive multiple collection keys, by, for example, using a key derivation function. In step 3, the collection keys themselves are encrypted against the public key of the on-orbit asset.

In step 4, collection schedule and associated collection keys are transmitted to the on-orbit asset 3220 through untrusted infrastructure. The collection schedule and the associated collection keys can include one or more keys to use for each of the scheduled activities. All data associated with each activity is encrypted with the appropriate key. In contrast, current satellite operation encrypts data using the point to point encryption provided by the radio links. The satellite 3220 operates according to a schedule. A computer on the satellite 3220 has a schedule that has entries like:

12:50 jan 12 2012: turn on main payload
13:00 jan 12 2021: point camera at NYC
13:05 jan 12 2021: turn on camera for 10 minutes
13:20 jan 12 2012: point camera at Washington D.C., etc.
13:30 jan 12 2012: turn on camera for 5 minutes, etc.

The current system extends the operation of the satellite by adding a unique cryptographic key to use when recording information associated with each of the above commands. When the data is encrypted using the unique cryptographic key, only holders of keys can make use of the encrypted data. Each data collection in the above schedule can correspond to one round in the key schedule. For example, the data collected at entry at 13:05, recording NYC for 10 minutes, can be encrypted with the M-round key, while the data collected at entry 13:30, recording Washington D.C. for 5 minutes, can be encrypted with the M+1 round key.

In step 5, the on-orbit asset 3220 now has unique collection keys for each upcoming collect in the next pass. The next pass can occur within a predetermined time window, such as the next hour, next day, next week, next month, etc. The next pass can occur according to the schedule listed above. In step 6, the on-orbit asset 3220 performs collection, and encrypts the collected data with the appropriate key.

In step 7, after the on-orbit asset 3220 has performed the collection, the on-orbit asset 3220 downlinks the data back to the ground segment. In step 8, upon receipt of the payload data the processing segment 3230 associated with an individual collect receives the ciphertext relevant to the individual collect. In step 9, the processing segment 3230 decrypts the collections and creates finished products.

In step 10, end users are setup on individual distribution channels with unique channel session keys, as described in this application. The end users' keys can be calculated using the key schedule. In step 11, finished products are disseminated to end users using appropriate channel session keys.

Figure 33:
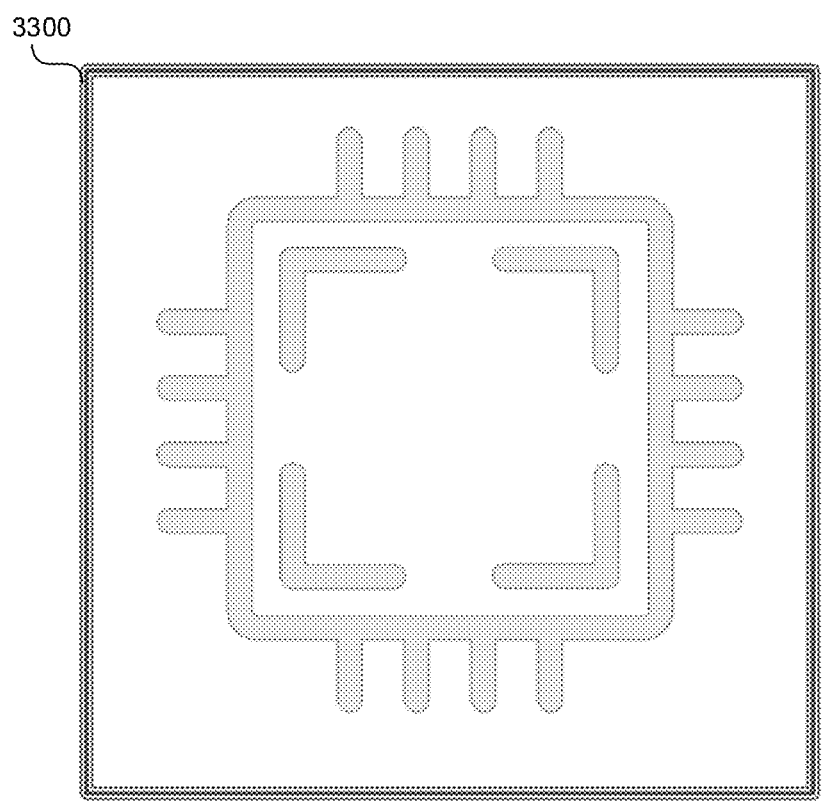
FIG. 33 shows a processing segment.

FIG. 33 shows a processing segment. The processing segment 3300 can provide information necessary to determine pixel provenance. In other words, the processing segment 3300 can provide information to track the per pixel properties of an image, where the properties can include pixel origin, processing, transmission, etc.

The system extends trust to the processing segment 3300 in a unique way. The processing segment 3300 can be gated by the OrbitSecure protocol, which can only provide access to the processing segment 3300 based on policy. Processing performed on the image, such as algorithms applied, can be stored in a linear record, such as a block chain. The images which are generated are cryptographically hashed. Consequently, all output products have an irrefutable history recorded in the secure block chain. Any downstream image issues can be traced.

Figure 34:
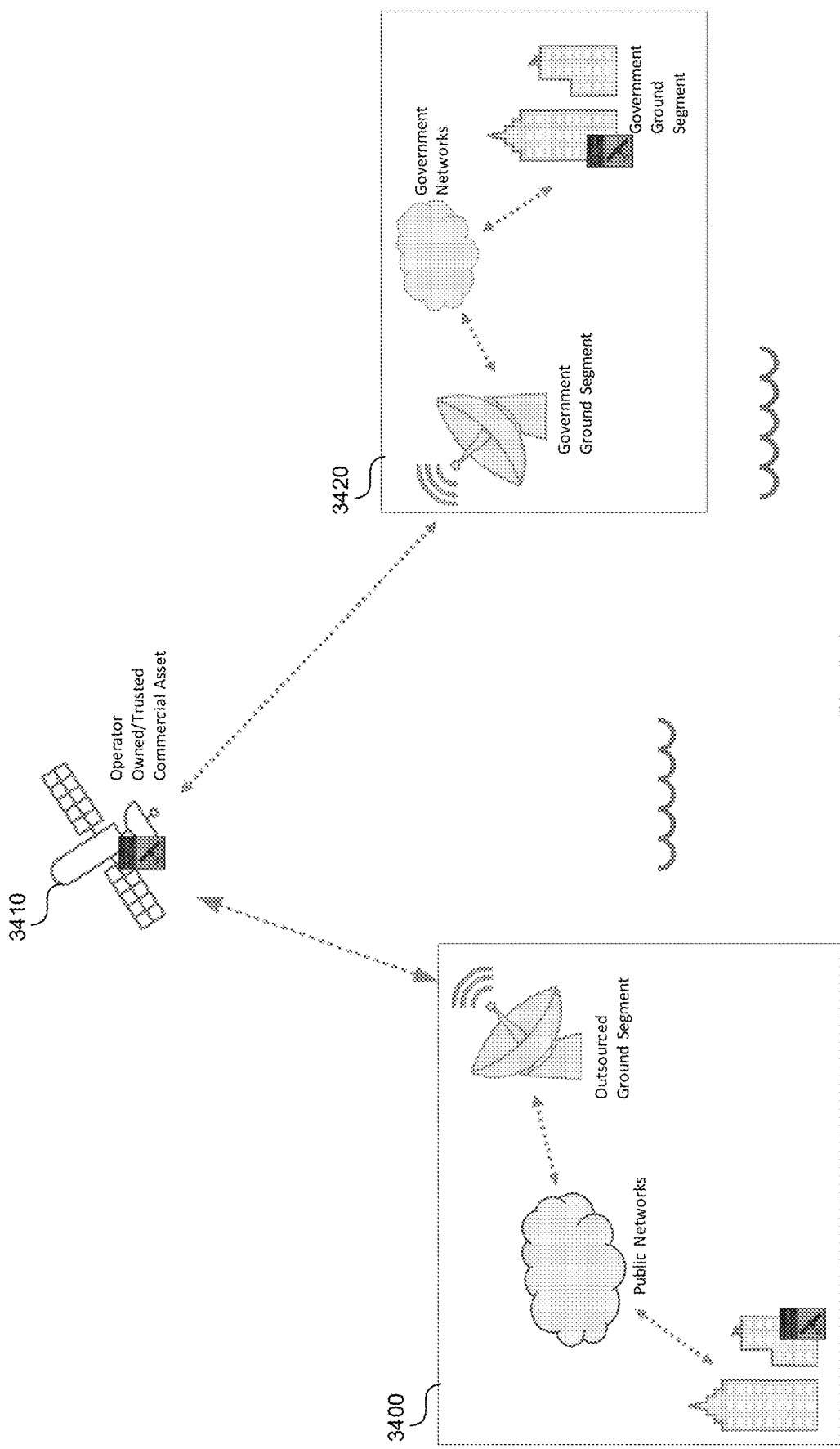
FIG. 34 shows a shared hybrid space architecture.

FIG. 34 shows a shared hybrid space architecture. In this scenario, OrbitSecure protocol is used to secure the C2 and downlink of payload data to the government in a shared hybrid space architecture. In this shared use-case, the commercial operator ground segment 3400 commands the on-orbit asset 3410, but the on-orbit asset 3410 later communicates with the government 3420 to downlink the data which the government 3420 initially requested for collection. Using OrbitSecure protocol allows this collaboration to happen without the commercial entity requiring Type-1 Encryptors. The Government is owner of the channel used and must approve/validate new entrants onto existing or new channels.

Figure 35:
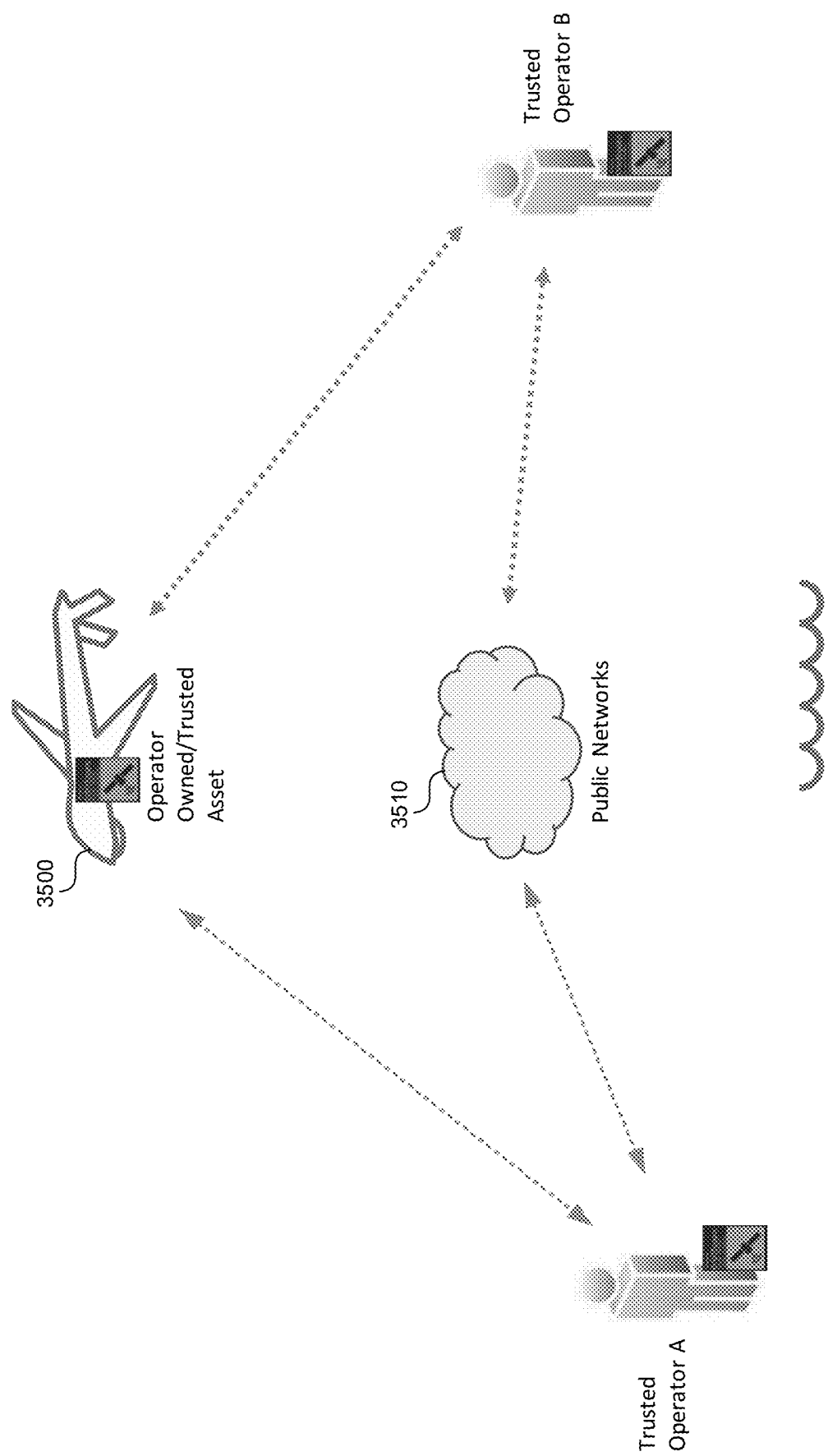
FIG. 35 shows how an autonomous vehicle can be securely controlled using the disclosed system.

FIG. 35 shows how an autonomous vehicle can be securely controlled using the disclosed system. In this scenario, User A is controlling and operating a trusted autonomous vehicle 3500, such as an unmanned aerial vehicle (UAV), in the field. User A has responsibility for flight operations. User A needs to perform hand-over to User B, and/or handover is requested by secondary operator, User B. User A and User B perform handover approval across available untrusted network 3510. User B is now in control of airborne asset 3500. User A remains as mission owner and can pull back control as needed.

Flow Diagram

Figure 36:
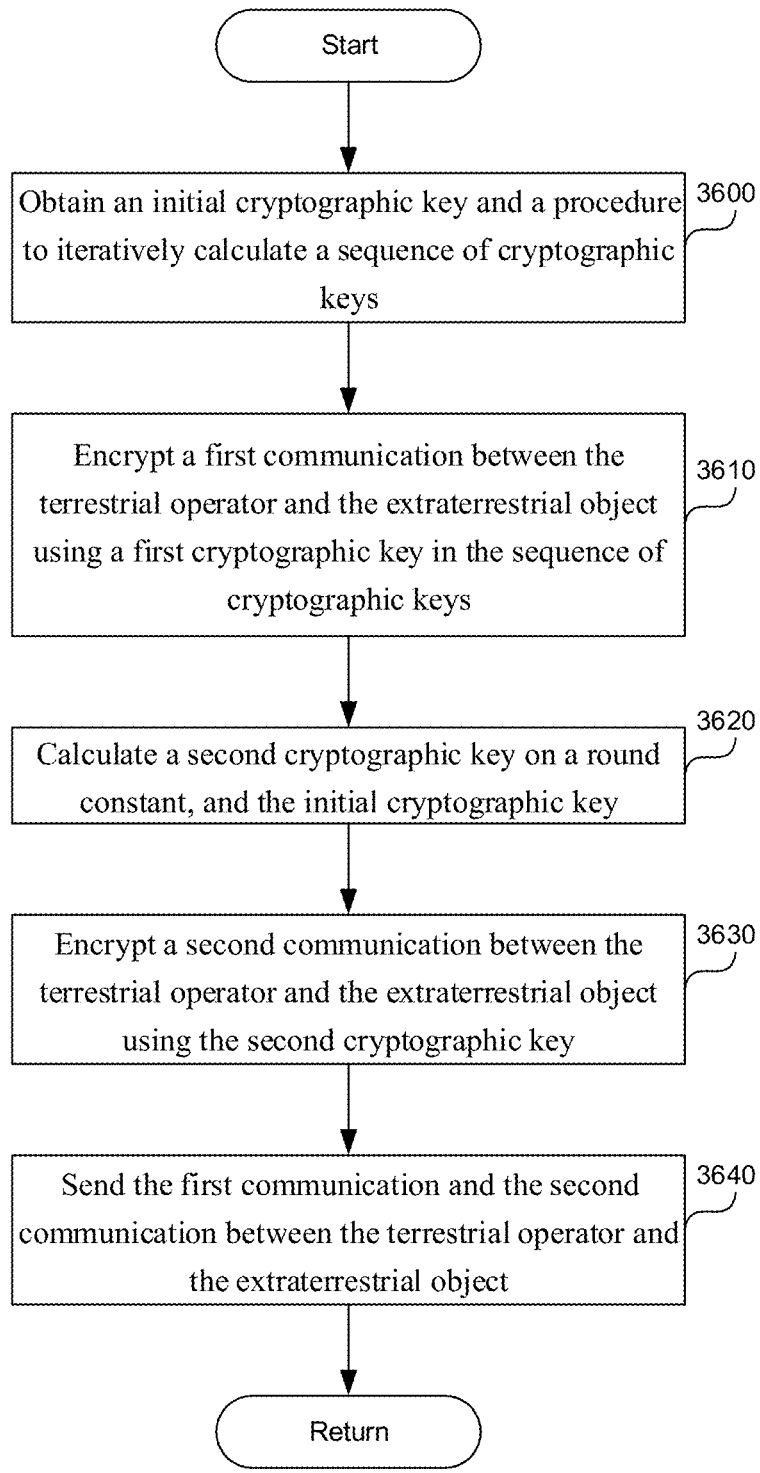
FIG. 36 is a flowchart of a method to encrypt communication between a terrestrial operator and an extraterrestrial object.

FIG. 36 is a flowchart of a method to encrypt communication between a terrestrial operator and an extraterrestrial object. The terrestrial operator can be the server 3100 in FIG. 31, the initiating device 3110 in FIG. 31, the processing segment 3130 in FIG. 31, and/or the end customer 3140 in FIG. 31.

The extraterrestrial object can be a satellite, a spacecraft, an airplane, an unmanned aerial vehicle, an autonomous vehicle, an autonomous object, etc., such as the commercial satellite operator 3120 in FIG. 31, and/or the unmanned aerial vehicle 3500 in FIG. 35.

In step 3600, a hardware or a software processor executing instructions described in this application can obtain an initial cryptographic key and a procedure to iteratively calculate a sequence of cryptographic keys. The initial cryptographic key and the procedure are distributed to the terrestrial operator and the extraterrestrial object. The initial cryptographic key and the procedure can be distributed during manufacture or can be communicated using a public key cryptography.

In one embodiment, the procedure can be a schedule with a fixed set of managed keys, over which the procedure iterates based on a round indicator. For example, the set of managed keys can be a sequence of keys from 1 to 100, where 1 to 100 indicates a round indicator. Each communication between the terrestrial operator and the extraterrestrial object can correspond to one key in the sequence of keys. For example, the initial communication can correspond to key 1, the tenth communication can correspond to key 10, etc. Upon reaching communication 101, the key to encrypt the one hundred and first communication can go back to key 1.

In another embodiment, the procedure can use an initial key, e.g. a root key, and a KDF. KDF is an algorithm that calculates all round keys from the initial key, which can be distributed to the terrestrial operator and the extraterrestrial object by the server. In a key schedule, ciphering and deciphering of data is typically done as an iteration of rounds. KDF is a cryptographic hash function that derives one or more secret keys from a secret value such as a main key, a password, or a passphrase using a pseudorandom function. KDFs can be used to stretch keys into longer keys or to obtain keys of a required format, such as converting a group element that is the result of a Diffie Hellman key exchange into a symmetric key for use with AES.

In step 3610, the processor can encrypt a first communication between the terrestrial operator and the extraterrestrial object using a first cryptographic key in the sequence of cryptographic keys. The first cryptographic key in the sequence of cryptographic keys is obtained based on the initial cryptographic key. For example, the first cryptographic key can be the initial key, or the first cryptographic key can be calculated from the initial key using the procedure and can be key 1 in the sequence of cryptographic keys.

In step 3620, the processor can rotate the keys by calculating a second cryptographic key prior to sending a second communication between the terrestrial operator and the extraterrestrial object. The processor can use the procedure to calculate the second cryptographic key based on a round indicator, and the initial cryptographic key. The round indicator represents a place of the second cryptographic key in the sequence of cryptographic keys. The setup for each round is generally the same, except for round-specific fixed value, the round indicator, and round-specific data derived from the round key. In the initial round, the round key can be the initial key. After N-round key (where N is an integer) is used, the round indicator, N, can be increased, and the next round key, e.g. N+1-round key, can be calculated based on the round indicator, and data derived from the N-round key.

In step 3630, the processor can encrypt a second communication between the terrestrial operator and the extraterrestrial object using the second cryptographic key in the sequence of cryptographic keys. In step 3640, the processor can send the first communication and the second communication between the terrestrial operator and the extraterrestrial object.

To communicate between the extraterrestrial object and the terrestrial operator, the processor can create a communication channel, such as a radio frequency channel. There can be multiple channels between the extraterrestrial object and the terrestrial operator, and each channel can be specific to a particular pair of the extraterrestrial object and the terrestrial operator. In addition, a particular pair of the extraterrestrial object and the terrestrial operator can have multiple channels established between them. For example, one channel can carry metadata only, another channel can carry mission data, a third channel can carry telemetry from the extraterrestrial object, etc.

The processor can append to a block chain a first block defining an authority of the terrestrial operator, where the first authority defines at least an operation associated with the terrestrial operator to perform on a first communication or a second communication transmitted via the communication channel. The operation can include listening to a channel, sending communication via the channel, accessing metadata associated with the channel, adding an additional communicator to the channel, etc.

The processor can also append to a block chain a second block defining an authority of the extraterrestrial object, where the second authority defines at least an operation associated with the extraterrestrial object to perform on a first communication or a second communication transmitted via the communication channel.

The processor can grant access to the communication channel to the terrestrial operator and the extraterrestrial object by determining that the first authority associated with the terrestrial operator and the second authority associated with the extraterrestrial object grants them access to the communication channel. To determine the authority, the processor can compute the first and the second authority by checking the block chain from an initial block to a last block and/or the policy associated with a block chain, as described in this application.

The extraterrestrial object can perform data collections, such as recording pictures of particular locations on Earth from the orbit. In one embodiment, the processor can associate a cryptographic key in the sequence of cryptographic keys with each data collection performed by the extraterrestrial object, where the multiple data collections are arranged sequentially. The processor can establish a correspondence between the sequence of data collections and the sequence of keys. The processor can encrypt a data collection with the cryptographic key. The processor can select a subsequent cryptographic key in the sequence of cryptographic keys, and encrypt a subsequent data collection in the multiple data collections with the subsequent cryptographic key. When the data is encrypted using the unique cryptographic key, only holders of keys can make use of the encrypted data.

In another embodiment, the extraterrestrial object and the terrestrial operator can utilize a single cryptographic key or key pair to communicate with each other, and to encrypt multiple data collections. The route of the encrypted communication between the extraterrestrial object and the terrestrial operator can be part of the metadata recorded on the block chain. The route can include public networks, outsourced ground segments, other extraterrestrial objects, etc. The route can vary depending on availability, security, and speed of communication.

To obtain the initial cryptographic key and the procedure to iteratively calculate the sequence of cryptographic keys, the processor can obtain the initial cryptographic key encrypted based on a public key of the extraterrestrial object, and can obtain the procedure including a KDF. The initial cryptographic key and/or the sequence of cryptographic keys can be encrypted against the public key of the extraterrestrial object, such as the public key of the on-orbit asset. The so encrypted keys can be communicated to both the extraterrestrial object and the terrestrial operator via a public network.

The processor can store an operation executed on a communication between the terrestrial operator and the extraterrestrial object on a block chain, thereby enabling retrieval of the communication, the operation used on the communication, and a version of the operation executed on the communication. The operation can be encrypted prior to being stored on the block chain. The operation can be an algorithm such as an image processing algorithm. Anyone accessing the block chain would know what products were processed, by which algorithms, and the versions of those algorithms used. For example, recording encrypted images on the block chain, the algorithms used on the encrypted images, and their outputs can provide pixel provenance for each image. Provenance analysis provides a snapshot of the chronology and validity of content as it is uploaded, re-uploaded, and modified over time. Pixel provenance can provide provenance analysis on per-pixel basis. For example, pixel provenance can be used to determine when a pixel was added to the image, an operation used to add the pixel to the image, and/or an author of the pixel. To perform the analysis, the processor can utilize other related images and their contents, knowledge about available image editing tools over time, and/or image or video metadata such as timestamps, geotags, and camera IDs.

In one embodiment, the processor can prevent a replay attack using key rotation based on time. Replay attack occurs when an attacker records an encrypted communication between the terrestrial operator and the satellite and replays the encrypted communication at a later time. The processor can enable the first cryptographic key within a predetermined timeframe, where the time is measured using a block chain clock as described in this application. The processor can receive the first communication encrypted with the first cryptographic key. Upon receiving the first communication encrypted with the first cryptographic key, the processor can determine whether the first communication is received during the predetermined timeframe. If the first communication is received during the predetermined timeframe, the processor can decrypt the communication, and if the communication contains an instruction, execute the instruction. However, upon determining that the first communication is not received within the predetermined timeframe, the processor can disregard the first communication.

In another embodiment, to prevent the replay attack, the processor can use a token, as described in this application. The token can indicate the round of the encryption key used to encrypt the message. If the round and the encryption key do not match, or if the round does not correspond to the round expected by the terrestrial operator and/or the extraterrestrial object, the processor can disregard the communication.

In another embodiment, to prevent the replay attack, the processor can create a sequence of communications including the first communication and the second communication, where a subsequent communication in the sequence of communications includes a hash of the sequence of communications. The processor can receive a communication in the sequence of communications. The processor can determine whether the communication in the sequence of communications contains the hash of the sequence of previous communications. Upon determining that the communication does not contain the hash of the sequence of communications, the processor can disregard the communication. For example, in a replay attack, Nth communication in the sequence of communications contains a hash of N−1 previous communications. If the attacker replays the Nth communication, the replay will contain the hash of N−1 previous communications. However, because the replayed communication is N+1st communication, the replay should contain a hash of N previous communications. The processor can detect that the hash does not contain the Nth communication, and can disregard the replayed communication.

The processor can send a communication between the terrestrial operator and the extraterrestrial object, where the communication includes a command for the extraterrestrial object, a telemetry data from the extraterrestrial object, or a mission data from the extraterrestrial object. The processor can use a different initial cryptographic key and/or a different procedure to iteratively calculate the sequence of cryptographic keys for each: the command for the extraterrestrial object, the telemetry data from the extraterrestrial object, or the mission data from the extraterrestrial object.

The processor can create a communication channel between the terrestrial operator and the extraterrestrial object. The communication channel can be based on a sensor type, a country code, or a requester. The processor can grant access to the communication channel based on a policy stored in a block chain associated with the communication channel.

Figure 37:
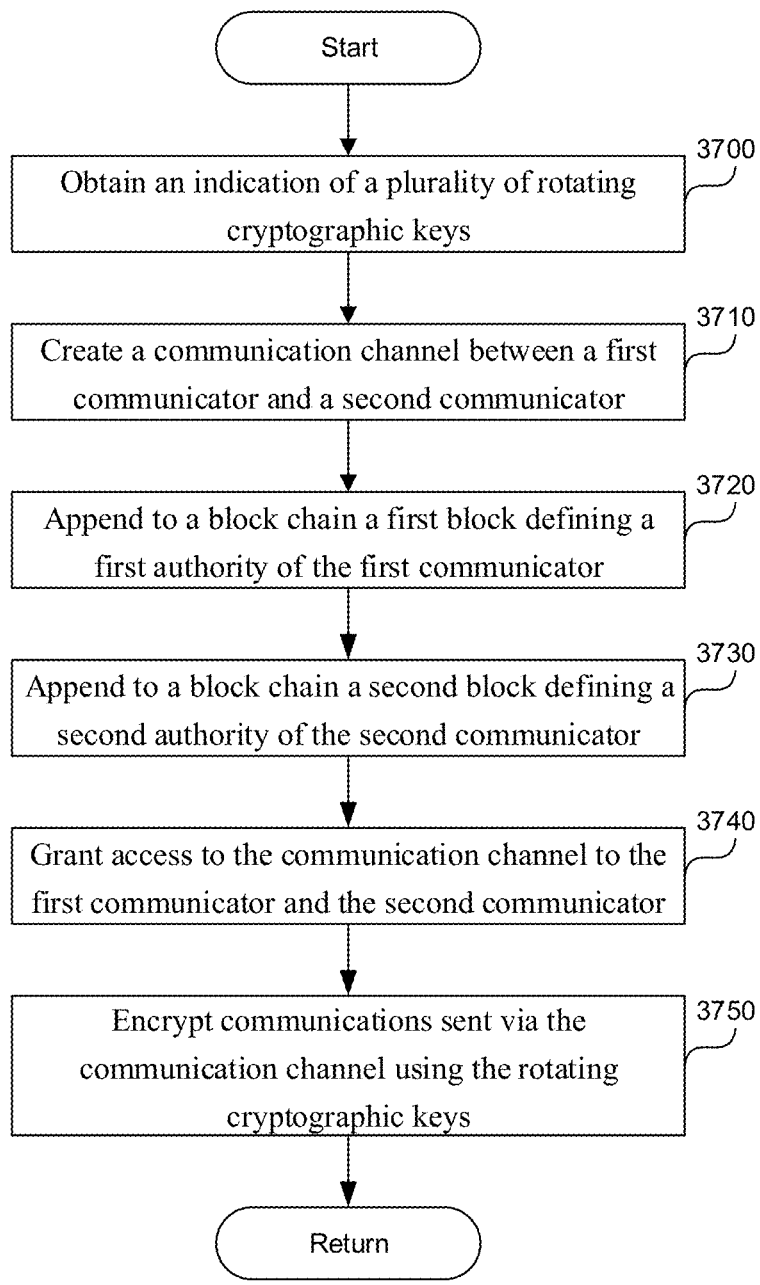
FIG. 37 is a flowchart of a method to securely communicate between two communication endpoints.

FIG. 37 is a flowchart of a method to securely communicate between two communication endpoints. The communication endpoints can be terrestrial, extraterrestrial, or a combination of both. In step 3700, a processor can obtain an indication of multiple rotating cryptographic keys, where the multiple rotating cryptographic keys are distributed to a first communicator and a second communicator. The indication of multiple rotating cryptographic keys can include an initial cryptographic key and a procedure to iteratively calculate a sequence of cryptographic keys. The procedure can include multiple cryptographic keys and a schedule according to which multiple cryptographic keys should be used. For example, the procedure can include a linear list of cryptographic keys, and the schedule can contain instructions to retrieve the cryptographic keys from the linear list in a sequence. Alternatively, the procedure can be a KDF that calculates the next cryptographic key based on the round indicator and the previous or initial cryptographic key. The processor can obtain the initial cryptographic key and/or the procedure encrypted using a public key of the first or the second communicator.

In step 3710, the processor can create a communication channel between a first communicator and a second communicator. The communication channel can be a radiofrequency channel.

In step 3720, the processor can append to a block chain a first block defining a first authority of the first communicator. The first authority can define at least a first operation associated with the first communicator to perform on a first communication or a second communication transmitted via the communication channel.

In step 3730, the processor can append to a block chain a second block defining a second authority of the second communicator. The second authority can define at least a second operation associated with the second communicator to perform on a first communication or a second communication transmitted via the communication channel. The first and the second operation can include reading an encrypted communication associated with the communication channel, sending a communication via the communication channel, reading an encrypted communication associated with the communication channel, adding another communicator to the channel, etc.

In step 3740, the processor can grant access to the communication channel to the first communicator and the second communicator by determining that the first authority associated with the first communicator and the second authority associated with the second communicator grants access to the communication channel. To determine the first authority and the second authority, the processor can compute the first and the second authority by checking the block chain from an initial block to a last block, as described in this application, for example in FIG. 9.

In step 3750, the processor can encrypt multiple communications sent via the communication channel using the multiple rotating cryptographic keys. The processor can send the communications via the communication channel. To utilize the multiple rotating cryptographic keys, the processor can encrypt the first communication using a first cryptographic key in the sequence of cryptographic keys, where the first cryptographic key in the sequence of cryptographic keys is obtained based on the initial cryptographic key. The processor can calculate a second cryptographic key prior to sending a second communication between the first and the second communicator. To calculate the second cryptographic key, the processor can use the procedure which takes as input the round indicator, the initial cryptographic key, or the previous cryptographic key, and produces the second cryptographic key. The round indicator represents a place of the second cryptographic key in the sequence of cryptographic keys. The processor can encrypt a second communication between the first communicator and the second communicator using the second cryptographic key in the sequence of cryptographic keys.

The processor can associate a cryptographic key in the sequence of cryptographic keys with a data collection among multiple data collections performed by the second communicator, where the multiple data collections are arranged in a sequence of data collections. The processor can encrypt the data collection with the cryptographic key. The processor can select a subsequent cryptographic key in the sequence of cryptographic keys and encrypt a subsequent data collection among the multiple data collections with the subsequent cryptographic key.

The processor can store an operation executed on a communication between the first communicator and the second communicator on a block chain, thereby enabling retrieval of the communication, the operation used on the communication, and a version of the operation executed on the communication. The operation can be an algorithm executed on both the raw and the processed data. The operation can be stored on the processing ledger, thereby cryptographically assuring the algorithms themselves, their change over time, and the products generated from their use. Users of the OrbitSecure protocol would be able to know what products were processed, by which algorithms, and the versions of those algorithms used. OrbitSecure protocol can provide pixel provenance.

The processor can enable the first cryptographic key within a predetermined timeframe. The processor can receive the first communication encrypted with the first cryptographic key. Upon receiving the first communication encrypted with the first cryptographic key, the processor can determine whether the first communication is received during the predetermined timeframe. Upon determining that the first communication is not received within the predetermined timeframe, the processor can disregard the first communication.

The processor can prevent replay attacks by creating a sequence of communications including the first communication and the second communication, wherein a subsequent communication in the sequence of communications includes a hash of the sequence of communications. Upon receiving a communication in the sequence of communications, the processor can determine whether the communication in the sequence of communications contains the hash of the sequence of communications. Upon determining that the communication does not contain the hash of the sequence of communications, the processor can disregard the communication.

The processor can send a communication between the first communicator and the second communicator. The communication can include a command for the second communicator, a telemetry data from the second communicator, or a mission data from the second communicator. The processor can use a different initial cryptographic key and/or a different procedure to iteratively calculate the sequence of cryptographic keys for each of the command for the second communicator, the telemetry data from the second communicator, or the mission data from the second communicator.

The processor can create a communication channel between the first and the second communicator, where the communication channel is based on a sensor type, a country code, or a requester. The processor can grant access to the communication channel based on a policy stored in a block chain associated with the communication channel.

Computer

Figure 38:
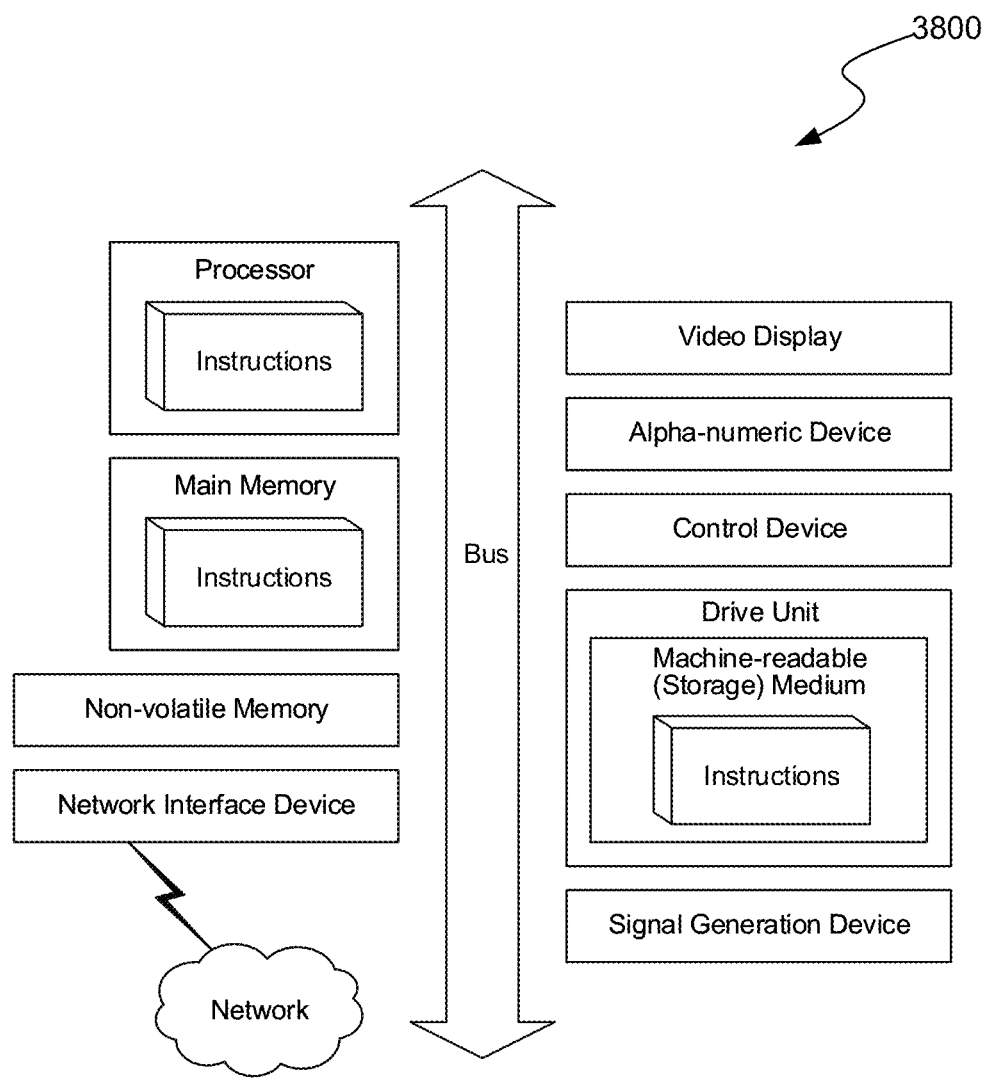
FIG. 38 is a diagrammatic representation of a machine in the example form of a computer system within which a set of instructions, for causing the machine to perform any one or more of the methodologies or modules discussed herein, may be executed.

FIG. 38 is a diagrammatic representation of a machine in the example form of a computer system 3800 within which a set of instructions, for causing the machine to perform any one or more of the methodologies or modules discussed herein, may be executed.

In the example of FIG. 38, the computer system 3800 includes a processor, memory, non-volatile memory, and an interface device. Various common components (e.g., cache memory) are omitted for illustrative simplicity. The computer system 3800 is intended to illustrate a hardware device on which any of the components described in the example of FIGS. 1-37 (and any other components described in this specification) can be implemented. The computer system 3800 can be of any applicable known or convenient type. The components of the computer system 3800 can be coupled together via a bus or through some other known or convenient device.

The computer system 3800 can represent the server such as 100 in FIG. 1, 750 in FIG. 7, 1000 and FIG. 10 A, 1140 in FIGS. 11 A-C, 1400 in FIG. 14, 1500 in FIG. 15. The computer system 3800 can represent the devices, such as 110-116 FIG. 1, 700-720 in FIG. 7, 1010-1030 in FIG. 10 A, 1100-1120 in FIGS. 11 A-11 C, 1440 in FIG. 14, 1540 in FIG. 15, 1450 FIG. 15, 1550 in FIG. 15. The processor of the system 3800 can perform the various methods and instructions described in this application, for example, methods described in FIGS. 36-37. The main memory, nonvolatile memory, and/or the drive unit of the system 3800 can store the instructions to be performed by the processor. The devices 1110-1160, 700-720, 1010-1030, 1100-1120, and the server 100, 750, 1000, 1140, 1400, 1500, 1440, 1540 can communicate with each other using the network interface device of the system 3800. For example, the token 1480, 1494 in FIG. 14, 1580, 1594 in FIG. 15 can be communicated via the network interface of the system 3800. The network interface device of the computer system 3800 can facilitate communication between the terrestrial operator and the extraterrestrial object.

This disclosure contemplates the computer system 3800 taking any suitable physical form. As example and not by way of limitation, computer system 3800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 3800 may include one or more computer systems 3800; be unitary or distributed; span multiple locations; span multiple machines; or reside in a cloud, which may include one or more cloud components in one or more networks. Where appropriate, one or more computer systems 3800 may perform without substantial spatial or temporal limitation one or more steps of one or more methods described or illustrated herein. As an example and not by way of limitation, one or more computer systems 3800 may perform in real time or in batch mode one or more steps of one or more methods described or illustrated herein. One or more computer systems 3800 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 3800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 3800. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 38 reside in the interface.

In operation, the computer system 3800 can be controlled by operating system software that includes a file management system, such as a disk operating system. One example of operating system software with associated file management system software is the family of operating systems known as Windows® from Microsoft® Corporation of Redmond, Washington, and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The language used in the specification has been principally selected for readability and instructional purposes, and it may not have been selected to delineate or circumscribe the inventive subject matter. It is, therefore, intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method to encrypt a communication between a terrestrial operator and a satellite, the method comprising:
updating a policy of a block chain, wherein the policy of the block chain defines an authority of administrators on the block chain;
obtaining an initial cryptographic key and a procedure to iteratively calculate a sequence of cryptographic keys,
wherein the initial cryptographic key is distributed to the terrestrial operator and the satellite in response to determining that the terrestrial operator is an administrator of the block chain, and
wherein the initial cryptographic key is an administrative signing key for changing the permissions on the block chain;
encrypting a first communication between the terrestrial operator and the satellite using a first cryptographic key in the sequence of cryptographic keys,
wherein the first cryptographic key in the sequence of cryptographic keys is obtained based on the initial cryptographic key, and
wherein the first communication is transmitted via a communication channel based on a sensor type a country code, or a requester;
granting access to the communication channel based on the policy of the block chain;
enabling the first cryptographic key within a predetermined timeframe measured using a block chain clock;
upon receiving the first communication encrypted with the first cryptographic key, determining whether the first communication is received during the predetermined timeframe;
upon determining that the first communication is not received within the predetermined timeframe, disregarding the first communication;
calculating a second cryptographic key prior to sending a second communication between the terrestrial operator and the satellite, said calculating including:
using the procedure to calculate the second cryptographic key based on a cryptographic round indicator, and the initial cryptographic key,
wherein the cryptographic round indicator represents a place of the second cryptographic key in the sequence of cryptographic keys;
creating a sequence of communications including the first communication and the second communication, wherein a subsequent communication in the sequence of communications includes a hash of the sequence of communications;
receiving a third communication in the sequence of communications;
determining whether the third communication in the sequence of communications contains the hash of the sequence of communications;

upon determining that the third communication does not contain the hash of the sequence of communications, disregarding the third communication;

encrypting the second communication between the terrestrial operator and the satellite using the second cryptographic key in the sequence of cryptographic keys; and sending the first communication and the second communication between the terrestrial operator and the satellite.

2. The method of claim 1, comprising:

appending to the block chain a first block defining a first authority of the terrestrial operator, the first authority defining at least a first operation that the terrestrial operator is authorized to perform on the first communication or the second communication transmitted via the communication channel;

appending to the block chain a second block defining the second authority of the satellite, the second authority defining at least a second operation that the satellite is authorized to perform on the first communication or the second communication transmitted via the communication channel; and granting access to the communication channel to the terrestrial operator and the satellite by determining that the first authority associated with the terrestrial operator and the second authority associated with the satellite grants access to the communication channel, said determining comprising:

computing the first authority and the second authority by checking the block chain from an initial block to a last block.

3. The method of claim 1, comprising:

associating a cryptographic key in the sequence of cryptographic keys with a data collection in a plurality of data collections performed by the satellite, wherein the plurality of data collections is arranged in a sequence of data collections;

encrypting the data collection with the cryptographic key;

selecting a subsequent cryptographic key in the sequence of cryptographic keys; and encrypting a subsequent data collection in the plurality of data collections with the subsequent cryptographic key.

4. The method of claim 1, said obtaining the initial cryptographic key and the procedure to iteratively calculate the sequence of cryptographic keys comprising:

obtaining the initial cryptographic key encrypted based on a public key of the satellite; and obtaining the procedure including a key derivation function.

5. The method of claim 1, comprising:

storing an operation executed on the communication between the terrestrial operator and the satellite on a block chain, thereby enabling retrieval of the communication, the operation used on the communication, and a version of the operation executed on the communication.

6. The method of claim 1, comprising:

sending the communication between the terrestrial operator and the satellite, wherein the communication comprises a command for the satellite, a telemetry data from the satellite, or a mission data from the satellite; and using a different initial cryptographic key and/or a different procedure to iteratively calculate the sequence of cryptographic keys for each of the command for the satellite, the telemetry data from the satellite, or the mission data from the satellite.

7. A method comprising:

updating a policy of a block chain, wherein the policy of the block chain defines an authority of administrators for changing permissions on the block chain;

obtaining an indication of a plurality of rotating cryptographic keys, wherein the plurality of rotating cryptographic keys is distributed to a first communicator and a second communicator in response to determining that the first communicator is an administrator of the block chain, and wherein the plurality of rotating cryptographic keys include an administrative signing key for changing the permissions on the block chain;

appending to the block chain a first block defining the first authority of the first communicator, the first authority defining at least a first operation that the first communicator is authorized to perform on a communication transmitted via a communication channel based on a sensor type a country code, or a requester;

granting access to the communication channel based on the policy of the block chain;

creating a sequence of communications, wherein a subsequent communication in the sequence of communications includes a hash of the sequence of communications;

receiving the communication in the sequence of communications;

determining whether the communication in the sequence of communications contains the hash of the sequence of communications;

upon determining that the communication does not contain the hash of the sequence of communications, disregarding the communication;

appending to the block chain a second block defining the second authority of the second communicator, the second authority defining at least a second operation that the second communicator is authorized to perform on the communication transmitted via the communication channel;

granting access to the communication channel to the first communicator and the second communicator by determining that the first authority associated with the first communicator and the second authority associated with the second communicator grants access to the communication channel, said determining comprising:

computing the first authority and the second authority by checking the block chain from an initial block to a last block; and encrypting a plurality of communications sent via the communication channel using the plurality of rotating cryptographic keys, wherein a rotating cryptographic key in the plurality of rotating cryptographic keys is calculated based on a cryptographic round indicator representing a place of the rotating cryptographic key in a sequence of cryptographic keys;

enabling a first cryptographic key within a predetermined timeframe measured using a block chain clock;

upon receiving a first communication encrypted with the first cryptographic key, determining whether the first communication is received during the predetermined timeframe; and upon determining that the first communication is not received within the predetermined timeframe, disregarding the first communication.

8. The method of claim 7, said obtaining the indication of the plurality of rotating cryptographic keys comprising:
obtaining an initial cryptographic key and a procedure to iteratively calculate the sequence of cryptographic keys.

9. The method of claim 8, said encrypting the plurality of communications sent via the communication channel comprising:
encrypting the first communication using the first cryptographic key in the sequence of cryptographic keys, wherein the first cryptographic key in the sequence of cryptographic keys is obtained based on the initial cryptographic key;
calculating a second cryptographic key prior to sending a second communication between the first communicator and the second communicator, said calculating including:
using the procedure to calculate the second cryptographic key based on the cryptographic round indicator, and the initial cryptographic key; and
encrypting the second communication between the first communicator and the second communicator using the second cryptographic key in the sequence of cryptographic keys.

10. The method of claim 7, comprising:
associating a cryptographic key in the plurality of rotating cryptographic keys with a data collection in a plurality of data collections performed by the second communicator,
wherein the plurality of data collections is arranged in a sequence of data collections;
encrypting the data collection with the cryptographic key;
selecting a different cryptographic key in the plurality of rotating cryptographic keys; and
encrypting a different data collection in the plurality of data collections with the different cryptographic keys.

11. The method of claim 7, said obtaining the indication of the plurality of rotating cryptographic keys comprising:
obtaining an initial cryptographic key encrypted based on a public key of the second communicator; and
obtaining a procedure to iteratively calculate the sequence of cryptographic keys, wherein the procedure includes a key derivation function.

12. The method of claim 7, comprising:
storing an operation executed on the communication between the first communicator and the second communicator on the block chain, thereby enabling retrieval of the communication, the operation used on the communication, and a version of the operation executed on the communication.

13. The method of claim 7, comprising:
sending the communication between the first communicator and the second communicator,
wherein the communication comprises a command for the second communicator, a telemetry data from the second communicator, or a mission data from the second communicator; and
using a different initial cryptographic key and/or a different procedure to calculate the plurality of rotating cryptographic keys for each of: the command for the second communicator, the telemetry data from the second communicator, and the mission data from the second communicator.

14. A system comprising:
one or more processors;
memory coupled to the one or more processors, wherein the memory includes instructions executable by the one or more processors to:
update a policy of a block chain, wherein the policy of the block chain defines an authority of administrators for changing permissions on the block chain;
obtain an indication of a plurality of rotating cryptographic keys, wherein the plurality of rotating cryptographic keys is distributed to a first communicator and a second communicator in response to determining that the first communicator is an administrator of the block chain, and
wherein the plurality of rotating cryptographic keys include an administrative signing key for changing the permissions on the block chain;
append to the block chain a first block defining the first authority of the first communicator, the first authority defining at least a first operation that the first communicator is authorized to perform on a communication transmitted via a communication channel based on a sensor type a country code, or a requester;
grant access to the communication channel based on the policy of the block chain;
create a sequence of communications, wherein a subsequent communication in the sequence of communications includes a hash of the sequence of communications;
receive the communication in the sequence of communications;
determine whether the communication in the sequence of communications contains the hash of the sequence of communications;
upon determining that the communication does not contain the hash of the sequence of communications, disregard the communication;
append to the block chain a second block defining the second authority of the second communicator, the second authority defining at least a second operation that the second communicator is authorized to perform on the communication transmitted via the communication channel;
grant access to the communication channel to the first communicator and the second communicator by determining that the first authority associated with the first communicator and the second authority associated with the second communicator grants access to the communication channel, said determining comprising:
computing the first authority and the second authority by checking the block chain from an initial block to a last block; and
encrypt a plurality of communications sent via the communication channel using the plurality of rotating cryptographic keys,
wherein a rotating cryptographic key in the plurality of rotating cryptographic keys is calculated based on a cryptographic round indicator representing a place of the rotating cryptographic key in a sequence of cryptographic keys; and
enable a first cryptographic key within a predetermined timeframe measured using a block chain clock;
upon receiving a first communication encrypted with the first cryptographic key, determine whether the first communication is received during the predetermined timeframe; and upon determining that the first communication is not received within the predetermined timeframe, disregard the first communication.

15. The system of claim 14, the instructions to obtain the indication of the plurality of rotating cryptographic keys comprising instructions to:
obtain an initial cryptographic key and a procedure to iteratively calculate the sequence of cryptographic keys.

16. The system of claim 15, the instructions to encrypt the plurality of communications sent via the communication channel comprising instructions to:
encrypt a first communication using the first cryptographic key in the sequence of cryptographic keys,
wherein the first cryptographic key in the sequence of cryptographic keys is obtained based on the initial cryptographic key;
calculate a second cryptographic key prior to sending a second communication between the first communicator and the second communicator, said calculating including:
using the procedure to calculate the second cryptographic key based on the cryptographic round indicator, and the initial cryptographic key; and
encrypt the second communication between the first communicator and the second communicator using the second cryptographic key in the sequence of cryptographic keys.

17. The system of claim 14, comprising instructions to:
associate a cryptographic key in the plurality of rotating cryptographic keys with a data collection in a plurality of data collections performed by the second communicator, wherein the plurality of data collections is arranged in a sequence of data collections;
encrypt the data collection with the cryptographic key;
select a different cryptographic key in the plurality of rotating cryptographic keys; and
encrypt a different data collection in the plurality of data collections with the different cryptographic key.

18. The system of claim 14, the instructions to obtain the indication of the plurality of rotating cryptographic keys comprising instructions to:
obtain an initial cryptographic key encrypted based on a public key of the second communicator; and
obtain a procedure to iteratively calculate the sequence of cryptographic keys, wherein the procedure includes a key derivation function.

19. The system of claim 14, comprising instructions to:
store an operation executed on the communication between the first communicator and the second communicator on the block chain, thereby enabling retrieval of the communication, the operation used on the communication, and a version of the operation executed on the communication.

20. The system of claim 14, comprising instructions to:
send the communication between the first communicator and the second communicator,
wherein the communication comprises a command for the second communicator, a telemetry data from the second communicator, or a mission data from the second communicator; and
use a different initial cryptographic key and/or a different procedure to calculate the plurality of rotating cryptographic keys for each of: the command for the second communicator, the telemetry data from the second communicator, and the mission data from the second communicator.

* * * * *